US012652244B2

(12) United States Patent
Pang et al.

(10) Patent No.: US 12,652,244 B2
(45) Date of Patent: Jun. 9, 2026

(54) COMMUNICATION METHOD IN SOFTWARE-DEFINED WIDE AREA NETWORKS (SD-WAN) AND RELATED APPARATUS

(71) Applicant: HUAWEI TECHNOLOGIES CO., LTD., Shenzhen (CN)

(72) Inventors: Donglei Pang, Beijing (CN); Cheng Sheng, Beijing (CN); Haibo Wang, Beijing (CN); Fanghong Duan, Nanjing (CN); Zhibo Hu, Beijing (CN); Dapeng Chen, Shenzhen (CN); Jingrong Xie, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 326 days.

(21) Appl. No.: 18/449,738

(22) Filed: Aug. 15, 2023

(65) Prior Publication Data

US 2024/0064099 A1      Feb. 22, 2024

(30) Foreign Application Priority Data

Aug. 16, 2022      (CN) .......................... 202210983481.7

(51) Int. Cl.
*H04L 45/00* (2022.01)
*H04L 12/18* (2006.01)
(Continued)

(52) U.S. Cl.
CPC ........... *H04L 45/64* (2013.01); *H04L 12/185* (2013.01); *H04L 45/54* (2013.01); *H04L 45/76* (2022.05)

(58) Field of Classification Search
None
See application file for complete search history.

(56) References Cited

U.S. PATENT DOCUMENTS 8,782,288 B2 *   7/2014   Wiget ................. H04L 12/4641
                                                709/250
10,223,713 B2 *   3/2019   LaJoie ............. H04N 21/25883
(Continued)

FOREIGN PATENT DOCUMENTS

CN          113472622 A   * 10/2021   ............. H04L 61/00

OTHER PUBLICATIONS

L. Dunbar et al.," Gap Analysis of Interconnecting Underlay with Cloud Overlay draft-ietf-rtgwg-net2cloud-gap-analysis-00", Internet-Draft: Network Working Group, Internet Engineering Task Force, IETF; Standardworki, Feb. 12, 2019 (Feb. 12, 2019), pp. 1-17, XP015131056.

(Continued)

*Primary Examiner* — Gerald A Smarth

(57) ABSTRACT

This application discloses a communication method and a related apparatus, and relates to the field of communication technologies. The method is applied to a software defined wide area network (SD-WAN) overlay network. A customer premise equipment (CPE) autonomously generates an SD-WAN overlay routing table, so that communication reliability and flexibility are improved. A route reflector (RR) specifies an overlay multicast reverse path forwarding (RPF) route to the CPE to implement SD-WAN overlay multicast communication, and the CPE does not need to perform path computation autonomously, so that a computing power requirement of the CPE is reduced. An identifier of the CPE and an identifier of a site are carried in a multicast join message to implement the SD-WAN overlay multicast communication. A standard IP header is carried in a multicast service packet to implement the SD-WAN overlay multicast communication, so that generalization, applicability, and compatibility are improved.

16 Claims, 8 Drawing Sheets

(51) Int. Cl.
    H04L 45/64         (2022.01)
    H04L 45/76         (2022.01)

(56)            References Cited

U.S. PATENT DOCUMENTS

2011/0211578 A1    9/2011   Zwiebel et al.
2018/0343146 A1*   11/2018   Dunbar ................... H04L 45/42
2021/0243053 A1    8/2021   Dunbar

OTHER PUBLICATIONS

Extended European Search Report for Application No. 23191266.8 dated Jan. 5, 2024, 12 pages.

* cited by examiner

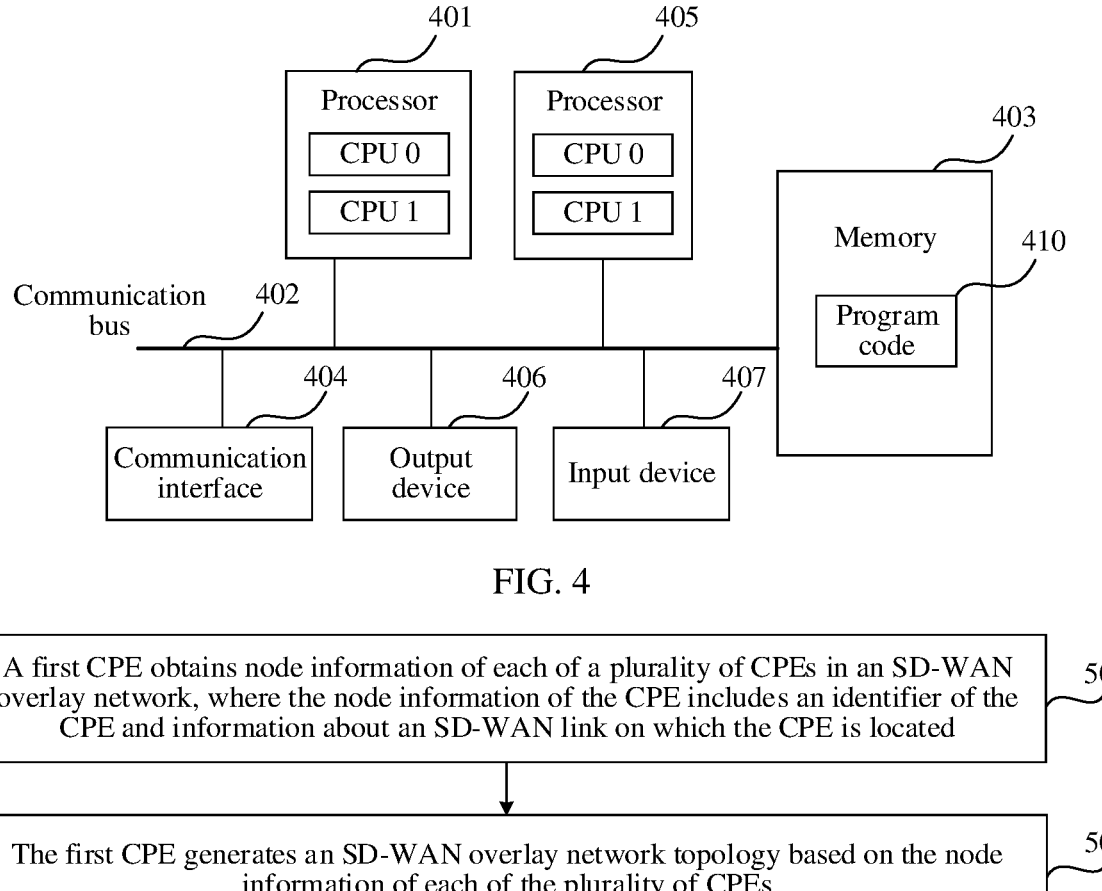

FIG. 4

A first CPE obtains node information of each of a plurality of CPEs in an SD-WAN overlay network, where the node information of the CPE includes an identifier of the CPE and information about an SD-WAN link on which the CPE is located    501

The first CPE generates an SD-WAN overlay network topology based on the node information of each of the plurality of CPEs    502

The first CPE determines, based on the SD-WAN overlay network topology, an overlay route from the first CPE to each of a plurality of destination CPEs, where the plurality of destination CPEs include a CPE other than the first CPE in the plurality of CPEs    503

The first CPE generates an SD-WAN overlay routing table based on the overlay route from the first CPE to each of the plurality of destination CPEs    504

FIG. 5

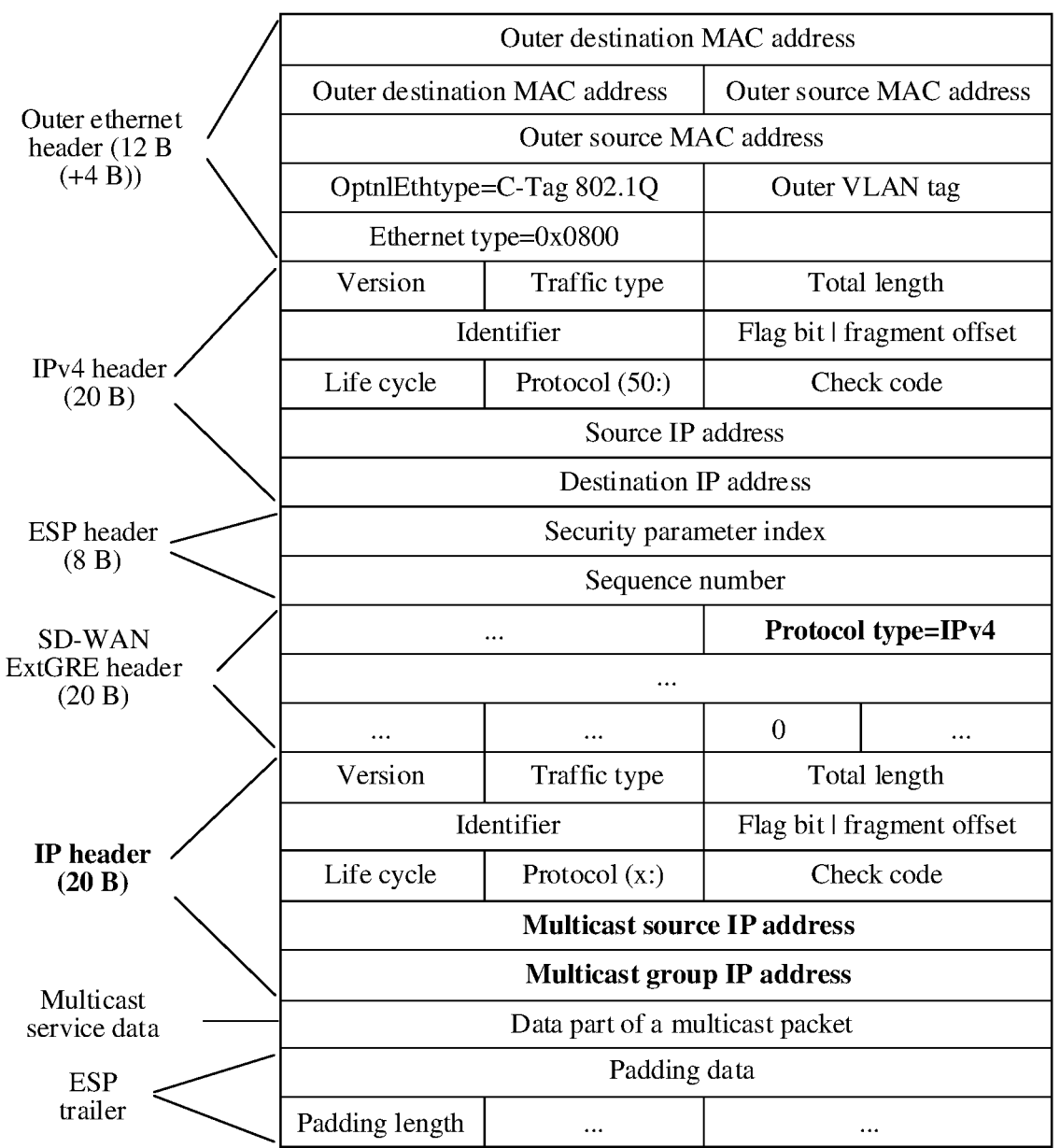

| | Outer destination MAC address | |
|---|---|---|
| | Outer destination MAC address | Outer source MAC address |
| | Outer source MAC address | |
| | OptnlEthtype=C-Tag 802.1Q | Outer VLAN tag |
| | Ethernet type=0x0800 | |
| | Version | Traffic type | Total length |
| | Identifier | Flag bit | fragment offset |
| | Life cycle | Protocol (50:) | Check code |
| | Source IP address | |
| | Destination IP address | |
| | Security parameter index | |
| | Sequence number | |
| | ... | Protocol type=IPv4 |
| | ... | |
| | ... | ... | 0 | ... |
| | Version | Traffic type | Total length |
| | Identifier | Flag bit | fragment offset |
| | Life cycle | Protocol (x:) | Check code |
| | Multicast source IP address | |
| | Multicast group IP address | |
| | Data part of a multicast packet | |
| | Padding data | |
| | Padding length | ... | ... |

Labels on the left:
- Outer ethernet header (12 B (+4 B))
- IPv4 header (20 B)
- ESP header (8 B)
- SD-WAN ExtGRE header (20 B)
- IP header (20 B)
- Multicast service data
- ESP trailer

FIG. 6

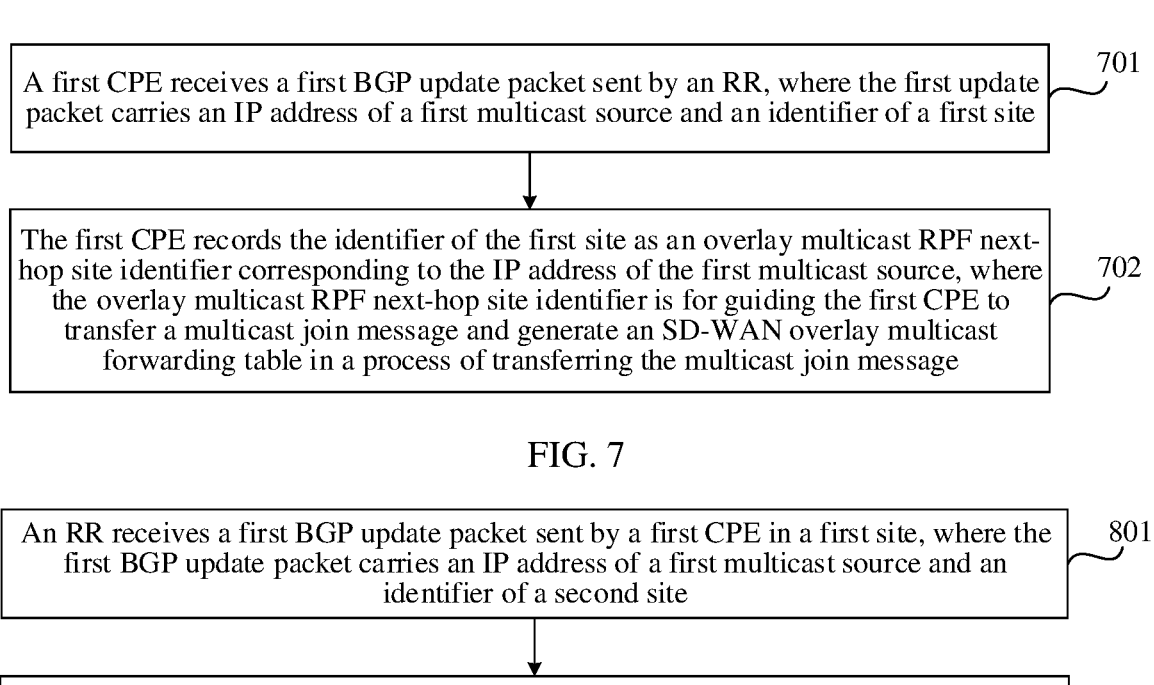

A first CPE receives a first BGP update packet sent by an RR, where the first update packet carries an IP address of a first multicast source and an identifier of a first site        701

The first CPE records the identifier of the first site as an overlay multicast RPF next-hop site identifier corresponding to the IP address of the first multicast source, where the overlay multicast RPF next-hop site identifier is for guiding the first CPE to transfer a multicast join message and generate an SD-WAN overlay multicast forwarding table in a process of transferring the multicast join message        702

FIG. 7

An RR receives a first BGP update packet sent by a first CPE in a first site, where the first BGP update packet carries an IP address of a first multicast source and an identifier of a second site        801

The RR reflects a second BGP update packet to a CPE in a third site based on a configured overlay unicast path from a branch site to the first multicast source, where the second BGP update packet carries the IP address of the first multicast source and an identifier of the first site, the second BGP update packet indicates the CPE in the third site to record the identifier of the first site as an overlay multicast RPF next-hop site identifier corresponding to the IP address of the first multicast source, and the overlay multicast RPF next-hop site identifier is for guiding the CPE in the third site to transfer a multicast join message and generate an SD-WAN overlay multicast forwarding table in a process of transferring the multicast join message        802

FIG. 8

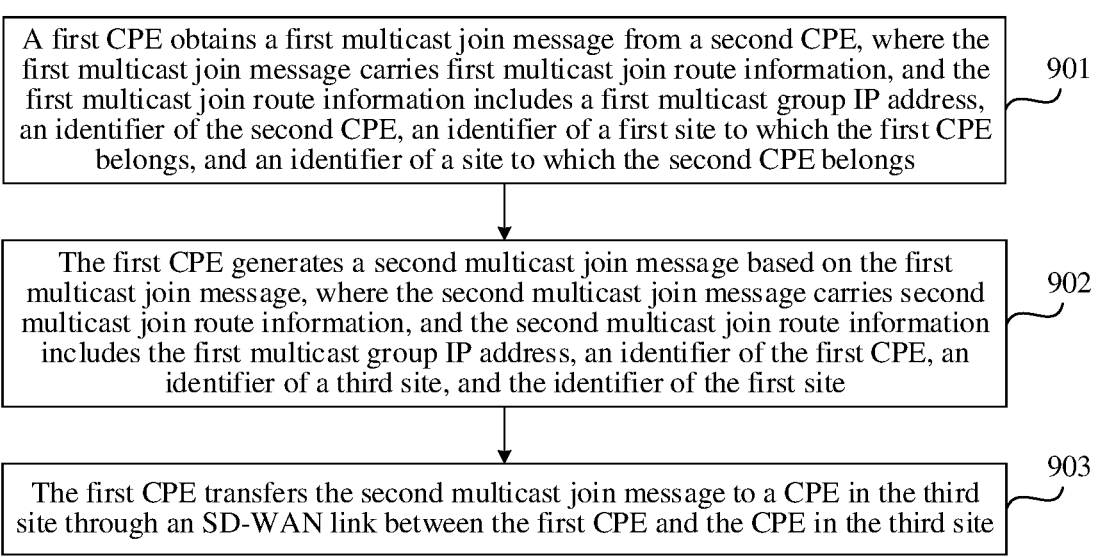

A first CPE obtains a first multicast join message from a second CPE, where the first multicast join message carries first multicast join route information, and the first multicast join route information includes a first multicast group IP address, an identifier of the second CPE, an identifier of a first site to which the first CPE belongs, and an identifier of a site to which the second CPE belongs        901

The first CPE generates a second multicast join message based on the first multicast join message, where the second multicast join message carries second multicast join route information, and the second multicast join route information includes the first multicast group IP address, an identifier of the first CPE, an identifier of a third site, and the identifier of the first site        902

The first CPE transfers the second multicast join message to a CPE in the third site through an SD-WAN link between the first CPE and the CPE in the third site        903

FIG. 9

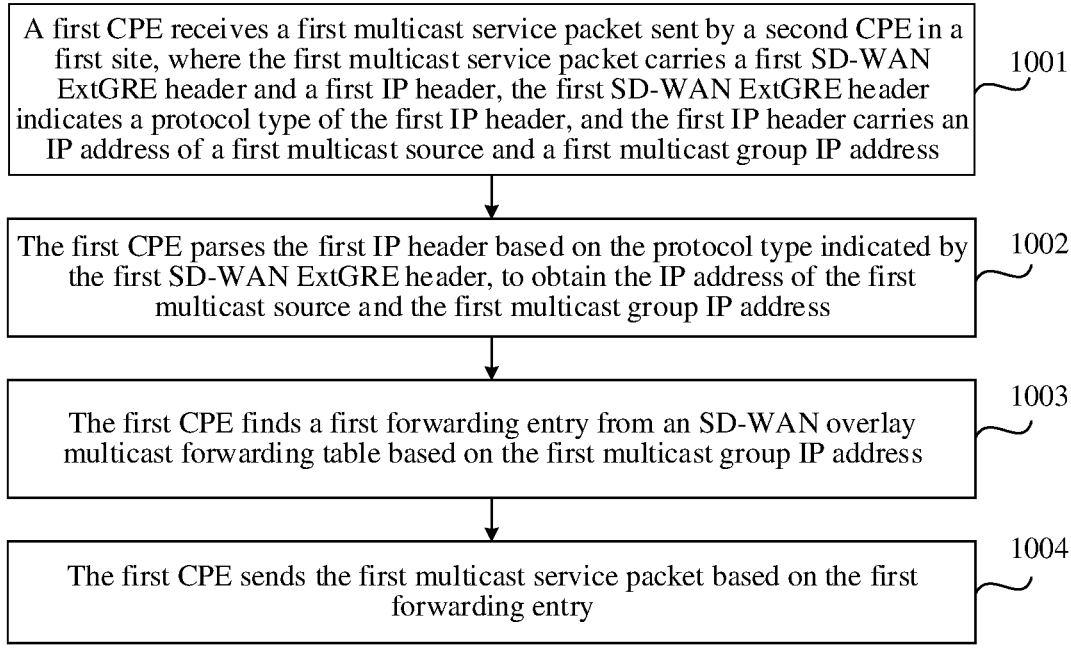

A first CPE receives a first multicast service packet sent by a second CPE in a first site, where the first multicast service packet carries a first SD-WAN ExtGRE header and a first IP header, the first SD-WAN ExtGRE header indicates a protocol type of the first IP header, and the first IP header carries an IP address of a first multicast source and a first multicast group IP address — 1001

The first CPE parses the first IP header based on the protocol type indicated by the first SD-WAN ExtGRE header, to obtain the IP address of the first multicast source and the first multicast group IP address — 1002

The first CPE finds a first forwarding entry from an SD-WAN overlay multicast forwarding table based on the first multicast group IP address — 1003

The first CPE sends the first multicast service packet based on the first forwarding entry — 1004

FIG. 10

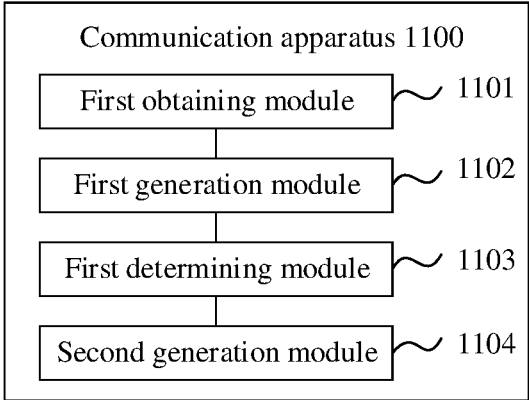

Communication apparatus 1100

First obtaining module — 1101

First generation module — 1102

First determining module — 1103

Second generation module — 1104

FIG. 11

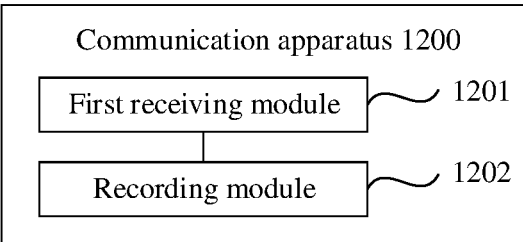

Communication apparatus 1200

First receiving module — 1201

Recording module — 1202

FIG. 12

COMMUNICATION METHOD IN SOFTWARE-DEFINED WIDE AREA NETWORKS (SD-WAN) AND RELATED APPARATUS

CROSS-REFERENCE TO RELATED APPLICATIONS

This application claims priority to Chinese Patent Application No. 202210983481.7, filed on Aug. 16, 2022, which is hereby incorporated by reference in its entirety.

TECHNICAL FIELD

This application relates to the field of communication technologies, and in particular, to a communication method and a related apparatus.

BACKGROUND

A software-defined wide area network (SD-WAN) is a service formed by applying a software-defined network (SDN) technology to a wide area network scenario. The service is for connecting enterprise networks, data centers, internet applications, cloud services, and the like in a wide geographical range. A headquarters site-branch site (HUB-SPOKE) architecture is usually used for SD-WAN networking. For example, the SD-WAN connects the enterprise networks in the wide geographical range. A headquarters site is usually deployed in enterprise headquarters, and branch sites are deployed in enterprise branch areas. Any two sites interact with each other across the internet, for example, a carrier network. How to implement a multicast service in the SD-WAN is a hot research topic currently.

SUMMARY

This application provides a communication method and a related apparatus, to implement SD-WAN overlay multicast communication, that is, to implement a cross-internet multicast function in an SD-WAN scenario, and reduce impact of a multicast service on the internet. Configuration and deployment of the solutions are simple, coupling to an underlay network is quite weak, and impact on the underlay network is little. The technical solutions are as follows:

According to a first aspect, a communication method is provided. The method includes:

A first customer-premises equipment (CPE) obtains node information of each of a plurality of CPEs in an SD-WAN overlay network, where the node information of the CPE includes an identifier of the CPE and information about an SD-WAN link on which the CPE is located, and the first CPE is one of the plurality of CPEs. The first CPE generates an SD-WAN overlay network topology based on the node information of each of the plurality of CPEs. The first CPE determines, based on the SD-WAN overlay network topology, an overlay route from the first CPE to each of a plurality of destination CPEs, where the plurality of destination CPEs include a CPE other than the first CPE in the plurality of CPEs. The first CPE generates an SD-WAN overlay routing table based on the overlay route from the first CPE to each of the plurality of destination CPEs.

That is, a CPE can autonomously generate an SD-WAN overlay network topology, calculate an overlay route to another CPE based on the network topology, and further generate an SD-WAN overlay routing table. Subsequently, the CPE can implement, based on the SD-WAN overlay routing table, a communication service including a multicast service and/or a unicast service. The solution improves communication reliability and flexibility.

In an implementation, the SD-WAN overlay routing table is a routing table at a site granularity. The node information of each CPE further includes an identifier of a site to which the CPE belongs, the SD-WAN overlay routing table includes a routing entry corresponding to each of a plurality of destination sites, the routing entry corresponding to the destination site includes an identifier of the destination site and an identifier of a next-hop site that is of the first CPE and via which data of the first CPE reaches the destination site, and the plurality of destination sites include sites to which the plurality of destination CPEs belong.

The SD-WAN overlay routing table at the site granularity can be for implementing multicast communication. For example, the first CPE can transfer a multicast join message based on the SD-WAN overlay routing table at the site granularity, generate an SD-WAN overlay multicast forwarding table at the site granularity in a process of transferring the multicast join message, and send a multicast service packet based on the SD-WAN overlay multicast forwarding table at the site granularity. This is described next.

Optionally, the method further includes: The first CPE obtains a first multicast join message from a second CPE, where the first multicast join message carries first multicast join route information, the first multicast join route information includes a first multicast group IP address, an identifier of the second CPE, an identifier of a first site to which the first CPE belongs, and an identifier of a second site to which the second CPE belongs, and the second CPE is one of the plurality of CPEs. The first CPE queries the SD-WAN overlay routing table for a routing entry corresponding to a first destination site, to obtain a first routing entry, where the first destination site is a site to which a multicast rendezvous point belongs. The first CPE obtains an identifier of a next-hop site in the first routing entry, to obtain an identifier of a third site. The first CPE generates a second multicast join message based on the identifier of the third site and the first multicast join message, where the second multicast join message carries second multicast join route information, and the second multicast join route information includes the first multicast group internet protocol (IP) address, an identifier of the first CPE, the identifier of the third site, and the identifier of the first site. The first CPE transfers the second multicast join message to a CPE in the third site through an SD-WAN link between the first CPE and the CPE in the third site based on the identifier of the third site.

The first multicast group IP address carried in the first multicast join message is an IP address of a first multicast group that a first multicast member requests to join. The first multicast join message is a (*. G) message, where '*' indicates that a multicast member does not obtain an IP address of a multicast source temporarily, and 'G' represents a multicast group. A destination of the (*. G) message is a multicast rendezvous point.

In addition, the first multicast join route information carried in the first multicast join message includes a first route key and a first route attribute. The first route key includes the first multicast group IP address and the identifier of the second CPE. The first route attribute includes the identifier of the first site and the identifier of the second site. Optionally, the first route attribute includes a virtual route import (VRI) attribute and a tunnel encapsulation attribute (TEA). The VRI attribute includes the identifier of the first site, and the TEA includes the identifier of the second site.

Optionally, the first multicast join message further carries indication information of a target route type, and the indication information indicates the first CPE to parse the first multicast join route information based on the target route type.

The first multicast join message and the second multicast join message are transferred based on a border gateway protocol (BGP)-next generation-multicast virtual private network (NG-MVPN) address family, where the BGP NG-MVPN address family corresponds to the target route type. Alternatively, the first multicast join message and the second multicast join message are transferred based on a BGP-ethernet virtual private network (EVPN) address family, where the BGP EVPN address family corresponds to the target route type. It should be understood that the target route type is extended in the BGP NG-MVPN address family or the BGP EVPN address family to advertise an overlay multicast join route.

The method further includes: The first CPE generates a first forwarding entry in an SD-WAN overlay multicast forwarding table at a site granularity in a process of transferring the first multicast join message, where a multicast group IP address in the first forwarding entry is the first multicast group IP address, an egress site identifier in the first forwarding entry is the identifier of the second site, and an ingress site identifier in the first forwarding entry is the identifier of the third site. It should be understood that a (*. G) forwarding entry in the SD-WAN overlay multicast forwarding table at the site granularity includes a multicast group IP address, an egress site identifier, and an ingress site identifier, and an (S. G) forwarding entry includes a multicast source IP address, a multicast group IP address, an egress site identifier, and an ingress site identifier. The first forwarding entry generated by the first CPE in the process of transferring the first multicast join message is a (*. G) forwarding entry.

Optionally, the method further includes: The first CPE obtains a third multicast join message from a third CPE, where the third multicast join message carries third multicast join route information, the third multicast join route information includes an IP address of a first multicast source, the first multicast group IP address, an identifier of the third CPE, the identifier of the first site to which the first CPE belongs, and an identifier of a fourth site to which the third CPE belongs, and the third CPE is one of the plurality of CPEs. The first CPE queries the SD-WAN overlay routing table for a routing entry corresponding to a second destination site, to obtain a second routing entry, where the second destination site is a site accessed by the first multicast source. The first CPE obtains an identifier of a next-hop site in the second routing entry, to obtain an identifier of a fifth site. The first CPE generates a fourth multicast join message based on the identifier of the fifth site and the third multicast join message, where the fourth multicast join message carries fourth multicast join route information, and the fourth multicast join route information includes the IP address of the first multicast source, the first multicast group IP address, the identifier of the first CPE, the identifier of the fifth site, and the identifier of the first site. The first CPE transfers the fourth multicast join message to a CPE in the fifth site through an SD-WAN link between the first CPE and the CPE in the fifth site based on the identifier of the fifth site.

The third multicast join message is an (S. G) message, where 'S' represents a multicast source. A destination of the (S. G) message is the multicast source.

The first CPE generates a first forwarding entry in an SD-WAN overlay multicast forwarding table in a process of transferring the third multicast join message, where a multicast source IP address in the first forwarding entry is the IP address of the first multicast source, a multicast group IP address in the first forwarding entry is the first multicast group IP address, an egress site identifier in the first forwarding entry is the identifier of the fourth site, and an ingress site identifier in the first forwarding entry is the identifier of the fifth site. The first forwarding entry generated by the first CPE in the process of transferring the first multicast join message is an (S. G) forwarding entry: The process may be understood as that the first CPE updates the foregoing (*. G) forwarding entry: to obtain the (S. G) forwarding entry.

Optionally, the method further includes: The first CPE receives, after generating the first forwarding entry in the SD-WAN overlay multicast forwarding table at the site granularity, a first multicast service packet sent by a fourth CPE in the fifth site, where the first multicast service packet includes a first SD-WAN extended generic routing encapsulation (ExtGRE) header and a first IP header, the first SD-WAN ExtGRE header indicates a protocol type of the first IP header, and the first IP header carries the IP address of the first multicast source and the first multicast group IP address. The first CPE parses the first IP header based on the protocol type indicated by the first SD-WAN ExtGRE header, to obtain the IP address of the first multicast source and the first multicast group IP address. The first CPE queries the SD-WAN overlay multicast forwarding table for a forwarding entry in which a multicast source IP address is the IP address of the first multicast source, a multicast group IP address is the first multicast group IP address, and an ingress site identifier is the identifier of the fifth site, to obtain the first forwarding entry. The first CPE obtains the egress site identifier in the first forwarding entry, to obtain the identifier of the fourth site. The first CPE sends the first multicast service packet to a CPE in the fourth site through an SD-WAN link between the first CPE and the CPE in the fourth site based on the identifier of the fourth site.

That the first CPE sends the first multicast service packet to a CPE in the fourth site through an SD-WAN link between the first CPE and the CPE in the fourth site based on the identifier of the fourth site includes: The first CPE obtains local transport network port (TNP) information of an SD-WAN link between each of a part or all of CPEs in the fourth site and the first CPE based on the identifier of the fourth site. The first CPE sends the first multicast service packet through a port indicated by the local TNP information of the SD-WAN link between each of the part or all of the CPEs in the fourth site and the first CPE.

It should be understood that, if the first CPE sends the first multicast service packet to all of the CPEs in the fourth site, even if a CPE in the fourth site is faulty, the first multicast service packet can be transferred via another CPE in the fourth site, and reliability is higher. If the first CPE sends the first multicast service packet to the part of the CPEs in the fourth site according to a load balance policy, in a random sending manner, or in another manner, a resource waste can be reduced.

In the solution, an SD-WAN-related protocol is extended to send a multicast service packet. For example, an IP header is added after an SD-WAN ExtGRE header in a structure of a unicast service packet to send the multicast service packet. Because the added IP header is a standard IP header, the solution has quite strong generalization and applicability, and has good compatibility with an existing SD-WAN technology.

In another implementation, the SD-WAN overlay routing table is a routing table at a CPE granularity: The SD-WAN overlay routing table includes a routing entry corresponding to each of the plurality of destination CPEs, the routing entry corresponding to the destination CPE includes an identifier of the destination CPE, and local transport network port (TNP) information and peer TNP information of a target SD-WAN link, the target SD-WAN link is an SD-WAN link between the first CPE and a next-hop CPE that is of the first CPE and via which data of the first CPE reaches the destination CPE, and the peer TNP information is TNP information of the next-hop CPE that is of the first CPE and via which the data of the first CPE reaches the destination CPE.

The SD-WAN overlay routing table at the CPE granularity can be for implementing multicast communication. For example, the first CPE can transfer a multicast join message based on the SD-WAN overlay routing table at the CPE granularity, generate an SD-WAN overlay multicast forwarding table at the site granularity or the CPE granularity in a process of transferring the multicast join message, and send a multicast service packet based on the SD-WAN overlay multicast forwarding table at the site granularity or the CPE granularity. This is described next.

Optionally, the method further includes:

The first CPE obtains a fifth multicast join message from a fifth CPE, where the fifth multicast join message carries fifth multicast join route information, the fifth multicast join route information includes a second multicast group IP address, an identifier of the fifth CPE, an identifier of a first site to which the first CPE belongs, and an identifier of a sixth site to which the fifth CPE belongs, where the fifth CPE is one of the plurality of CPEs. The first CPE queries the SD-WAN overlay routing table for a routing entry corresponding to a first destination CPE, to obtain a third routing entry, where the first destination CPE is a CPE corresponding to a multicast rendezvous point. The first CPE obtains local TNP information and peer TNP information in the third routing entry. The first CPE queries, based on the obtained peer TNP information, for an identifier of a site to which a next-hop CPE that is of the first CPE and via which the data of the first CPE reaches the first destination CPE belongs, to obtain an identifier of a seventh site. The first CPE generates a sixth multicast join message based on the identifier of the seventh site and the fifth multicast join message, where the sixth multicast join message carries sixth multicast join route information, and the sixth multicast join route information includes the second multicast group IP address, an identifier of the first CPE, the identifier of the seventh site, and the identifier of the first site. The first CPE sends the sixth multicast join message through a port indicated by the obtained local TNP information.

The second multicast group IP address carried in the fifth multicast join message is an IP address of a second multicast group that a second multicast member requests to join. The fifth multicast join message is a (*. G) message.

The method further includes: The first CPE generates a second forwarding entry in an SD-WAN overlay multicast forwarding table at the site granularity in a process of transferring the fifth multicast join message, where a multicast group IP address in the second forwarding entry is the second multicast group IP address, an egress site identifier in the second forwarding entry is the identifier of the sixth site, and an ingress site identifier in the second forwarding entry is the identifier of the seventh site. The second forwarding entry generated by the first CPE in the process of transferring the fifth multicast join message is a (*. G) forwarding entry. It should be understood that, because the fifth multicast join message carries the identifiers of the sites, the first CPE generates the SD-WAN overlay multicast forwarding table at the site granularity in the process of transferring the fifth multicast join message.

Optionally: the method further includes: The first CPE obtains a seventh multicast join message from a fifth CPE, where the seventh multicast join message carries seventh multicast join route information, the seventh multicast join route information includes a second multicast group IP address, an identifier of the fifth CPE, first TNP information of the first CPE, and second TNP information of the fifth CPE, and the fifth CPE is one of the plurality of CPEs. The first CPE queries the SD-WAN overlay routing table for a routing entry corresponding to a first destination CPE, to obtain a third routing entry, where the first destination CPE is a CPE corresponding to a multicast rendezvous point. The first CPE obtains local TNP information and peer TNP information in the third routing entry. The first CPE generates an eighth multicast join message based on the obtained peer TNP information and the seventh multicast join message, where the eighth multicast join message carries eighth multicast join route information, and the eighth multicast join route information includes the second multicast group IP address, an identifier of the first CPE, the obtained peer TNP information, and the first TNP information. The first CPE sends the eighth multicast join message through a port indicated by the obtained local TNP information.

The method further includes: The first CPE generates a third forwarding entry in an SD-WAN overlay multicast forwarding table at the CPE granularity in a process of transferring the seventh multicast join message, where a multicast IP address in the third forwarding entry is the second multicast group IP address, egress port information in the third forwarding entry is the second TNP information, and ingress port information in the third forwarding entry is the obtained peer TNP information. The third forwarding entry generated by the first CPE in the process of transferring the seventh multicast join message is a (*, G) forwarding entry. It should be understood that, because the seventh multicast join message carries TNP information of a CPE, the first CPE generates the SD-WAN overlay multicast forwarding table at the CPE granularity in the process of transferring the seventh multicast join message.

Optionally, the method further includes: The first CPE receives, after generating the third forwarding entry in the SD-WAN overlay multicast forwarding table at the CPE granularity, a second multicast service packet sent by a sixth CPE, where the second multicast service packet includes a second SD-WAN ExtGRE header and a second IP header, the second SD-WAN ExtGRE header indicates a protocol type of the second IP header, and the second IP header carries an IP address of a second multicast source and the second multicast group IP address. The first CPE parses the second IP header based on the protocol type indicated by the second SD-WAN ExtGRE header, to obtain the IP address of the second multicast source and the second multicast group IP address. The first CPE queries the SD-WAN overlay multicast forwarding table for a forwarding entry in which a multicast group IP address is the second multicast group IP address and ingress port information is TNP information of the sixth CPE, to obtain the third forwarding entry. The first CPE obtains the egress port information in the third forwarding entry, to obtain the second TNP information. The first CPE obtains, based on the second TNP information, local TNP information of an SD-WAN link between the first CPE and the fifth CPE. The first CPE sends the second multicast service packet through a port indicated by the local TNP information of the SD-WAN link between the first CPE and the fifth CPE. It should be understood that, if the first CPE sends a multicast service packet based on the SD-WAN overlay multicast forwarding table at the CPE granularity, a resource waste can be reduced to some extent.

According to a second aspect, a communication method is provided. The method includes:

A first CPE in an SD-WAN overlay network receives a first BGP update packet sent by a route reflector (RR), where the first BGP update packet carries an IP address of a first multicast source and an identifier of a first site. The first CPE records the identifier of the first site as an overlay multicast reverse path forwarding (RPF) next-hop site identifier corresponding to the IP address of the first multicast source, where the overlay multicast RPF next-hop site identifier is for guiding the first CPE to transfer a multicast join message and generate an SD-WAN overlay multicast forwarding table in a process of transferring the multicast join message.

In the solution, the RR specifies an overlay multicast RPF route to the CPE to implement SD-WAN overlay multicast communication, and the CPE does not need to perform path computation autonomously, so that a computing power requirement of the CPE is reduced.

Optionally, the first BGP update packet carries first multicast source route information, the first multicast source route information includes a first route prefix and a first extended community attribute, the first route prefix is the IP address of the first multicast source, and the first extended community attribute is the identifier of the first site.

Optionally: the first BGP update packet is transferred based on a BGP-internet protocol version 4-multicast virtual private network instance (ipv4-multicast vpn-instance. IPv4-MVPN instance) address family, and the BGP IPv4-MVPN instance address family corresponds to the first extended community attribute. It should be understood that the first extended community attribute is an extended community attribute defined in a BGP IPv4-MVPN instance address family protocol.

Optionally, the method further includes: The first CPE obtains a first multicast join message from a second CPE, where the first multicast join message carries first multicast join route information, the first multicast join route information includes the IP address of the first multicast source, a first multicast group internet protocol IP address, an identifier of the second CPE, an identifier of a second site to which the first CPE belongs, and an identifier of a third site to which the second CPE belongs, and the second CPE is one of a plurality of CPEs in the SD-WAN overlay network. The first CPE generates a second multicast join message based on the first multicast join message and the multicast RPF next-hop site identifier corresponding to the IP address of the first multicast source, where the second multicast join message carries second multicast join route information, and the second multicast join route information includes the IP address of the first multicast source, the first multicast group IP address, an identifier of the first CPE, the identifier of the first site, and the identifier of the second site. The first CPE transfers the second multicast join message to a CPE in the first site through an SD-WAN link between the first CPE and the CPE in the first site based on the multicast RPF next-hop site identifier corresponding to the IP address of the first multicast source. It should be understood that the first multicast join message is an (S. G) message. A destination of the (S. G) message is a multicast source. The multicast RPF next-hop site identifier that is recorded by the first CPE and that corresponds to the IP address of the first multicast source is for guiding the first CPE to transfer a multicast join message to the first multicast source.

Optionally, the first multicast join message further carries indication information of a target route type, and the indication information indicates the first CPE to parse the first multicast join route information based on the target route type.

Optionally: the first multicast join message and the second multicast join message are transferred based on a BGP NG-MVPN address family, and the BGP NG-MVPN address family corresponds to the target route type. Alternatively, the first multicast join message and the second multicast join message are transferred based on a BGP EVPN address family, and the BGP EVPN address family corresponds to the target route type. It should be understood that the target route type is extended in the BGP NG-MVPN address family or the BGP EVPN address family to advertise an overlay multicast join route.

Optionally, the method further includes: The first CPE generates a first forwarding entry in the SD-WAN overlay multicast forwarding table in a process of transferring the first multicast join message, where a multicast source IP address in the first forwarding entry is the IP address of the first multicast source, a multicast group IP address in the first forwarding entry is the first multicast group IP address, an egress site identifier in the first forwarding entry is the identifier of the third site, and an ingress site identifier in the first forwarding entry is the identifier of the first site. That is, the first CPE generates the first forwarding entry in the overlay multicast forwarding table at a site granularity in the process of transferring the first multicast join message, where the first forwarding entry is an (S. G) forwarding entry.

Optionally: the method further includes: The first CPE receives a first multicast service packet sent by a third CPE in the first site, where the first multicast service packet includes a first SD-WAN ExtGRE header and a first IP header, the first SD-WAN ExtGRE header indicates a protocol type of the first IP header, and the first IP header carries the IP address of the first multicast source and the first multicast group IP address. The first CPE parses the first IP header based on the protocol type indicated by the first SD-WAN ExtGRE header, to obtain the IP address of the first multicast source and the first multicast group IP address. The first CPE queries the SD-WAN overlay multicast forwarding table for a forwarding entry in which a multicast source IP address is the IP address of the first multicast source, a multicast group IP address is the first multicast group IP address, and an ingress site identifier is the identifier of the first site, to obtain the first forwarding entry. The first CPE obtains the egress site identifier in the first forwarding entry, to obtain the identifier of the third site. The first CPE sends the first multicast service packet to a CPE in the third site through an SD-WAN link between the first CPE and the CPE in the third site based on the identifier of the third site.

That the first CPE sends the first multicast service packet to a CPE in the third site through an SD-WAN link between the first CPE and the CPE in the third site based on the identifier of the third site includes: The first CPE obtains local TNP information of an SD-WAN link between each of a part or all of CPEs in the third site and the first CPE based on the identifier of the third site. The first CPE sends the first multicast service packet through a port indicated by the local TNP information of the SD-WAN link between each of the part or all of the CPEs in the third site and the first CPE. It should be understood that reliability is higher if the first CPE sends the first multicast service packet to all of the CPEs in the third site. If the first CPE sends the first multicast service packet to the part of the CPEs in the third site according to a load balance policy, in a random sending manner, or in another manner, a resource waste can be reduced.

According to a third aspect, a communication method is provided. The method includes:

An RR in an SD-WAN overlay network receives a first BGP update packet sent by a first CPE in a first site, where the first BGP update packet carries an IP address of a first multicast source and an identifier of a second site. The RR reflects a second BGP update packet to a CPE in a third site based on a configured overlay unicast path from a branch site to the first multicast source, where the second BGP update packet carries the IP address of the first multicast source and an identifier of the first site. The second BGP update packet indicates the CPE in the third site to record the identifier of the first site as an overlay multicast reverse path forwarding RPF next-hop site identifier corresponding to the IP address of the first multicast source, and the overlay multicast RPF next-hop site identifier is for guiding the CPE in the third site to transfer a multicast join message and generate an SD-WAN overlay multicast forwarding table in a process of transferring the multicast join message.

In the solution, the RR specifies an overlay multicast RPF route to a CPE to implement SD-WAN overlay multicast communication, and the CPE does not need to perform path computation autonomously, so that a computing power requirement of the CPE is reduced.

Optionally, the first site and the second site are different sites. The method further includes: The RR generates the second BGP update packet based on the identifier of the first site and the first BGP update packet. That is, the RR modifies the overlay multicast RPF next-hop site identifier hop by hop.

Optionally, the first BGP update packet carries first multicast source route information, the first multicast source route information includes a first route prefix and a first extended community attribute, the first route prefix is the IP address of the first multicast source, and the first extended community attribute is the identifier of the second site.

Optionally, the first BGP update packet is transferred based on a BGP IPV4-MVPN instance address family. The BGP IPv4-MVPN instance address family corresponds to the first extended community attribute. In other words, the extended community attribute is an extended community attribute defined in a BGP IPv4-MVPN instance address family protocol in the solution, and the extended community attribute is for specifying the overlay multicast RPF next-hop site identifier.

Optionally, the RR receives configuration data delivered by a controller, where the configuration data indicates an overlay unicast path from a branch site to the first multicast source. That is, the overlay multicast RPF next-hop site identifier is specified on the RR through configuration of the AC. The configuration data is generated through orchestration of management personnel, or the configuration data is generated by the controller by performing path computation automatically based on an SD-WAN overlay network topology.

It should be understood that the second aspect and the third aspect may be combined and applied to an overlay network in an SD-WAN scenario, to implement multicast communication.

According to a fourth aspect, a communication method is provided. The method includes:

A first CPE obtains a first multicast join message from a second CPE, where the first multicast join message carries first multicast join route information, the first multicast join route information includes a first multicast group IP address, an identifier of the second CPE, an identifier of a first site to which the first CPE belongs, and an identifier of a second site to which the second CPE belongs, and the first CPE and the second CPE are CPEs in a plurality of CPEs in an SD-WAN overlay network. The first CPE generates a second multicast join message based on the first multicast join message, where the second multicast join message carries second multicast join route information, and the second multicast join route information includes the first multicast group IP address, an identifier of the first CPE, an identifier of a third site, and the identifier of the first site. The first CPE transfers the second multicast join message to a CPE in the third site through an SD-WAN link between the first CPE and the CPE in the third site.

In the solution, an identifier of a CPE and identifiers of sites are carried in a multicast join message to implement overlay multicast communication in an SD-WAN scenario.

The first multicast join route information carried in the first multicast join message includes a first route key and a first route attribute. The first route key includes the first multicast group IP address and the identifier of the second CPE. The first route attribute includes the identifier of the first site and the identifier of the second site. Optionally, the first route attribute includes a VRI attribute and a TEA. The VRI attribute includes the identifier of the first site, and the TEA includes the identifier of the second site.

Optionally, the first multicast join message further carries indication information of a target route type, and the indication information indicates the first CPE to parse the first multicast join route information based on the target route type, and indicates that the first multicast join message is for advertising the first multicast join route information.

Optionally, the first multicast join message and the second multicast join message are transferred based on a BGP NG-MVPN address family, and the BGP NG-MVPN address family corresponds to the target route type. Alternatively, the first multicast join message and the second multicast join message are transferred based on a BGP EVPN address family, and the BGP EVPN address family corresponds to the target route type. It should be understood that the target route type is extended in the BGP NG-MVPN address family or the BGP EVPN address family to transfer an overlay multicast join route. The VRI attribute and the TEA correspond to two target route types extended in the solution. For example, the two target route types are extended in the BGP NG-MVPN address family or the BGP EVPN address family to perform overlay multicast join, and the two target route types correspond to the VRI attribute and the TEA respectively.

A first implementation in which the first CPE generates the second multicast join message based on the first multicast join message is: The first CPE generates the second multicast join message based on an SD-WAN overlay routing table and the first multicast join message.

The SD-WAN overlay routing table is a routing table at a site granularity or a routing table at a CPE granularity. Based on this, the first CPE generates the second multicast join message based on the SD-WAN overlay routing table at the site granularity and the first multicast join message, or generates the second multicast join message based on the SD-WAN overlay routing table at the CPE granularity and the first multicast join message. This is described next.

In an implementation in which the SD-WAN overlay routing table is the routing table at the site granularity: the SD-WAN overlay routing table includes a routing entry corresponding to each of a plurality of destination sites, the routing entry corresponding to the destination site includes an identifier of the destination site and an identifier of a next-hop site that is of the first CPE and via which data of the first CPE reaches the destination site, and the plurality of destination sites include a site to which a CPE other than the first CPE in the plurality of CPEs belongs. That the first CPE generates the second multicast join message based on an SD-WAN overlay routing table and the first multicast join message includes: The first CPE queries the SD-WAN overlay routing table for a routing entry corresponding to a first destination site, to obtain a first routing entry: where the first destination site is a site to which a multicast rendezvous point belongs. The first CPE obtains an identifier of a next-hop site in the first routing entry, to obtain the identifier of the third site. The first CPE generates the second multicast join message based on the identifier of the third site and the first multicast join message. That the first CPE transfers the second multicast join message to a CPE in the third site through an SD-WAN link between the first CPE and the CPE in the third site includes: The first CPE obtains local transport network port TNP information of an SD-WAN link between each of a part or all of CPEs in the third site and the first CPE. The first CPE sends the second multicast join message through a port indicated by the local TNP information of the SD-WAN link between each of the part or all of the CPEs in the third site and the first CPE.

In an implementation in which the SD-WAN overlay routing table is the routing table at the CPE granularity, the SD-WAN overlay routing table includes a routing entry corresponding to each of a plurality of destination CPEs, the routing entry corresponding to the destination CPE includes an identifier of the destination CPE, and local transport network port TNP information and peer TNP information of a target SD-WAN link, the target SD-WAN link is an SD-WAN link between the first CPE and a next-hop CPE that is of the first CPE and via which data of the first CPE reaches the destination CPE, the peer TNP information is TNP information of the next-hop CPE that is of the first CPE and via which the data of the first CPE reaches the destination CPE, and the plurality of destination CPEs include a CPE other than the first CPE in the plurality of CPEs. That the first CPE generates the second multicast join message based on an SD-WAN overlay routing table and the first multicast join message includes: The first CPE queries the SD-WAN overlay routing table for a routing entry corresponding to a first destination CPE, to obtain a second routing entry, where the first destination CPE is a CPE corresponding to a multicast rendezvous point. The first CPE obtains local TNP information and peer TNP information in a third routing entry. The first CPE queries, based on the obtained peer TNP information, for an identifier of a site to which a next-hop CPE that is of the first CPE and via which the data of the first CPE reaches the first destination CPE belongs, to obtain the identifier of the third site. The first CPE generates the second multicast join message based on the identifier of the third site and the first multicast join message. That the first CPE transfers the second multicast join message to a CPE in the third site through an SD-WAN link between the first CPE and the CPE in the third site includes: The first CPE sends the second multicast join message through a port indicated by the obtained local TNP information.

It should be understood that the first multicast join message is a (*. G) message, and a destination of the (*. G) message is a multicast rendezvous point.

Optionally, the method further includes: The first CPE obtains node information of each of the plurality of CPEs, where the node information of the CPE includes an identifier of the CPE and information about an SD-WAN link on which the CPE is located. The first CPE generates an SD-WAN overlay network topology based on the node information of each of the plurality of CPEs. The first CPE determines, based on the SD-WAN overlay network topology, an overlay route from the first CPE to each of the plurality of destination CPEs, where the plurality of destination CPEs include the CPE other than the first CPE in the plurality of CPEs. The first CPE generates the SD-WAN overlay routing table based on the overlay route from the first CPE to each of the plurality of destination CPEs. Simply speaking, the first CPE generates the SD-WAN overlay routing table by performing path computation autonomously.

It should be understood that an implementation solution in which the first CPE generates the second multicast join message based on the SD-WAN overlay routing table and the first multicast join message may be applied in combination with the communication method provided in the first aspect.

Optionally, the method further includes: The first CPE receives a first BGP update packet sent by an RR, where the first BGP update packet carries an IP address of a multicast rendezvous point and the identifier of the third site. The first CPE records the identifier of the third site as an overlay multicast RPF next-hop site identifier corresponding to the IP address of the multicast rendezvous point. A second implementation in which the first CPE generates a second multicast join message based on the first multicast join message is: The first CPE generates the second multicast join message based on the first multicast join message and the overlay multicast RPF next-hop site identifier corresponding to the IP address of the multicast rendezvous point. Simply speaking, the RR specifies an overlay route from the first CPE to the multicast rendezvous point to the first CPE, so that the first CPE transfers a multicast join message based on the specified overlay route.

It should be understood that an implementation solution in which the first CPE generates the second multicast join message based on the first multicast join message and the overlay multicast RPF next-hop site identifier corresponding to the IP address of the multicast rendezvous point may be applied in combination with the communication methods provided in the second aspect and the third aspect.

Optionally, the method further includes: The first CPE generates a first forwarding entry in an SD-WAN overlay multicast forwarding table, where a multicast group IP address in the first forwarding entry is the first multicast group IP address, an egress site identifier in the first forwarding entry is the identifier of the second site, and an ingress site identifier in the first forwarding entry is the identifier of the third site. Simply speaking, the first CPE generates the SD-WAN overlay multicast forwarding table at a site granularity in a process of transferring the first multicast join message.

Optionally: the method further includes: The first CPE receives a first multicast service packet sent by a third CPE in the third site, where the first multicast service packet includes a first SD-WAN ExtGRE header and a first IP header, the first SD-WAN ExtGRE header indicates a protocol type of the first IP header, and the first IP header carries an IP address of a first multicast source and the first multicast group IP address. The first CPE parses the first IP header based on the protocol type indicated by the first SD-WAN ExtGRE header, to obtain the IP address of the first multicast source and the first multicast group IP address. The first CPE queries the SD-WAN overlay multicast forwarding table for a forwarding entry in which a multicast group IP address is the first multicast group IP address and an ingress site identifier is the identifier of the third site, to obtain the first forwarding entry. The first CPE obtains the egress site identifier in the first forwarding entry, to obtain the identifier of the second site. The first CPE sends the first multicast service packet to a CPE in the second site based on the identifier of the second site.

According to a fifth aspect, a communication method is provided. The method includes:

A first CPE receives a first multicast service packet sent by a second CPE in a first site, where the first multicast service packet includes a first SD-WAN ExtGRE header and a first internet protocol IP header, the first SD-WAN ExtGRE header indicates a protocol type of the first IP header, the first IP header carries an IP address of a first multicast source and a first multicast group IP address, and the first CPE and the second CPE are CPEs in a plurality of CPEs in an SD-WAN overlay network. The first CPE parses the first IP header based on the protocol type indicated by the first SD-WAN ExtGRE header, to obtain the IP address of the first multicast source and the first multicast group IP address. The first CPE finds a first forwarding entry from an SD-WAN overlay multicast forwarding table based on the first multicast group IP address. The first CPE sends the first multicast service packet based on the first forwarding entry.

In the solution, an SD-WAN-related protocol is extended, and specifically, a standard IP header is carried in a newly defined multicast service packet, to send a multicast service packet in an overlay network in an SD-WAN scenario. Because an added IP header is the standard IP header, the solution has quite strong generalization and applicability and has good compatibility with an existing SD-WAN technology.

Optionally, the SD-WAN overlay multicast forwarding table is a multicast forwarding table at a site granularity. A forwarding entry in the SD-WAN overlay multicast forwarding table includes a multicast group IP address, an egress site identifier, and an ingress site identifier. That the first CPE finds a first forwarding entry from an SD-WAN overlay multicast forwarding table based on the first multicast group IP address includes: The first CPE queries the SD-WAN overlay multicast forwarding table for a forwarding entry in which a multicast group IP address is the first multicast group IP address and an ingress site identifier is an identifier of the first site, to obtain the first forwarding entry. That the first CPE sends the first multicast service packet based on the first forwarding entry includes: The first CPE obtains an egress site identifier in the first forwarding entry, to obtain an identifier of a second site. The first CPE sends the first multicast service packet to a CPE in the second site through an SD-WAN link between the first CPE and the CPE in the second site based on the identifier of the second site.

Optionally, that the first CPE sends the first multicast service packet to a CPE in the second site through an SD-WAN link between the first CPE and the CPE in the second site based on the identifier of the second site includes: The first CPE obtains local transport network port TNP information of an SD-WAN link between each of a part or all of CPEs in the second site and the first CPE based on the identifier of the second site. The first CPE sends the first multicast service packet through a port indicated by the local TNP information of the SD-WAN link between each of the part or all of the CPEs in the second site and the first CPE. It should be understood that reliability is higher if the first CPE sends the first multicast service packet to all of the CPEs in the second site. If the first CPE sends the first multicast service packet to the part of the CPEs in the second site according to a load balance policy, in a random sending manner, or in another manner, a resource waste can be reduced.

Optionally, the SD-WAN overlay multicast forwarding table is a multicast forwarding table at a CPE granularity: A forwarding entry in the SD-WAN overlay multicast forwarding table includes a multicast group IP address, egress port information, and ingress port information. That the first CPE finds a first forwarding entry from an SD-WAN overlay multicast forwarding table based on the first multicast group IP address includes: The first CPE queries the SD-WAN overlay multicast forwarding table for a forwarding entry in which a multicast group IP address is the first multicast group IP address and ingress port information is TNP information of the second CPE, to obtain the first forwarding entry. That the first CPE sends the first multicast service packet based on the first forwarding entry includes: The first CPE obtains egress port information in the first forwarding entry, to obtain TNP information of a third CPE. The first CPE obtains, based on the TNP information of the third CPE, local TNP information of an SD-WAN link between the first CPE and the third CPE. The first CPE sends the first multicast service packet through a port indicated by the local TNP information of the SD-WAN link between the first CPE and the third CPE. The first CPE sends the multicast service packet at the CPE granularity: so that a resource waste to some extent can be reduced.

The fifth aspect can be combined with the first aspect to the fourth aspect to implement multicast communication. In the first aspect to the fifth aspect, structures of multicast join messages are consistent, structures of multicast service packets are consistent, structures of SD-WAN overlay multicast forwarding tables at a site granularity are consistent, structures of SD-WAN overlay multicast forwarding tables at a CPE granularity are consistent, structures of SD-WAN overlay routing tables at the site granularity are consistent, and structures of SD-WAN overlay routing tables at the CPE granularity are consistent.

With reference to the first aspect to the fifth aspect, the communication method provided in this application is applied to the SD-WAN overlay network, including but not limited to a single-layer overlay topology and a multi-layer overlay topology. The solution can implement an overlay multicast service function in an SD-WAN flexible topology networking scenario. An SD-WAN flexible topology includes but is not limited to a single-layer flattened overlay topology (for example, a one-hop SD-WAN tunnel between a hub and a spoke) and a hierarchical multi-hop topology (for example, crossing a plurality of segments of SD-WAN tunnels between a branch site and a headquarters site). In addition, configuration and deployment of an SD-WAN overlay multicast solution in the solution are easy: coupling to an underlay network (for example, the internet or a multi-protocol label switching (MPLS) private network) is quite weak, and impact on the underlay network is little. That is, no additional protocol extension or deployment is needed for a device in the underlay network, and the device in the underlay network does not need to sense an overlay multicast service either.

According to a sixth aspect, a communication apparatus is provided, and the communication apparatus has a function of implementing behavior in the communication method in the first aspect. The communication apparatus includes one or more modules, and the one or more modules are configured to implement the communication method provided in the first aspect.

That is, a communication apparatus is provided, the apparatus is used in a first CPE in a plurality of CPEs included in an SD-WAN overlay network, and the apparatus includes:

a first obtaining module, configured to obtain node information of each of the plurality of CPEs, where the node information of the CPE includes an identifier of the CPE and information about an SD-WAN link on which the CPE is located;

a first generation module, configured to generate an SD-WAN overlay network topology based on the node information of each of the plurality of CPEs;

a first determining module, configured to determine, based on the SD-WAN overlay network topology, an overlay route from the first CPE to each of a plurality of destination CPEs, where the plurality of destination CPEs include a CPE other than the first CPE in the plurality of CPEs; and a second generation module, configured to generate an SD-WAN overlay routing table based on the overlay route from the first CPE to each of the plurality of destination CPEs.

Optionally, the node information of each CPE further includes an identifier of a site to which the CPE belongs, the SD-WAN overlay routing table includes a routing entry corresponding to each of a plurality of destination sites, the routing entry corresponding to the destination site includes an identifier of the destination site and an identifier of a next-hop site that is of the first CPE and via which data of the first CPE reaches the destination site, and the plurality of destination sites include sites to which the plurality of destination CPEs belong.

Optionally, the apparatus further includes:

a second obtaining module, configured to obtain a first multicast join message from a second CPE, where the first multicast join message carries first multicast join route information, the first multicast join route information includes a first multicast group IP address, an identifier of the second CPE, an identifier of a first site to which the first CPE belongs, and an identifier of a second site to which the second CPE belongs, and the second CPE is one of the plurality of CPEs;

a first query module, configured to query the SD-WAN overlay routing table for a routing entry corresponding to a first destination site, to obtain a first routing entry, where the first destination site is a site to which a multicast rendezvous point belongs;

a third obtaining module, configured to obtain an identifier of a next-hop site in the first routing entry, to obtain an identifier of a third site;

a third generation module, configured to generate a second multicast join message based on the identifier of the third site and the first multicast join message, where the second multicast join message carries second multicast join route information, and the second multicast join route information includes the first multicast group IP address, an identifier of the first CPE. the identifier of the third site, and the identifier of the first site; and a first transfer module, configured to transfer the second multicast join message to a CPE in the third site through an SD-WAN link between the first CPE and the CPE in the third site based on the identifier of the third site.

Optionally: the first multicast join message further carries indication information of a target route type, and the indication information indicates the first CPE to parse the first multicast join route information based on the target route type.

Optionally: the first multicast join message and the second multicast join message are transferred based on a BGP NG-MVPN address family, and the BGP NG-MVPN address family corresponds to the target route type; or the first multicast join message and the second multicast join message are transferred based on a BGP EVPN address family, and the BGP EVPN address family corresponds to the target route type.

Optionally, the apparatus further includes:

a fourth generation module, configured to generate a first forwarding entry in an SD-WAN overlay multicast forwarding table, where a multicast group IP address in the first forwarding entry is the first multicast group IP address, an egress site identifier in the first forwarding entry is the identifier of the second site, and an ingress site identifier in the first forwarding entry is the identifier of the third site.

Optionally, the second obtaining module is further configured to obtain a third multicast join message from a third CPE, where the third multicast join message carries third multicast join route information, the third multicast join route information includes an IP address of a first multicast source, the first multicast group IP address, an identifier of the third CPE, the identifier of the first site to which the first CPE belongs, and an identifier of a fourth site to which the third CPE belongs, and the third CPE is one of the plurality of CPEs.

The first query module is further configured to query the SD-WAN overlay routing table for a routing entry corresponding to a second destination site, to obtain a second routing entry, where the second destination site is a site accessed by the first multicast source.

The third obtaining module is further configured to obtain an identifier of a next-hop site in the second routing entry, to obtain an identifier of a fifth site.

The third generation module is further configured to generate a fourth multicast join message based on the identifier of the fifth site and the third multicast join message, where the fourth multicast join message carries fourth multicast join route information, and the fourth multicast join route information includes the IP address of the first multicast source, the first multicast group IP address, the identifier of the first CPE, the identifier of the fifth site, and the identifier of the first site.

The first transfer module is further configured to transfer the fourth multicast join message to a CPE in the fifth site through an SD-WAN link between the first CPE and the CPE in the fifth site based on the identifier of the fifth site.

Optionally, the fourth generation module is further configured to:

generate a first forwarding entry in an SD-WAN overlay multicast forwarding table, where a multicast source IP address in the first forwarding entry is the IP address of the first multicast source, a multicast group IP address in the first forwarding entry is the first multicast group IP address, an egress site identifier in the first forwarding entry is the identifier of the fourth site, and an ingress site identifier in the first forwarding entry is the identifier of the fifth site.

Optionally, the apparatus further includes:

a first receiving module, configured to receive a first multicast service packet sent by a fourth CPE in the fifth site, where the first multicast service packet includes a first SD-WAN ExtGRE header and a first IP header, the first SD-WAN ExtGRE header indicates a protocol type of the first IP header, and the first IP header carries the IP address of the first multicast source and the first multicast group IP address;

a first parsing module, configured to parse the first IP header based on the protocol type indicated by the first SD-WAN ExtGRE header, to obtain the IP address of the first multicast source and the first multicast group IP address;

a second query module, configured to query, for the first CPE, the SD-WAN overlay multicast forwarding table for a forwarding entry in which a multicast source IP address is the IP address of the first multicast source, a multicast group IP address is the first multicast group IP address, and an ingress site identifier is the identifier of the fifth site, to obtain the first forwarding entry;

a fourth obtaining module, configured to obtain the egress site identifier in the first forwarding entry, to obtain the identifier of the fourth site; and a first sending module, configured to send the first multicast service packet to a CPE in the fourth site through an SD-WAN link between the first CPE and the CPE in the fourth site based on the identifier of the fourth site.

Optionally, the first sending module includes:

an obtaining submodule, configured to obtain local TNP information of an SD-WAN link between each of a part or all of CPEs in the fourth site and the first CPE based on the identifier of the fourth site; and a sending submodule, configured to send the first multicast service packet through a port indicated by the local TNP information of the SD-WAN link between each of the part or all of the CPEs in the fourth site and the first CPE.

Optionally, the SD-WAN overlay routing table includes a routing entry corresponding to each of the plurality of destination CPEs, the routing entry corresponding to the destination CPE includes an identifier of the destination CPE, and local TNP information and peer TNP information of a target SD-WAN link, the target SD-WAN link is an SD-WAN link between the first CPE and a next-hop CPE that is of the first CPE and via which data of the first CPE reaches the destination CPE, and the peer TNP information is TNP information of the next-hop CPE that is of the first CPE and via which the data of the first CPE reaches the destination CPE.

Optionally, the apparatus further includes:

a fifth obtaining module, configured to obtain a fifth multicast join message from a fifth CPE, where the fifth multicast join message carries fifth multicast join route information, the fifth multicast join route information includes a second multicast group IP address, an identifier of the fifth CPE, an identifier of a first site to which the first CPE belongs, and an identifier of a sixth site to which the fifth CPE belongs, where the fifth CPE is one of the plurality of CPEs;

a third query module, configured to query the SD-WAN overlay routing table for a routing entry corresponding to a first destination CPE, to obtain a third routing entry, where the first destination CPE is a CPE corresponding to a multicast rendezvous point;

a sixth obtaining module, configured to obtain local TNP information and peer TNP information in the third routing entry;

a fourth query module, configured to query, based on the obtained peer TNP information, for an identifier of a site to which a next-hop CPE that is of the first CPE and via which the data of the first CPE reaches the first destination CPE belongs, to obtain an identifier of a seventh site;

a fifth generation module, configured to generate a sixth multicast join message based on the identifier of the seventh site and the fifth multicast join message, where the sixth multicast join message carries sixth multicast join route information, and the sixth multicast join route information includes the second multicast group IP address, an identifier of the first CPE, the identifier of the seventh site, and the identifier of the first site; and a second sending module, configured to send the sixth multicast join message through a port indicated by the obtained local TNP information.

Optionally, the apparatus further includes:

a sixth generation module, configured to generate a second forwarding entry in an SD-WAN overlay multicast forwarding table, where a multicast group IP address in the second forwarding entry is the second multicast group IP address, an egress site identifier in the second forwarding entry is the identifier of the sixth site, and an ingress site identifier in the second forwarding entry is the identifier of the seventh site.

Optionally, the apparatus further includes:

a seventh obtaining module, configured to obtain a seventh multicast join message from a fifth CPE, where the seventh multicast join message carries seventh multicast join route information, the seventh multicast join route information includes a second multicast group IP address, an identifier of the fifth CPE, first TNP information of the first CPE, and second TNP information of the fifth CPE, and the fifth CPE is one of the plurality of CPEs;

a fifth query module, configured to query the SD-WAN overlay routing table for a routing entry corresponding to a first destination CPE, to obtain a third routing entry, where the first destination CPE is a CPE corresponding to a multicast rendezvous point;

an eighth obtaining module, configured to obtain local TNP information and peer TNP information in the third routing entry;

a seventh generation module, configured to generate an eighth multicast join message based on the obtained peer TNP information and the seventh multicast join message, where the eighth multicast join message carries eighth multicast join route information, and the eighth multicast join route information includes the second multicast group IP address, an identifier of the first CPE, the obtained peer TNP information, and the first TNP information; and a third sending module, configured to send the eighth multicast join message through a port indicated by the obtained local TNP information.

Optionally, the apparatus further includes:

an eighth generation module, configured to generate a third forwarding entry in an SD-WAN overlay multicast forwarding table, where a multicast IP address in the third forwarding entry is the second multicast group IP address, egress port information in the third forwarding entry is the second TNP information, and ingress port information in the third forwarding entry is the obtained peer TNP information.

Optionally, the apparatus further includes:

a second receiving module, configured to receive a second multicast service packet sent by a sixth CPE, where the second multicast service packet includes a second SD-WAN ExtGRE header and a second IP header, the second SD-WAN ExtGRE header indicates a protocol type of the second IP header, and the second IP header carries an IP address of a second multicast source and the second multicast group IP address;

a second parsing module, configured to parse the second IP header based on the protocol type indicated by the second SD-WAN ExtGRE header, to obtain the IP address of the second multicast source and the second multicast group IP address;

a sixth query module, configured to query the SD-WAN overlay multicast forwarding table for a forwarding entry in which a multicast group IP address is the second multicast group IP address and ingress port information is TNP information of the sixth CPE, to obtain the third forwarding entry;

a ninth obtaining module, configured to obtain the egress port information in the third forwarding entry, to obtain the second TNP information;

a tenth obtaining module, configured to obtain based on the second TNP information, local TNP information of an SD-WAN link between the first CPE and the fifth CPE; and a fourth sending module, configured to send the second multicast service packet through a port indicated by the local TNP information of the SD-WAN link between the first CPE and the fifth CPE.

According to a seventh aspect, a communication apparatus is provided, and the communication apparatus has a function of implementing behavior in the communication method in the second aspect. The communication apparatus includes one or more modules, and the one or more modules are configured to implement the communication method provided in the second aspect.

That is, a communication apparatus is provided, the apparatus is used in a first CPE in a plurality of first CPEs included in an SD-WAN overlay network, and the apparatus includes:

a first receiving module, configured to receive a first BGP update packet sent by a route reflector RR, where the first BGP update packet carries an IP address of a first multicast source and an identifier of a first site; and a recording module, configured to record the identifier of the first site as an overlay multicast RPF next-hop site identifier corresponding to the IP address of the first multicast source, where the overlay multicast RPF next-hop site identifier is for guiding the first CPE to transfer a multicast join message and generate an SD-WAN overlay multicast forwarding table in a process of transferring the multicast join message.

Optionally, the first BGP update packet carries first multicast source route information, the first multicast source route information includes a first route prefix and a first extended community attribute, the first route prefix is the IP address of the first multicast source, and the first extended community attribute is the identifier of the first site.

Optionally, the first BGP update packet is transferred based on a BGP IPV4-MVPN instance address family, and the BGP IPv4-MVPN instance address family corresponds to the first extended community attribute.

Optionally, the apparatus further includes:

a first obtaining module, configured to obtain a first multicast join message from a second CPE, where the first multicast join message carries first multicast join route information, the first multicast join route information includes the IP address of the first multicast source, a first multicast group internet protocol IP address, an identifier of the second CPE, an identifier of a second site to which the first CPE belongs, and an identifier of a third site to which the second CPE belongs, and the second CPE is one of the plurality of CPEs;

a first generation module, configured to generate a second multicast join message based on the first multicast join message and the multicast RPF next-hop site identifier corresponding to the IP address of the first multicast source, where the second multicast join message carries second multicast join route information, and the second multicast join route information includes the IP address of the first multicast source, the first multicast group IP address, an identifier of the first CPE, the identifier of the first site, and the identifier of the second site; and a transfer module, configured to transfer the second multicast join message to a CPE in the first site through an SD-WAN link between the first CPE and the CPE in the first site based on the multicast RPF next-hop site identifier corresponding to the IP address of the first multicast source.

Optionally, the first multicast join message further carries indication information of a target route type, and the indication information indicates the first CPE to parse the first multicast join route information based on the target route type.

Optionally, the apparatus further includes:

a second generation module, configured to generate a first forwarding entry in the SD-WAN overlay multicast forwarding table, where a multicast source IP address in the first forwarding entry is the IP address of the first multicast source, a multicast group IP address in the first forwarding entry is the first multicast group IP address, an egress site identifier in the first forwarding entry is the identifier of the third site, and an ingress site identifier in the first forwarding entry is the identifier of the first site.

Optionally, the apparatus further includes:

a second receiving module, configured to receive a first multicast service packet sent by a third CPE in the first site, where the first multicast service packet includes a first SD-WAN ExtGRE header and a first IP header, the first SD-WAN ExtGRE header indicates a protocol type of the first IP header, and the first IP header carries the IP address of the first multicast source and the first multicast group IP address;

a parsing module, configured to parse the first IP header based on the protocol type indicated by the first SD-WAN ExtGRE header, to obtain the IP address of the first multicast source and the first multicast group IP address;

a query module, configured to query the SD-WAN overlay multicast forwarding table for a forwarding entry in which a multicast source IP address is the IP address of the first multicast source, a multicast group IP address is the first multicast group IP address, and an ingress site identifier is the identifier of the first site, to obtain the first forwarding entry;

a second obtaining module, configured to obtain the egress site identifier in the first forwarding entry, to obtain the identifier of the third site; and a sending module, configured to send the first multicast service packet to a CPE in the third site through an SD-WAN link between the first CPE and the CPE in the third site based on the identifier of the third site.

According to an eighth aspect, a communication apparatus is provided, and the communication apparatus has a function of implementing behavior in the communication method in the third aspect. The communication apparatus includes one or more modules, and the one or more modules are configured to implement the communication method provided in the third aspect.

That is, a communication apparatus is provided, the apparatus is used in a route reflector RR in an SD-WAN overlay network, and the apparatus includes:

a receiving module, configured to receive a first BGP update packet sent by a first CPE in a first site, where the first BGP update packet carries an IP address of a first multicast source and an identifier of a second site; and a reflection module, configured to reflect a second BGP update packet to a CPE in a third site based on a configured overlay unicast path from a branch site to the first multicast source, where the second BGP update packet carries the IP address of the first multicast source and an identifier of the first site, where the second BGP update packet indicates the CPE in the third site to record the identifier of the first site as an overlay multicast RPF next-hop site identifier corresponding to the IP address of the first multicast source, and the overlay multicast RPF next-hop site identifier is for guiding the CPE in the third site to transfer a multicast join message and generate an SD-WAN overlay multicast forwarding table in a process of transferring the multicast join message.

Optionally, the first site and the second site are different sites, and the apparatus further includes:

a generation module, configured to generate the second BGP update packet based on the identifier of the first site and the first BGP update packet.

Optionally, the first BGP update packet carries first multicast source route information, the first multicast source route information includes a first route prefix and a first extended community attribute, the first route prefix is the IP address of the first multicast source, and the first extended community attribute is the identifier of the second site.

According to a ninth aspect, a communication apparatus is provided, and the communication apparatus has a function of implementing behavior in the communication method in the fourth aspect. The communication apparatus includes one or more modules, and the one or more modules are configured to implement the communication method provided in the fourth aspect.

That is, a communication apparatus is provided, the apparatus is used in a first CPE in a plurality of CPEs included in an SD-WAN overlay network, and the apparatus includes:

a first obtaining module, configured to obtain a first multicast join message from a second CPE, where the first multicast join message carries first multicast join route information, the first multicast join route information includes a first multicast group IP address, an identifier of the second CPE, an identifier of a first site to which the first CPE belongs, and an identifier of a second site to which the second CPE belongs, and the second CPE is one of the plurality of CPEs;

a first generation module, configured to generate a second multicast join message based on the first multicast join message, where the second multicast join message carries second multicast join route information, and the second multicast join route information includes the first multicast group IP address, an identifier of the first CPE, an identifier of a third site, and the identifier of the first site; and a transfer module, configured to transfer the second multicast join message to a CPE in the third site through an SD-WAN link between the first CPE and the CPE in the third site.

Optionally, the first generation module includes:

a first generation submodule, configured to generate the second multicast join message based on an SD-WAN overlay routing table and the first multicast join message.

Optionally, the SD-WAN overlay routing table includes a routing entry corresponding to each of a plurality of destination sites, the routing entry corresponding to the destination site includes an identifier of the destination site and an identifier of a next-hop site that is of the first CPE and via which data of the first CPE reaches the destination site, and the plurality of destination sites include a site to which a CPE other than the first CPE in the plurality of CPEs belongs.

The first generation submodule is configured to:

query the SD-WAN overlay routing table for a routing entry corresponding to a first destination site, to obtain a first routing entry, where the first destination site is a site to which a multicast rendezvous point belongs;

obtain an identifier of a next-hop site in the first routing entry, to obtain the identifier of the third site; and generate the second multicast join message based on the identifier of the third site and the first multicast join message.

The transfer module includes:

an obtaining submodule, configured to obtain local TNP information of an SD-WAN link between each of a part or all of CPEs in the third site and the first CPE; and a first sending submodule, configured to send the second multicast join message through a port indicated by the local TNP information of the SD-WAN link between each of the part or all of the CPEs in the third site and the first CPE.

Optionally, the SD-WAN overlay routing table includes a routing entry corresponding to each of a plurality of destination CPEs, the routing entry corresponding to the destination CPE includes an identifier of the destination CPE, and local TNP information and peer TNP information of a target SD-WAN link, the target SD-WAN link is an SD-WAN link between the first CPE and a next-hop CPE that is of the first CPE and via which data of the first CPE reaches the destination CPE, the peer TNP information is TNP information of the next-hop CPE that is of the first CPE and via which the data of the first CPE reaches the destination CPE, and the plurality of destination CPEs include a CPE other than the first CPE in the plurality of CPEs.

The first generation submodule is configured to:

query the SD-WAN overlay routing table for a routing entry corresponding to a first destination CPE, to obtain a second routing entry, where the first destination CPE is a CPE corresponding to a multicast rendezvous point;

obtain local TNP information and peer TNP information in the third routing entry;

query, based on the obtained peer TNP information, for an identifier of a site to which a next-hop CPE that is of the first CPE and via which the data of the first CPE reaches the first destination CPE belongs, to obtain the identifier of the third site; and generate the second multicast join message based on the identifier of the third site and the first multicast join message.

The transfer module includes:

a second sending submodule, configured to send the second multicast join message through a port indicated by the obtained local TNP information.

Optionally, the apparatus further includes:

a second obtaining module, configured to obtain node information of each of the plurality of CPEs, where the node information of the CPE includes an identifier of the CPE and information about an SD-WAN link on which the CPE is located;

a second generation module, configured to generate an SD-WAN overlay network topology based on the node information of each of the plurality of CPEs;

a determining module, configured to determine, based on the SD-WAN overlay network topology: an overlay route from the first CPE to each of a plurality of destination CPEs, where the plurality of destination CPEs include a CPE other than the first CPE in the plurality of CPEs; and a third generation module, configured to generate the SD-WAN overlay routing table based on the overlay route from the first CPE to each of the plurality of destination CPEs.

Optionally, the apparatus further includes:

a first receiving module, configured to receive a first BGP update packet sent by a route reflector RR, where the first BGP update packet carries an IP address of a multicast rendezvous point and the identifier of the third site; and a recording module, configured to record the identifier of the third site as an overlay multicast RPF next-hop site identifier corresponding to the IP address of the multicast rendezvous point; and The first generation module includes:

a second generation submodule, configured to generate the second multicast join message based on the first multicast join message and the overlay multicast RPF next-hop site identifier corresponding to the IP address of the multicast rendezvous point.

Optionally, the apparatus further includes:

a fourth generation module, configured to generate a first forwarding entry in an SD-WAN overlay multicast forwarding table, where a multicast group IP address in the first forwarding entry is the first multicast group IP address, an egress site identifier in the first forwarding entry is the identifier of the second site, and an ingress site identifier in the first forwarding entry is the identifier of the third site.

Optionally, the apparatus further includes:

a second receiving module, configured to receive a first multicast service packet sent by a third CPE in the third site, where the first multicast service packet includes a first SD-WAN ExtGRE header and a first IP header, the first SD-WAN ExtGRE header indicates a protocol type of the first IP header, and the first IP header carries an IP address of a first multicast source and the first multicast group IP address;

a parsing module, configured to parse the first IP header based on the protocol type indicated by the first SD-WAN ExtGRE header, to obtain the IP address of the first multicast source and the first multicast group IP address;

a query module, configured to query the SD-WAN overlay multicast forwarding table for a forwarding entry in which a multicast group IP address is the first multicast group IP address and an ingress site identifier is the identifier of the third site, to obtain the first forwarding entry;

a third obtaining module, configured to obtain the egress site identifier in the first forwarding entry, to obtain the identifier of the second site; and a sending module, configured to send the first multicast service packet to a CPE in the second site based on the identifier of the second site.

According to a tenth aspect, a communication apparatus is provided, and the communication apparatus has a function of implementing behavior in the communication method in the fifth aspect. The communication apparatus includes one or more modules, and the one or more modules are configured to implement the communication method provided in the fifth aspect.

That is, a communication apparatus is provided, the apparatus is used in a first CPE in a plurality of CPEs included in an SD-WAN overlay network, and the apparatus includes:

a receiving module, configured to receive a first multicast service packet sent by a second CPE in a first site, where the first multicast service packet includes a first SD-WAN ExtGRE header and a first IP header, the first SD-WAN ExtGRE header indicates a protocol type of the first IP header, the first IP header carries an IP address of a first multicast source and a first multicast group IP address, and the second CPE is one of the plurality of CPEs;

a parsing module, configured to parse the first IP header based on the protocol type indicated by the first SD-WAN ExtGRE header, to obtain the IP address of the first multicast source and the first multicast group IP address;

a query module, configured to find a first forwarding entry from an SD-WAN overlay multicast forwarding table based on the first multicast group IP address; and a sending module, configured to send the first multicast service packet based on the first forwarding entry.

Optionally, a forwarding entry in the SD-WAN overlay multicast forwarding table includes a multicast group IP address, an egress site identifier, and an ingress site identifier.

The query module includes:

a first query submodule, configured to query the SD-WAN overlay multicast forwarding table for a forwarding entry in which a multicast group IP address is the first multicast group IP address and an ingress site identifier is an identifier of the first site, to obtain the first forwarding entry.

The sending module includes:

a first obtaining submodule, configured to obtain an egress site identifier in the first forwarding entry, to obtain an identifier of a second site; and a first sending submodule, configured to send the first multicast service packet to a CPE in the second site through an SD-WAN link between the first CPE and the CPE in the second site based on the identifier of the second site.

Optionally; the sending submodule is configured to:

obtain local TNP information of an SD-WAN link between each of a part or all of CPEs in the second site and the first CPE based on the identifier of the second site; and send the first multicast service packet through a port indicated by the local TNP information of the SD-WAN link between each of the part or all of the CPEs in the second site and the first CPE.

Optionally, a forwarding entry in the SD-WAN overlay multicast forwarding table includes a multicast group IP address, egress port information, and ingress port information.

The query module includes:

a second query submodule, configured to query the SD-WAN overlay multicast forwarding table for a forwarding entry in which a multicast group IP address is the first multicast group IP address and ingress port information is TNP information of the second CPE, to obtain the first forwarding entry;

The sending module includes;

a second obtaining module, configured to obtain egress port information in the first forwarding entry, to obtain TNP information of a third CPE;

a third obtaining module, configured to obtain, based on the TNP information of the third CPE, local TNP information of an SD-WAN link between the first CPE and the third CPE; and a second sending submodule, configured to send the first multicast service packet through a port indicated by the local TNP information of the SD-WAN link between the first CPE and the third CPE.

According to an eleventh aspect, a communication apparatus is provided, and includes a processor and a memory. The memory is configured to store a program for performing the communication method provided in the first aspect, and store data for implementing the communication method provided in the first aspect. Alternatively, the memory is configured to store a program for performing the communication method provided in the second aspect, and store data for implementing the communication method provided in the second aspect. Alternatively, the memory is configured to store a program for performing the communication method provided in the third aspect, and store data for implementing the communication method provided in the third aspect. Alternatively, the memory is configured to store a program for performing the communication method provided in the fourth aspect, and store data for implementing the communication method provided in the fourth aspect. Alternatively, the memory is configured to store a program for performing the communication method provided in the fifth aspect, and store data for implementing the communication method provided in the fifth aspect. The processor is configured to execute the program stored in the memory. The communication apparatus may further include a communication bus, and the communication bus is for establishing a connection between the processor and the memory.

According to a twelfth aspect, a computer-readable storage medium is provided. The computer-readable storage medium stores instructions. When the instructions are run on a computer, the computer is enabled to perform the communication method according to the first aspect, the second aspect, the third aspect, the fourth aspect, or the fifth aspect.

According to a thirteenth aspect, a computer program product including instructions is provided. When the computer program product runs on a computer, the computer is enabled to perform the communication method according to the first aspect, the second aspect, the third aspect, the fourth aspect, or the fifth aspect.

Technical effects obtained in the sixth aspect to the thirteenth aspect are similar to technical effects obtained through the corresponding technical means in the first aspect to the fifth aspect.

BRIEF DESCRIPTION OF DRAWINGS

FIG. 4 is a schematic diagram of a structure of a communication device according to an embodiment of this application:

FIG. 5 is a flowchart of a communication method according to an embodiment of this application:

FIG. 6 is a schematic diagram of a structure of a multicast service packet according to an embodiment of this application:

FIG. 7 is a flowchart of another communication method according to an embodiment of this application:

FIG. 8 is a flowchart of still another communication method according to an embodiment of this application:

FIG. 9 is a flowchart of still another communication method according to an embodiment of this application:

FIG. 10 is a flowchart of still another communication method according to an embodiment of this application:

FIG. 11 is a schematic diagram of a structure of a communication apparatus according to an embodiment of this application:

FIG. 12 is a schematic diagram of a structure of another communication apparatus according to an embodiment of this application:

DESCRIPTION OF EMBODIMENTS

To make objectives, technical solutions, and advantages of embodiments of this application clearer, the following further describes the implementations of this application in detail with reference to the accompanying drawings.

An implementation environment in embodiments of this application is described first.

Figure 1:
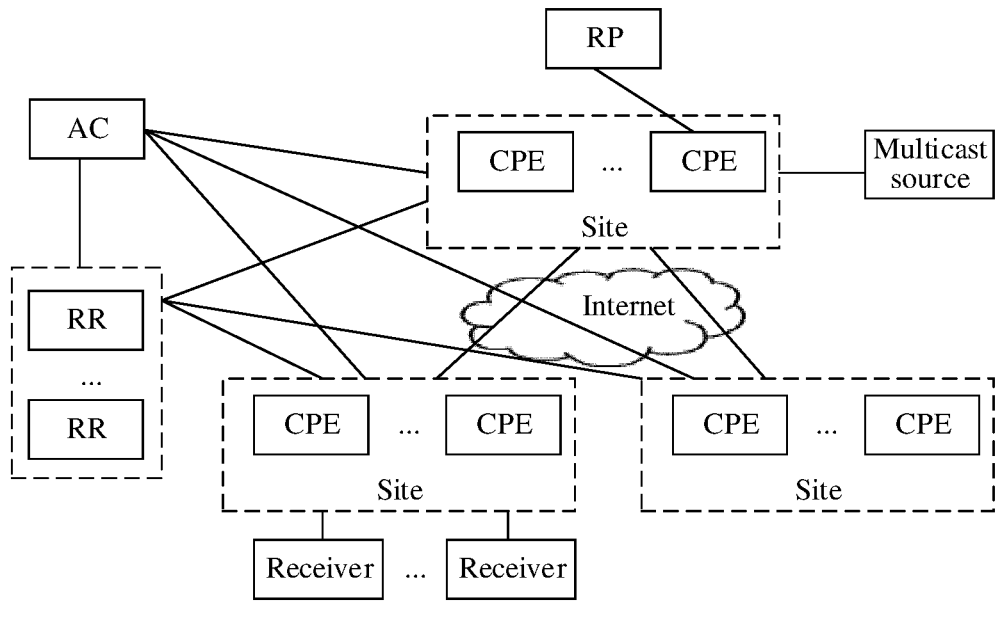
FIG. 1 is an architectural diagram of a system in a communication method according to an embodiment of this application.

FIG. 1 is an architectural diagram of a system in a communication method according to an embodiment of this application. The system is an SD-WAN overlay network system. Refer to FIG. 1. The system includes a plurality of sites, each site includes at least one CPE, and the system further includes a controller (access controller. AC), at least one route reflector (RR), at least one multicast member (namely, at least one receiver), at least one multicast source (source. S), and a multicast rendezvous point (rendezvous point. RP).

Figure 2:
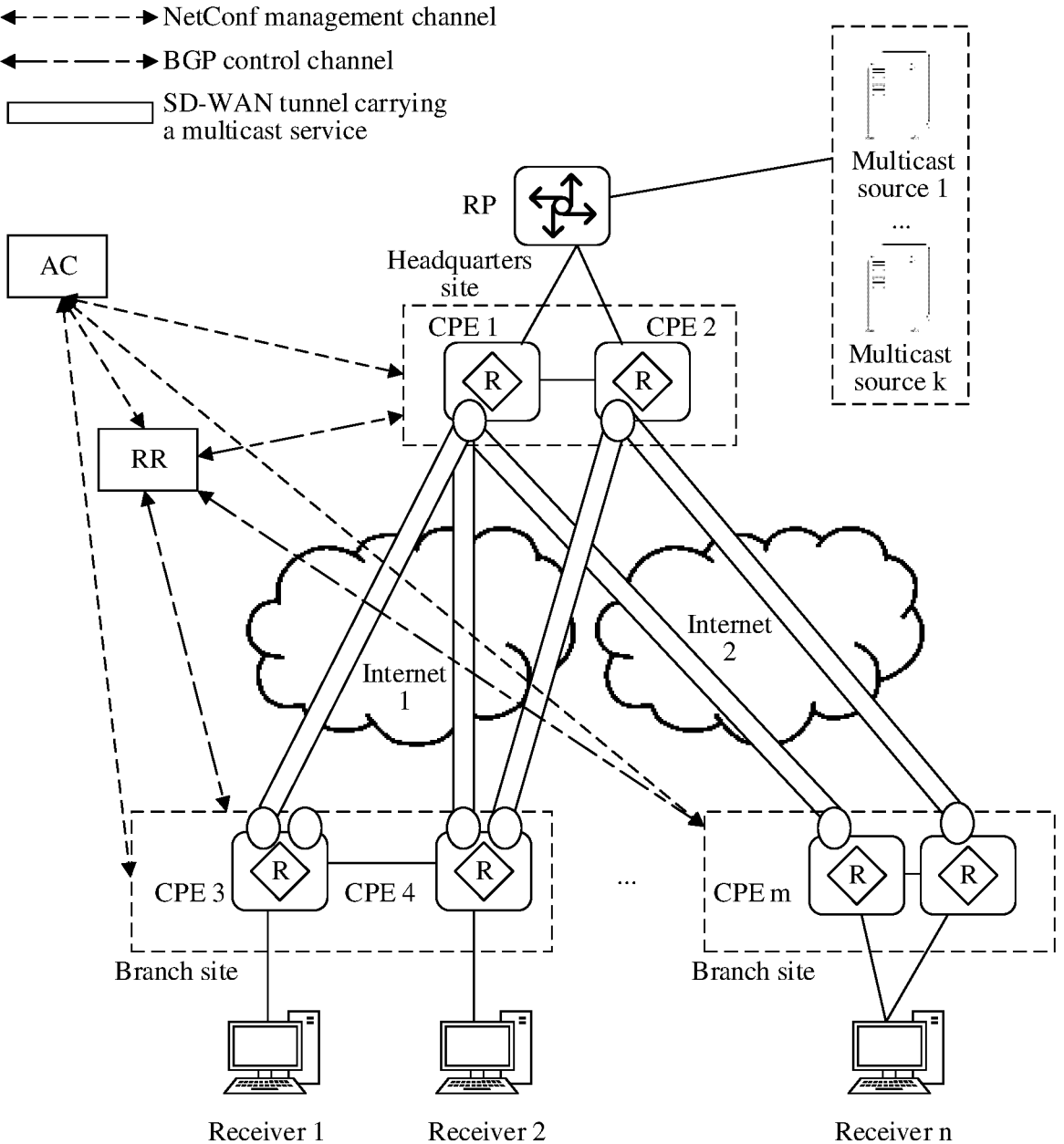
FIG. 2 is another architectural diagram of a system in a communication method according to an embodiment of this application.
Figure 3:
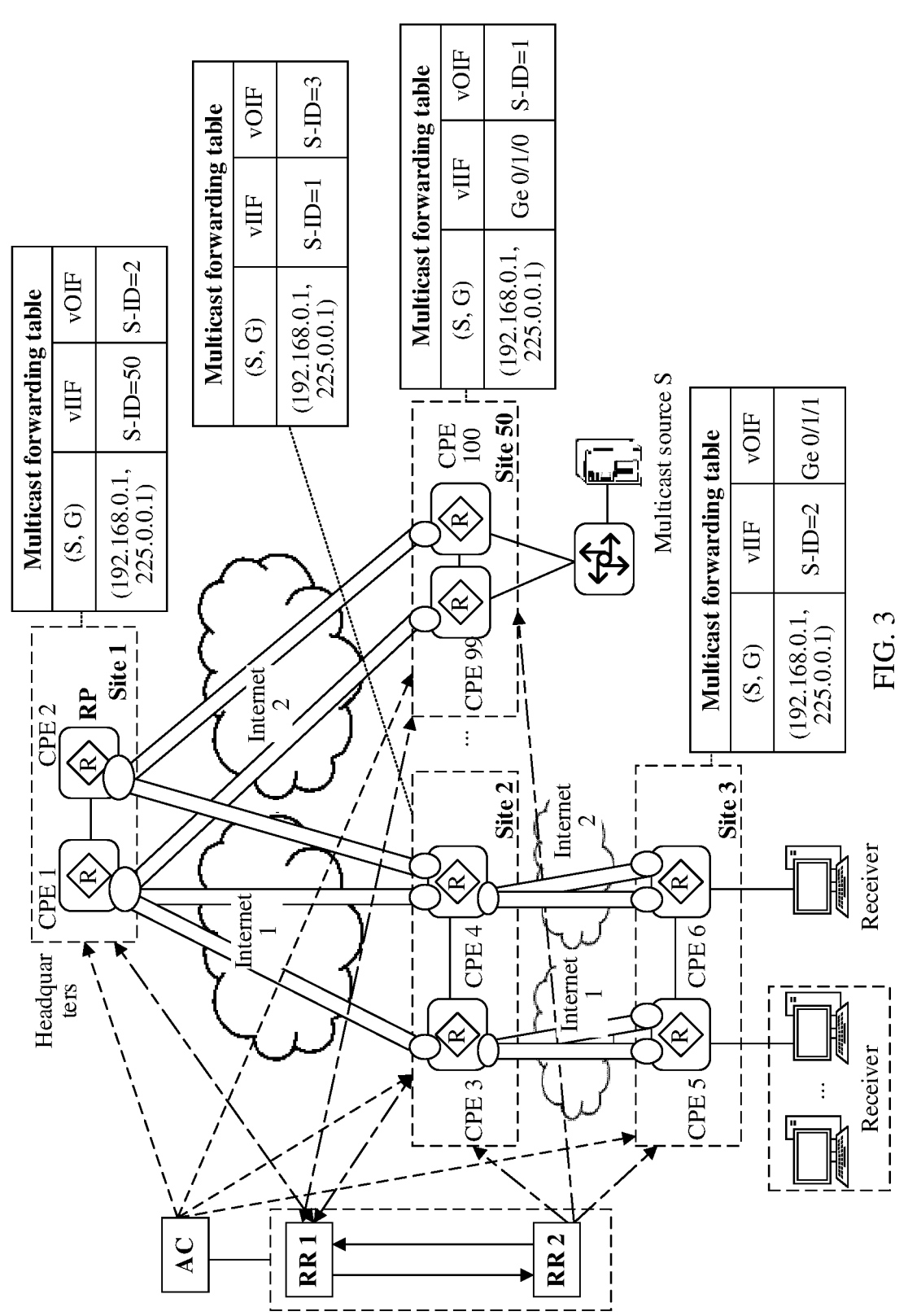
FIG. 3 is still another architectural diagram of a system in a communication method according to an embodiment of this application.

In this embodiment of this application, the system has a single-layer topology architecture shown in FIG. 2 or a multi-layer topology architecture shown in FIG. 3. In the single-layer topology architecture, the system includes two layers of sites, each layer includes at least one site, the two layers of sites include an upstream site and a downstream site, and the two layers of sites interact with each other across the internet. The upstream site is a headquarters site. The downstream site includes at least one branch site. In the multi-layer topology architecture, the system includes at least three layers of sites, and each layer includes at least one site. Three layers of sites are used as an example. The three layers of sites include a headquarters site, an intermediate site, and a branch site, the headquarters site and the intermediate site interact with each other across the internet, and the intermediate site and the branch site interact with each other across the internet. The system has a hub-spoke architecture, a full mesh architecture, or a partial mesh architecture.

The plurality of sites include a headquarters site and at least one branch site. The RP is located in the headquarters site. The RP is another device connected to a CPE in the headquarters site. Alternatively, the RP is a CPE in the headquarters site. The multicast member is connected to a CPE in the branch site. The multicast source is connected to a CPE in the headquarters site or a branch site.

In embodiments of this application, a multicast service is transmitted on an SD-WAN link. In other words, the multicast service is transmitted on an SD-WAN tunnel. That is, an SD-WAN tunnel can be established between CPEs, the SD-WAN tunnel is carried on an SD-WAN link, and an SD-WAN tunnel can also be established between a CPE and an RP. Before the SD-WAN tunnel is established, some other related management tunnels and control tunnels further need to be established. The following provides descriptions thereof.

An AC is connected to an RR and the CPE, and is configured to: establish network management channels, for example, network config (NetConf) management channels, with the RR and the CPE, and deliver allocated device IPs, namely, system IPs, to the RR and the CPE through the network management channels, and allocate an RR to which each CPE belongs.

The CPE is configured to establish a datagram transport layer security (DTLS) management channel with the RR, and advertise, through the DTLS management channel. TNP information, a control tunnel security association (SA) parameter, and the like that are of the CPE to the RR to which the CPE belongs. The RR is configured to advertise, through the DTLS management channel. TNP information, a control tunnel SA parameter, and the like that are of the RR to the CPE to which the RR is connected.

The RR and the CPE are further configured to dynamically establish a BGP control tunnel between the RR and the CPE, that is, establish a BGP connection, based on the TNP information, the control tunnel SA parameters, and the like learned through the DTLS management channel. The CPE is further configured to advertise the TNP information, the data tunnel SA parameter, and a multicast service route that are of the CPE to the RR through the BGP control tunnel. The RR is further configured to reflect and distribute received TNP information, a received data tunnel SA parameter, and a received multicast service route that are of each CPE to another CPE through the BGP control tunnel.

The CPE is further configured to dynamically establish an SD-WAN tunnel with another CPE based on learned TNP information, a learned data tunnel SA parameter, and a learned multicast service route that are of the another CPE. The SD-WAN tunnel is for carrying service traffic between sites, and the service traffic includes multicast service traffic. An SD-WAN tunnel is formed through an SD-WAN link between two CPEs. The SD-WAN link may be identified by TNP information of the CPEs at two ends of the SD-WAN link, and the SD-WAN tunnel may be identified by a tunnel number.

Optionally, an implementation of establishing the SD-WAN tunnel between the CPEs includes: After the BGP connection is established between the CPE and the RR, a BGP SD-WAN address family peer relationship is established between the CPE and the RR, where the BGP SD-WAN address family peer relationship is for collecting and advertising information such as a TNP of each CPE, a routing domain (RD) to which the CPE belongs, and an identifier (site-ID) of a site to which the CPE belongs. A BGP MVPN address family peer relationship is further established between the CPE and the RR. The BGP MVPN address family peer relationship is for collecting and advertising the multicast service route of each CPE. The CPE dynamically establishes the SD-WAN tunnel with the another CPE based on the received TNP information, data tunnel SA parameter, and multicast service route that are of the another CPE.

Optionally, in embodiments of this application, a BGP virtual private network target (VPN TARGET) address family peer is further established between the CPE and the RR, and a next-generation multicast VPN outbound route filtering (NG MVPN ORF) function is configured. When the CPE advertises a route to a peer based on a BGP MVPN address family, the CPE can match and filter a route by using an export VPN-TARGET of the advertised route and an import VPN-TARGET of a remote peer, to reduce network load. A BGP-internet protocol version 4-multicast virtual private network instance (ipv4-multicast vpn-instance, IPv4-MVPN instance for short) address family peer relationship is also established between the CPE and RR. The address family peer relationship is for diffusing routing information (namely, a position) of a multicast source and/or routing information (namely, a position) of a multicast rendezvous point to each CPE.

Establishment processes of the BGP SD-WAN address family peer relationship, the BGP MVPN address family peer relationship, the BGP VPN-TARGET address family peer relationship, and the BGP ipv4-multicast vpn-instance address family peer relationship are similar. Establishment of the BGP SD-WAN address family peer relationship is used as an example. After the SD-WAN tunnel is established between the CPE and RR, a BGP SD-WAN address family peer in which a peer address is a system IP address is configured between the CPE and the RR. The AC delivers and configures a static route whose destination address is the system IP address and that is between the CPE and the RR. A next hop is set to be in a site mode in which a site-ID is for recursion. The route whose destination address is the system IP address may reach a peer by recurring the SD-WAN tunnel. The BGP SD-WAN address family peer relationship has been established so far. Simply speaking, on the RR, the AC specifies an egress interface for reaching a system IP of each CPE, and specifies a next-hop site-ID.

A multicast-related protocol (for example, a protocol independent multicast (PIM) protocol) is deployed on a CPE connected to a multicast member, and is for implementing a multicast service between the corresponding CPE and the multicast member.

In embodiments of this application, the CPE, the RR, and the RP are all devices such as routers or switches, the multicast source is a device such as a server or a computer, and the multicast member is a device such as a personal computer (PC) or a host, and the AC is a device in any form, for example, a computer or a client. It should be understood that the CPE is any terminal located in a user position or a related device, and a user terminal may be connected to a carrier network via the CPE. The CPE may be a device such as a telephone router, a switch, a home gateway, a set-top box, or a network adapter.

It should be noted that the foregoing content is descriptions of an example of the implementation environment in the communication method provided in embodiments of this application, and is not intended to limit embodiments of this application. That is, a network architecture and a service scenario that are described in embodiments of this application are intended to describe the technical solutions in embodiments of this application more clearly, and do not constitute a limitation on the technical solutions provided in embodiments of this application. A person of ordinary skill in the art may know that with evolution of the network architecture and emergence of a new service scenario, the technical solutions provided in embodiments of this application are also applicable to similar technical problems.

FIG. 4 is a schematic diagram of a structure of a communication device according to an embodiment of this application. Optionally, the communication device is the CPE or the RR shown in FIG. 1 to FIG. 3. The communication device includes one or more processors 401, a communication bus 402, a memory 403, and one or more communication interfaces 404.

The processor 401 is a general-purpose central processing unit (central processing unit. CPU), a network processor (NP), a microprocessor, or one or more integrated circuits configured to implement the solutions in this application, for example, an application-specific integrated circuit (ASIC), a programmable logic device (PLD), or a combination thereof. Optionally, the PLD is a complex programmable logic device (CPLD), a field-programmable gate array (FPGA), generic array logic (GAL), or any combination thereof.

The communication bus 402 is configured to transmit information between the foregoing components. Optionally, the communication bus 402 is classified into an address bus, a data bus, a control bus, and the like. For ease of representation, only one thick line is for representing the bus in the figure, but this does not mean that there is only one bus or only one type of bus.

Optionally, the memory 403 is a read-only memory (ROM), a random access memory (RAM), an electrically erasable programmable read-only memory (EEPROM), an optical disc (including a compact disc read-only memory (CD-ROM), a compact disc, a laser disc, a digital versatile disc, a Blu-ray disc, or the like), a magnetic disk storage medium or another magnetic storage device, or any other medium that can be for carrying or storing expected program code in a form of instructions or a data structure and that is accessible to a computer, but is not limited thereto. The memory 403 exists independently, and is connected to the processor 401 through the communication bus 402, or the memory 403 is integrated with the processor 401.

The communication interface 404 is configured to communicate with another device or a communication network by using any apparatus such as a transceiver. The communication interface 404 includes a wired communication interface, and optionally, further includes a wireless communication interface. The wired communication interface is, for example, an ethernet interface. Optionally, the ethernet interface is an optical interface, an electrical interface, or a combination thereof. The wireless communication interface is a wireless local area network (WLAN) interface, a cellular network communication interface, a combination thereof, or the like.

Optionally, in some embodiments, the communication device includes a plurality of processors such as the processor 401 and a processor 405 shown in FIG. 4. Each of the processors is a single-core processor or a multi-core processor. Optionally, the processor herein refers to one or more devices, circuits, and/or processing cores configured to process data (for example, computer program instructions).

During specific implementation, in an embodiment, the communication device further includes an output device 406 and an input device 407. The output device 406 communicates with the processor 401, and can display information in a plurality of manners. For example, the output device 406 is a liquid crystal display (LCD), a light emitting diode (LED) display device, a cathode ray tube (CRT) display device, or a projector. The input device 407 communicates with the processor 401, and can receive an input from a user in a plurality of manners. For example, the input device 407 is a mouse, a keyboard, a touchscreen device, or a sensor device.

In some embodiments, the memory 403 is configured to store program code 410 for executing the solutions in this application, and the processor 401 can execute the program code 410 stored in the memory 403. The program code includes one or more software modules. The communication device can implement, by using the processor 401 and the program code 410 in the memory 403, communication methods provided in embodiments in FIG. 5 to FIG. 10 below:

The following describes the communication method provided in embodiments of this application. For understanding, refer to the embodiments in FIG. 5 to FIG. 10. The embodiment in FIG. 5 is related descriptions of a process in which a CPE autonomously generates an SD-WAN overlay routing table in the communication method. The routing table is for guiding the CPE to communicate with another CPE, where the communication includes multicast communication and/or unicast communication. The embodiment in FIG. 6 is a schematic diagram of a structure of a multicast service packet according to an embodiment of this application. The embodiments in FIG. 7 and FIG. 8 are related descriptions of specifying an overlay multicast RPF next hop by an RR to a CPE in the communication method. When a routing table in the embodiment in FIG. 5 is for implementing the multicast communication, the embodiments in FIG. 5 and FIG. 7 may be understood as parallel solutions, and the embodiments in FIG. 5 and FIG. 8 may also be understood as parallel solutions. The embodiment in FIG. 9 is related descriptions of transferring a multicast join message by a CPE in the communication method. The CPE transfers the multicast join message based on an SD-WAN overlay routing table or an overlay multicast RPF next hop specified by an RR. That is, the embodiment in FIG. 9 can be applied in combination with the embodiment in FIG. 5, or applied in combination with the embodiments in FIG. 7 and FIG. 8. The embodiment in FIG. 10 is related descriptions of a process in which a CPE sends a multicast service packet in the communication method. The CPE sends the multicast service packet by querying an SD-WAN overlay multicast forwarding table. The multicast forwarding table is generated in a process in which the CPE transfers a multicast join message. That is, the embodiment in FIG. 10 can be applied in combination with the embodiments in FIG. 5 to FIG. 9. In general, the embodiments in FIG. 5 to FIG. 10 separately implement the communication method provided in embodiments of this application, or can be combined to implement the communication method provided in embodiments of this application.

FIG. 5 is a flowchart of a communication method according to an embodiment of this application. The method is applied to an SD-WAN overlay network, and the overlay network includes a plurality of CPEs. Refer to FIG. 5. The method includes the following steps.

Step 501: A first CPE obtains node information of each of the plurality of CPEs in the SD-WAN overlay network, where the node information of the CPE includes an identifier of the CPE and information about an SD-WAN link on which the CPE is located.

The first CPE is one of the plurality of CPEs. In this embodiment of this application, the overlay network further includes an RR, and the first CPE can obtain the node information of each CPE via the RR. For example, a second CPE sends node information of the second CPE to the RR, and the RR reflects the node information of the second CPE to another CPE (including the first CPE). That is, the node information of the second CPE is diffused to the another CPE through reflection performed by the RR. The node information of the second CPE may be diffused via one or more RRs. This is not excessively described in this embodiment of this application. The second CPE is one of the plurality of CPEs that is different from the first CPE.

It should be understood that the plurality of CPEs each can obtain the node information of each of the plurality of CPEs. For example, the second CPE can also obtain the node information of each of the plurality of CPEs, where the node information of each of the plurality of CPEs includes node information of the first CPE.

Optionally, the first CPE can obtain the node information of each CPE through a BGP control tunnel established between the first CPE and the RR. The node information of each CPE includes the identifier of the CPE and the information about the SD-WAN link on which the CPE is located. The identifier of the CPE is a system IP of the CPE, or an autonomous system number (AS-Num) and a router identifier (router ID) that are of the CPE. The information about the SD-WAN link on which the CPE is located includes a correspondence between TNP information of two CPEs at two ends of each SD-WAN link on which the CPE is located, and the SD-WAN link is identified by local TNP information and peer TNP information. The TNP information includes a site-ID, a transport network identifier (transport network ID. TNID), a public IP, a private IP, and the like.

For example, an identifier of the second CPE is a system IP 1, and information about an SD-WAN link on which the second CPE is located includes {[TNP 1: TNP 2] and [TNP 3: TNP 4]}, indicating that an SD-WAN link is formed between a TNP 1 of the second CPE and a TNP 2 of another CPE and that an SD-WAN link is formed between a TNP 3 of the second CPE and a TNP 4 of the another CPE. The two SD-WAN links form two SD-WAN tunnels respectively.

In this embodiment of this application, the first CPE receives, through the BGP control tunnel, a BGP update packet that is of each CPE and that is reflected by the RR, where the BGP update packet of the CPE carries the identifier of the CPE and the information about the SD-WAN link on which the CPE is located.

The SD-WAN link is for carrying a multicast service, or is for carrying all types of services, where all the types of services include the multicast service.

Step 502: The first CPE generates an SD-WAN overlay network topology based on the node information of each of the plurality of CPEs.

In this embodiment of this application, the first CPE can generate the SD-WAN overlay network topology based on the identifier of each of the plurality of CPEs and the information about the SD-WAN link on which the CPE is located. It should be understood that the plurality of CPEs each can generate the SD-WAN overlay network topology based on the node information of each of the plurality of CPEs. The SD-WAN overlay network topologies generated by the CPEs are consistent.

For example, the first CPE determines a connection relationship between the plurality of CPEs based on the system IP of each of the plurality of CPEs and the correspondence between the local TNP information and the peer TNP information of the SD-WAN link on which the CPE is located. The connection relationship between the plurality of CPEs includes a connection relationship between TNPs. The first CPE generates the SD-WAN overlay network topology based on the connection relationship between the plurality of CPEs. The network topology represents the connection relationship between the plurality of CPEs. Optionally, the network topology is further for representing a site to which each CPE belongs, a transport network, interface information, and the like.

Optionally, when the SD-WAN link carries the multicast service, the SD-WAN overlay network topology generated by the first CPE can be for carrying the multicast service. When the SD-WAN link carries all the types of services, the SD-WAN overlay network topology generated by the first CPE can be for carrying the multicast service, and can further be for carrying another service.

Step 503: The first CPE determines, based on the SD-WAN overlay network topology, an overlay route from the first CPE to each of a plurality of destination CPEs, where the plurality of destination CPEs include a CPE other than the first CPE in the plurality of CPEs.

In this embodiment of this application, the first CPE determines, by using a path computation algorithm based on the SD-WAN overlay network topology, the overlay route from the first CPE to the CPE other than the first CPE in the plurality of CPEs. That is, the first CPE automatically performs path computation. The path computation algorithm is any routing algorithm, for example, a shortest path algorithm. It should be noted that each CPE other than the first CPE in the plurality of CPEs can also determine, by using the path computation algorithm based on the SD-WAN overlay network topology generated by the CPE other than the first CPE in the plurality of CPEs, an overlay route from the CPE other than the first CPE in the plurality of CPEs to a CPE in the plurality of CPEs and other than the CPE other than the first CPE in the plurality of CPEs. The CPE other than the first CPE in the plurality of CPEs and the first CPE uses a same path computation algorithm.

Information about the overlay route that is from the first CPE to each of the plurality of destination CPEs and that is determined by the first CPE includes TNP information corresponding to the destination CPE (namely. TNP information of the first CPE) and TNP information of a next-hop CPE. The next-hop CPE refers to a next-hop CPE that is of the first CPE and via which data of the first CPE reaches the destination CPE. The TNP information corresponding to the destination CPE and the TNP information of the next-hop CPE identify an SD-WAN link between the first CPE and the next-hop CPE.

Step 504: The first CPE generates an SD-WAN overlay routing table based on the overlay route from the first CPE to each of the plurality of destination CPEs.

In this embodiment of this application, the first CPE generates an SD-WAN overlay routing table at a site granularity or an SD-WAN overlay routing table at a CPE granularity based on the overlay route from the first CPE to each of the plurality of destination CPEs. The following separately describes the SD-WAN overlay routing tables at the two granularities, and describes implementation processes of implementing multicast communication based on the SD-WAN overlay routing tables at the two granularities.

A process in which the first CPE generates the SD-WAN overlay routing table at the site granularity; and implements the multicast communication based on the SD-WAN overlay routing table at the site granularity is described first.

In this embodiment of this application, the node information of each CPE obtained by the first CPE further includes an identifier of the site to which each CPE belongs, and the SD-WAN overlay routing table that is at the site granularity and that is generated by the first CPE includes a routing entry corresponding to each of a plurality of destination sites. The routing entry corresponding to the destination site includes an identifier of the destination site and an identifier of a next-hop site that is of the first CPE and via which the data of the first CPE reaches the destination site. The plurality of destination sites include sites to which the plurality of destination CPEs belong. That is, the plurality of destination sites include a site other than the site to which the first CPE belongs in the SD-WAN overlay network.

When obtaining the identifier of each CPE and the information about the SD-WAN link on which the CPE is located, the first CPE obtains an identifier of the site to which the CPE belongs. For example, the first CPE receives, through the BGP control tunnel, a BGP update packet that is of each CPE and that is reflected by the RR, where the BGP update packet of the CPE carries the identifier of the CPE, the information about the SD-WAN link on which the CPE is located, and the identifier of the site to which the CPE belongs.

Alternatively: a process in which the first CPE obtains the identifier of each CPE and the information about the SD-WAN link on which the CPE is located and a process in which the first CPE obtains the identifier of the site to which each CPE belongs are two processes. For example, the first CPE separately receives, through the BGP control tunnel, two BGP update packets of each CPE that are reflected by the RR, where one BGP update packet carries TNP information of the CPE, a data tunnel SA parameter, the identifier of the site to which the CPE belongs, and the like, and the BGP update packet is used by the plurality of CPEs in the overlay network to learn related information of other CPEs from each other. The other BGP update packet carries the identifier of each CPE and the information about the SD-WAN link on which the CPE is located, and the BGP update packet is used by the plurality of CPEs to generate the SD-WAN overlay network topologies.

The SD-WAN overlay routing table that is at the site granularity and that is generated by the first CPE can be for guiding the first CPE to transfer a multicast join message based on the site granularity and generate an SD-WAN overlay multicast forwarding table at the site granularity in a process of transferring the multicast join message. This is described next.

In this embodiment of this application, the first CPE obtains a first multicast join message from the second CPE, where the first multicast join message carries first multicast join route information, and the first multicast join route information includes a first multicast group IP address, the identifier of the second CPE, an identifier of a first site to which the first CPE belongs, and an identifier of a second site to which the second CPE belongs. The second CPE is one of the plurality of CPEs. The first CPE queries the SD-WAN overlay routing table at the site granularity for a routing entry corresponding to a first destination site, to obtain a first routing entry, where the first destination site is a site to which a multicast rendezvous point belongs. The first CPE obtains an identifier of a next-hop site in the first routing entry, to obtain an identifier of a third site. The first CPE generates a second multicast join message based on the identifier of the third site and the first multicast join message, where the second multicast join message carries second multicast join route information, and the second multicast join route information includes the first multicast group IP address, an identifier of the first CPE, the identifier of the third site, and the identifier of the first site. The first CPE transfers the second multicast join message to a CPE in the third site through an SD-WAN link between the first CPE and the CPE in the third site based on the identifier of the third site.

The first CPE obtains local TNP information of an SD-WAN link between each of a part or all of CPEs in the third site and the first CPE based on the identifier of the third site. The first CPE sends the second multicast join message through a port indicated by the local TNP information of the SD-WAN link between each of the part or all of the CPEs in the third site and the first CPE. It should be understood that reliability is higher if the first CPE sends a first multicast service packet to all of the CPEs in the third site. If the first CPE sends the first multicast join message to the part of the CPEs in the third site according to a load balance policy, in a random sending manner, or in another manner, a resource waste can be reduced.

In this embodiment of this application, the second CPE is a CPE connected to a first multicast member, for example, a CPE in a branch site, or the second CPE is another CPE, for example, a CPE in an intermediate site. The first CPE is a CPE connected to the second CPE. An SD-WAN tunnel is established between the first CPE and the second CPE. The second CPE sends the first multicast join message to the first CPE based on the SD-WAN overlay routing table generated by the second CPE. The first CPE receives, through the SD-WAN tunnel, the first multicast join message sent by the second CPE. Alternatively, the first CPE receives, through reflection performed by the RR, the first multicast join message sent by the second CPE.

The first multicast group IP address carried in the first multicast join message is an IP address of a first multicast group that the first multicast member requests to join. The first multicast join message is a (*. G) message, where '*' indicates that a multicast member does not obtain an IP address of a multicast source temporarily, and 'G' represents a multicast group. Because a destination of the (*. G) message is the multicast rendezvous point, the first CPE queries the SD-WAN overlay routing table at the site granularity for the routing entry corresponding to the site to which the multicast rendezvous point belongs. In addition, in this embodiment of this application, the first multicast join route information carried in the first multicast join message includes a first route key and a first route attribute. The first route key includes the first multicast group IP address and the identifier of the second CPE. The first route attribute includes the identifier of the first site and the identifier of the second site.

The first route attribute includes a VRI attribute and a TEA. The VRI attribute includes the identifier of the first site, and the TEA includes the identifier of the second site.

In this embodiment of this application, the first multicast join message further carries indication information of a target route type, and the indication information indicates the first CPE to parse the first multicast join route information based on the target route type, and indicates that the first multicast join message is for advertising the first multicast join route information.

Optionally, the first multicast join message and the second multicast join message are transferred based on a BGP NG-MVPN address family, and the BGP NG-MVPN address family corresponds to the target route type. It should be understood that the target route type is extended in the BGP NG-MVPN address family to advertise an overlay multicast join route.

Alternatively, the first multicast join message and the second multicast join message are transferred based on a BGP EVPN address family, and the BGP EVPN address family corresponds to the target route type. It should be understood that the target route type is extended in the BGP EVPN address family to transfer an overlay multicast join route.

The VRI attribute and the TEA correspond to two target route types extended in the solution. For example, the two target route types are extended in the BGP NG-MVPN address family or the BGP EVPN address family to perform overlay multicast join, and the two target route types correspond to the VRI attribute and the TEA respectively.

Optionally, the first route key further carries an identifier of a routing domain (RD) to which the first CPE belongs and an identifier of a source autonomous system (Source AS) to which the first CPE belongs. When the first multicast member has learned of an IP address of a first multicast source, the first route key further carries the IP address of the first multicast source. In this case, the first multicast join message is an (S. G) message, where 'S' represents a multicast source, and 'G' represents a multicast group. When the first multicast member does not obtain an IP address of a first multicast source temporarily, and the first route key further carries an IP address of the multicast rendezvous point, the first multicast join message is a (*. G) message.

The (*. G) message is used as an example, and a route key (key) of the (*. G) message is (RD. Source AS. RP. G, and Originating IP). The (S. G) message is used as an example, and a route key of the (S. G) message is (RD. Source AS. S. G, and Originating IP). Originating IP indicates an IP address of a previous-hop CPE. For example, an originating IP carried in the first multicast join message is the identifier of the second CPE. Optionally, originating IPs configured for CPEs that belong to a same site may be the same, or may be different. This is not limited in this embodiment of this application.

A process in which the first CPE generates the second multicast join message based on the identifier of the third site and the first multicast join message is as follows: The first CPE updates the VRI attribute in the first multicast join message to the identifier of the third site, and updates the TEA in the first multicast join message to the identifier of the first site, where an updated first multicast join message is the second multicast join message.

It can be learned from the foregoing descriptions that the first CPE can further generate the SD-WAN overlay multicast forwarding table in the process of transferring the multicast join message. In this embodiment of this application, after obtaining the identifier of the next-hop site in the first routing entry to obtain the identifier of the third site, the first CPE generates a first forwarding entry in the SD-WAN overlay multicast forwarding table. A multicast group IP address in the first forwarding entry is the first multicast group IP address, an egress site identifier in the first forwarding entry is the identifier of the second site, and an ingress site identifier in the first forwarding entry is the identifier of the third site. The first forwarding entry generated by the first CPE in the process of transferring the first multicast join message is a (*. G) forwarding entry.

It should be understood that the first CPE generates the SD-WAN overlay multicast forwarding table at the site granularity, where a (*. G) forwarding entry in the multicast forwarding table includes a multicast group IP address, an egress site identifier, and an ingress site identifier, and an (S. G) forwarding entry includes a multicast source IP address, a multicast group IP address, an egress site identifier, and an ingress site identifier. The egress site identifier and the ingress site identifier may be considered as a next-hop site identifier and a previous-hop site identifier of a multicast service packet. In some cases, a next-hop site and a previous-hop site of the multicast service packet are respectively an upstream site and a downstream site of the site to which the first CPE belongs. In other cases, a next-hop site and a previous-hop site of the multicast service packet are respectively a downstream site and an upstream site of the site to which the first CPE belongs.

When the first multicast member that requests to join the first multicast group has learned of the IP address of the first multicast source, the first CPE obtains a third multicast join message from a third CPE, where the third multicast join message carries third multicast join route information, the third multicast join route information includes the IP address of the first multicast source, the first multicast group IP address, an identifier of the third CPE, the identifier of the first site to which the first CPE belongs, and an identifier of a fourth site to which the third CPE belongs. and the third CPE is one of the plurality of CPEs. The first CPE queries the SD-WAN overlay routing table for a routing entry corresponding to a second destination site, to obtain a second routing entry, where the second destination site is a site accessed by the first multicast source. The first CPE obtains an identifier of a next-hop site in the second routing entry: to obtain an identifier of a fifth site. The first CPE generates a fourth multicast join message based on the identifier of the fifth site and the third multicast join message, where the fourth multicast join message carries fourth multicast join route information, and the fourth multicast join route information includes the IP address of the first multicast source, the first multicast group IP address, the identifier of the first CPE, the identifier of the fifth site, and the identifier of the first site. The first CPE transfers the fourth multicast join message to a CPE in the fifth site through an SD-WAN link between the first CPE and the CPE in the fifth site based on the identifier of the fifth site.

The third multicast join message is an (S. G) message, where 'S' represents a multicast source, and indicates that a multicast member has learned of an IP address of the multicast source, and 'G' represents a multicast group. Because a destination of the (S. G) message is the multicast source, the first CPE queries the SD-WAN overlay routing table for the routing entry corresponding to the site accessed by the first multicast source. In addition, the third multicast join route information carried in the third multicast join message includes a third route key and a third route attribute. The third route key includes the IP address of the first multicast source, the first multicast group IP address, and the identifier of the third CPE. The third route attribute includes the identifier of the third site and the identifier of the first site. The third route attribute includes a VRI attribute and a TEA. The VRI attribute includes the identifier of the third site, and the TEA includes the identifier of the first site.

A process in which the first CPE generates the fourth multicast join message based on the identifier of the fifth site and the third multicast join message is as follows: The first CPE updates the VRI attribute in the third multicast join message to the identifier of the fifth site, and updates the TEA in the third multicast join message to the identifier of the first site, where an updated third multicast join message is the fourth multicast join message.

In this embodiment of this application, after obtaining the identifier of the next-hop site in the second routing entry to obtain the identifier of the fifth site, the first CPE generates a first forwarding entry in the SD-WAN overlay multicast forwarding table. A multicast source IP address in the first forwarding entry is the IP address of the first multicast source, a multicast group IP address in the first forwarding entry is the first multicast group IP address, an egress site identifier in the first forwarding entry is the identifier of the fourth site, and an ingress site identifier in the first forwarding entry is the identifier of the fifth site. The process may be understood as that the first CPE updates the foregoing (*. G) forwarding entry, to obtain the (S. G) forwarding entry.

After generating the first forwarding entry in the SD-WAN overlay multicast forwarding table at the site granularity, the first CPE receives a first multicast service packet sent by a fourth CPE in the fifth site, where the first multicast service packet includes a first SD-WAN ExtGRE header and a first IP header, the first SD-WAN ExtGRE header indicates a protocol type of the first IP header, and the first IP header carries the IP address of the first multicast source and the first multicast group IP address. The first CPE parses the first IP header based on the protocol type indicated by the first SD-WAN ExtGRE header, to obtain the IP address of the first multicast source and the first multicast group IP address. The first CPE queries the SD-WAN overlay multicast forwarding table for a forwarding entry in which a multicast source IP address is the IP address of the first multicast source, a multicast group IP address is the first multicast group IP address, and an ingress site identifier is the identifier of the fifth site, to obtain the first forwarding entry. The first CPE obtains the egress site identifier in the first forwarding entry, to obtain the identifier of the fourth site. The first CPE sends the first multicast service packet to a CPE in the fourth site through an SD-WAN link between the first CPE and the CPE in the fourth site based on the identifier of the fourth site. That is, the first CPE forwards the multicast service packet by querying the SD-WAN overlay multicast forwarding table at the site granularity.

An implementation process in which the first CPE sends the first multicast service packet to the CPE in the fourth site through the SD-WAN link between the first CPE and the CPE in the fourth site based on the identifier of the fourth site is as follows: The first CPE obtains local TNP information of an SD-WAN link between each of a part or all of CPEs in the fourth site and the first CPE based on the identifier of the fourth site. The first CPE sends the first multicast service packet through a port indicated by the local TNP information of the SD-WAN link between each of the part or all of the CPEs in the fourth site and the first CPE. It should be understood that reliability is higher if the first CPE sends the first multicast service packet to all of the CPEs in the fourth site. If the first CPE sends the first multicast service packet to the part of the CPEs in the fourth site according to the load balance policy, in the random sending manner, or in the another manner, the resource waste can be reduced.

In this embodiment of this application, an SD-WAN-related protocol is extended to send a multicast service packet. For example, the first CPE sends the first multicast service packet. The first multicast service packet received by the first CPE carries the first SD-WAN ExtGRE header and the first IP header. The first IP header is a standard IPv4 header. Certainly, in some other embodiments, the first IP header is a standard IPV6 header. In all of the following descriptions, an example in which the first IP header is the standard IPv4 header is used.

For example, an IP header is added to a packet structure of a unicast service packet in an SD-WAN scenario. The added IP header includes a source address field and a destination address field. The source address field is for carrying a multicast source IP address. The destination address field is for carrying a multicast group IP address. In addition, the first IP header further includes another field defined in a standard IPv4 protocol. Details are not described herein again.

FIG. 6 is a schematic diagram of a structure of a multicast service packet according to an embodiment of this application. Refer to FIG. 6, the multicast service packet includes fields such as an outer ethernet header, an IPV4 header, an encapsulation security payload (ESP) header, an SD-WAN ExtGRE header, an IP header, multicast service data, and an ESP trailer. A length of each field is shown in FIG. 6. For example, the length of the IPV4 header may be 20 bytes (B). The IP header is an IP header defined in the solution and for carrying a multicast source IP address and a multicast group IP address, and a structure of the IP header is the same as that of the IPV4 header. A protocol type carried in the SD-WAN ExtGRE header is IPv4, and the protocol type indicates that a next field is an IP header of an IPV4 type. It should be noted that the outer ethernet header and the IPV4 header are parsed by a device (for example, a device in an underlay network) in the internet, and the device in the internet transfers the multicast service packet in a unicast manner through hop-by-hop modification. The IP header is parsed by a CPE device, so that the CPE transfers the multicast service packet across the internet in a multicast manner. For related explanations of fields other than the IP header in FIG. 6, refer to related technologies. Details are not described herein again.

In the solution, an IP header is added to a structure of a unicast service packet to send the multicast service packet. Because the added IP header is a standard IP header, the solution has quite strong generalization and applicability, and has good compatibility with an existing SD-WAN technology.

A process in which the first CPE generates the SD-WAN overlay routing table at the CPE granularity, and implements the multicast communication based on the SD-WAN overlay routing table at the CPE granularity is described next.

In this embodiment of this application, the overlay routing table that is at the SD-WAN at the CPE granularity and that is generated by the first CPE includes a routing entry corresponding to each of the plurality of destination CPEs. The routing entry corresponding to each destination CPE includes an identifier of each destination CPE, and local TNP information and peer TNP information of a target SD-WAN link. The target SD-WAN link is an SD-WAN link between the first CPE and the next-hop CPE that is of the first CPE and via which the data of the first CPE reaches the destination CPE, and the peer TNP information is TNP information of the next-hop CPE that is of the first CPE and via which the data of the first CPE reaches the destination CPE. The plurality of destination CPEs include the CPE other than the first CPE in the plurality of CPEs included in the SD-WAN overlay network.

The SD-WAN overlay routing table that is at the CPE granularity and that is generated by the first CPE can be for guiding the first CPE to transfer a multicast join message based on the CPE granularity and generate an SD-WAN overlay multicast forwarding table at the CPE granularity or the site granularity in a process of transferring the multicast join message. This is described next.

In this embodiment of this application, the first CPE obtains a fifth multicast join message from a fifth CPE, where the fifth multicast join message carries fifth multicast join route information, the fifth multicast join route information includes a second multicast group IP address, an identifier of the fifth CPE, an identifier of a first site to which the first CPE belongs, and an identifier of a sixth site to which the fifth CPE belongs, and the fifth CPE is one of the plurality of CPEs. The first CPE queries the SD-WAN overlay routing table at the CPE granularity for a routing entry corresponding to a first destination CPE, to obtain a third routing entry, where the first destination CPE is a CPE corresponding to a multicast rendezvous point. The first CPE obtains local TNP information and peer TNP information in the third routing entry. The first CPE queries, based on the obtained peer TNP information, for an identifier of a site to which a next-hop CPE that is of the first CPE and via which the data of the first CPE reaches the first destination CPE belongs, to obtain an identifier of a seventh site. The first CPE generates a sixth multicast join message based on the identifier of the seventh site and the fifth multicast join message, where the sixth multicast join message carries sixth multicast join route information, and the sixth multicast join route information includes the second multicast group IP address, an identifier of the first CPE, the identifier of the seventh site, and the identifier of the first site. The first CPE sends the sixth multicast join message through a port indicated by the obtained local TNP information.

The RP is another device connected to a CPE in a headquarters site, and the CPE corresponding to the RP is the CPE to which the RP is connected. Alternatively, the RP is a CPE in a headquarters site, and the CPE corresponding to the RP is the RP.

The second multicast group IP address carried in the fifth multicast join message is an IP address of a second multicast group that a second multicast member requests to join. The fifth multicast join message is a (*. G) message. Because a destination of the (*. G) message is the multicast rendezvous point, the first CPE queries the SD-WAN overlay routing table at the CPE granularity for the routing entry corresponding to the CPE corresponding to the multicast rendezvous point. In addition, in this embodiment of this application, the fifth multicast join route information carried in the fifth multicast join message includes a fifth route key and a fifth route attribute. The fifth route key includes the second multicast group IP address and the identifier of the fifth CPE. The fifth route attribute includes the identifier of the first site and the identifier of the sixth site. The fifth route attribute includes a VRI attribute and a TEA. The VRI attribute includes the identifier of the first site, and the TEA includes an identifier of a second site. It should be noted that a structure of the fifth multicast join message is the same as that of the first multicast join message in the foregoing descriptions. Details are not described herein again.

In this embodiment of this application, a process in which the first CPE generates the sixth multicast join message based on the identifier of the seventh site and the fifth multicast join message is as follows: The first CPE updates the VRI attribute in the fifth multicast join message to the identifier of the seventh site, and updates the TEA in the fifth multicast join message to the identifier of the first site, where an updated fifth multicast join message is the sixth multicast join message.

It can be learned from the foregoing descriptions that the first CPE can further generate the SD-WAN overlay multicast forwarding table in the process of transferring the multicast join message. That is, after obtaining the identifier of the seventh site, the first CPE generates a second forwarding entry in the SD-WAN overlay multicast forwarding table at the site granularity. A multicast group IP address in the second forwarding entry is the second multicast group IP address, an egress site identifier in the second forwarding entry is the identifier of the sixth site, and an ingress site identifier in the second forwarding entry is the identifier of the seventh site. The second forwarding entry is a (*. G) forwarding entry.

It should be understood that although the first CPE transfers the multicast join message based on the SD-WAN overlay routing table at the CPE granularity, the first CPE can generate the SD-WAN overlay multicast forwarding table at the site granularity. A (*. G) forwarding entry in the multicast forwarding table includes a multicast group IP address, an egress site identifier, and an ingress site identifier, and an (S. G) forwarding entry includes a multicast source IP address, a multicast group IP address, an egress site identifier, and an ingress site identifier.

When the second multicast member that requests to join the second multicast group has learned of an IP address of a second multicast source, the fifth multicast join message transferred by the first CPE further carries the IP address of the second multicast source. The second forwarding entry generated by the first CPE further includes the IP address of the second multicast source. That is, the second forwarding entry is an (S. G) forwarding entry.

After generating the second forwarding entry in the SD-WAN overlay multicast forwarding table at the site granularity, the first CPE can send a multicast service packet about the second multicast source and the second multicast group based on the second forwarding entry. The multicast service packet carries an SD-WAN ExtGRE header and an IP header. For detailed descriptions of a structure of the multicast service packet, refer to the foregoing related content. Details are not described herein again.

In this embodiment of this application, the first CPE obtains a seventh multicast join message from the fifth CPE, where the seventh multicast join message carries seventh multicast join route information, the seventh multicast join route information includes the second multicast group IP address, the identifier of the fifth CPE, first TNP information of the first CPE, and second TNP information of the fifth CPE, and the fifth CPE is one of the plurality of CPEs. The first CPE queries the SD-WAN overlay routing table at the CPE granularity for the routing entry corresponding to the first destination CPE, to obtain the third routing entry, where the first destination CPE is the CPE corresponding to the multicast rendezvous point. The first CPE obtains the local TNP information and the peer TNP information in the third routing entry. The first CPE generates an eighth multicast join message based on the obtained peer TNP information and the seventh multicast join message, where the eighth multicast join message carries eighth multicast join route information, and the eighth multicast join route information includes the second multicast group IP address, the identifier of the first CPE, the obtained peer TNP information, and the first TNP information. The first CPE sends the eighth multicast join message through the port indicated by the obtained local TNP information.

After obtaining the local TNP information and the peer TNP information in the third routing entry: the first CPE generates a third forwarding entry in the SD-WAN overlay multicast forwarding table, where a multicast IP address in the third forwarding entry is the second multicast group IP address, egress port information in the third forwarding entry is the second TNP information, and ingress port information in the third forwarding entry is the obtained peer TNP information. The third forwarding entry generated by the first CPE in a process of transferring the seventh multicast join message is a (*. G) forwarding entry.

It should be understood that the first CPE transfers the multicast join message based on the SD-WAN overlay routing table at the CPE granularity; and generates the SD-WAN overlay multicast forwarding table at the CPE granularity. A (*. G) forwarding entry in the multicast forwarding table includes a multicast group IP address, egress port information, and ingress port information, and an (S. G) forwarding entry includes a multicast source IP address, a multicast group IP address, egress port information, and ingress port information. The egress port information and the ingress port information may be considered as port information of a next-hop CPE of a multicast service packet and port information of a previous-hop CPE of the multicast service packet. In some cases, the next-hop CPE and the previous-hop CPE of the multicast service packet are respectively an upstream CPE and a downstream CPE of the first CPE. In other cases, the next-hop CPE and the previous-hop CPE of the multicast service packet are respectively a downstream CPE and an upstream CPE of the first CPE. Both the egress port information and the ingress port information are TNP information, or are interface information in the TNP information, where the interface information includes a public IP and a private IP.

Structures of the seventh multicast join message and the eighth multicast join message are the same as the structure of the first multicast join message in the foregoing descriptions. Details are not described herein again.

After the first CPE generates the third forwarding entry in the SD-WAN overlay multicast forwarding table at the CPE granularity, the first CPE can send the multicast service packet about the second multicast source and the second multicast group based on the third forwarding entry. For example, the first CPE receives a second multicast service packet sent by a sixth CPE, where the second multicast service packet includes a second SD-WAN ExtGRE header and a second IP header, the second SD-WAN ExtGRE header indicates a protocol type of the second IP header, and the second IP header carries the IP address of the second multicast source and the second multicast group IP address. The first CPE parses the second IP header based on the protocol type indicated by the second SD-WAN ExtGRE header, to obtain the IP address of the second multicast source and the second multicast group IP address. The first CPE queries the SD-WAN overlay multicast forwarding table for a forwarding entry in which a multicast group IP address is the second multicast group IP address and ingress port information is TNP information of the sixth CPE, to obtain the third forwarding entry. The first CPE obtains the egress port information in the third forwarding entry, to obtain the second TNP information. The first CPE obtains, based on the second TNP information, local TNP information of an SD-WAN link between the first CPE and the fifth CPE. The first CPE sends the second multicast service packet through a port indicated by the local TNP information of the SD-WAN link between the first CPE and the fifth CPE. The first CPE sends the multicast service packet at the CPE granularity, so that a resource waste to some extent can be reduced.

Refer to FIG. 3. An SD-WAN overlay multicast forwarding table (which is referred to as a multicast forwarding table for short) at a site granularity in an embodiment of this application is explained and described again. As shown in FIG. 3, a forwarding entry in a multicast forwarding table generated by a CPE 4 in a site 2 includes (S. G), a virtual input ifindex (vIIF), and a virtual output ifindex (vOIF). (S. G) indicates that a position of a multicast source is known. S is 192.168.0.1, and indicates an IP address of the multicast source. G is 225.0.0.1, and indicates a multicast group IP address. The vIIF is S-ID=1, and indicates that an ingress site identifier is a site 1. The vOIF is S-ID=3, and indicates that an egress site identifier is a site 3. When a position of an RP is known but a position of a multicast source is unknown, a forwarding entry includes (*. G) instead of (S. G).

It should be noted that, in an implementation in which the SD-WAN overlay multicast forwarding table is at the site granularity, an SD-WAN overlay multicast forwarding table generated by a CPE connected to a multicast member includes an ingress site identifier and an egress interface corresponding to the multicast member, and includes no egress site identifier. A multicast forwarding table generated by a CPE connected to a multicast source includes an egress site identifier and an ingress interface corresponding to the multicast source, and includes no ingress site identifier.

For example, as shown in FIG. 3, a CPE 6 in the site 3 is connected to a multicast member (namely, a receiver), and a forwarding entry in a multicast forwarding table generated by the CPE 6 includes (S. G), a vIIF, and an OIF. S is 192.168.0.1, and indicates an IP address of a multicast source. G is 225.0.0.1 and indicates the multicast group IP address. The vIIF is S-ID=2, and indicates that an ingress site identifier is the site 2. The OIF is Ge 0/1/1, and indicates an egress interface corresponding to the multicast member. A CPE 100 in a site 50 is connected to a multicast source, and a forwarding entry in a multicast forwarding table generated by the CPE 100 includes (S. G), an IIF, and a vOIF. S is 192.168.0.1, and indicates an IP address of the multicast source. G is 225.0.0.1, and indicates a multicast group IP address. The IIF is Ge 0/I/O), and indicates an ingress interface corresponding to the multicast source. The vOIF is S-ID=1, and indicates that an egress site ID is the site 1.

In an implementation in which a multicast forwarding table is at a CPE granularity, a multicast forwarding table generated by a CPE connected to a multicast member includes ingress port information and an egress interface corresponding to the multicast member, and includes no egress port identifier. A multicast forwarding table generated by a CPE connected to a multicast source includes egress port information and an ingress interface corresponding to the multicast source, and includes no ingress port information.

In conclusion, in this embodiment of this application, a CPE can autonomously generate an SD-WAN overlay network topology; and calculate, based on the network topology, an overlay route to another CPE, so that a multicast join message can be subsequently transferred based on the overlay route obtained through calculation, an SD-WAN overlay multicast forwarding table is generated in a process of transferring the multicast join message, and a multicast service packet is sent based on the multicast forwarding table. Autonomous path computation performed by the CPE is more flexible, and communication reliability in an SD-WAN scenario can also be improved to some extent.

FIG. 7 is a flowchart of another communication method according to an embodiment of this application. The method is applied to an SD-WAN overlay network, and the overlay network includes a plurality of CPEs and a route reflector RR. Refer to FIG. 7. The method includes the following steps.

Step 701: A first CPE receives a first BGP update packet sent by an RR, where the first BGP update packet carries an IP address of a first multicast source and an identifier of a first site.

The first CPE is one of the plurality of CPEs. In this embodiment of this application, the first BGP update packet carries first multicast source route information, the first multicast source route information includes a first route prefix and a first extended community attribute, the first route prefix is the IP address of the first multicast source, and the first extended community attribute is the identifier of the first site.

Optionally, the first BGP update packet is transferred based on a BGP IPV4-MVPN instance address family, and the BGP IPv4-MVPN instance address family corresponds to the first extended community attribute. The first extended community attribute is an extended community attribute newly defined in a BGP IPv4-MVPN instance address family protocol. Certainly, in some other embodiments, the first extended community attribute may alternatively be an existing extended community attribute, for example, a color extended community attribute, in the BGP IPv4-MVPN instance address family.

Step 702: The first CPE records the identifier of the first site as an overlay multicast RPF next-hop site identifier corresponding to the IP address of the first multicast source, where the overlay multicast RPF next-hop site identifier is for guiding the first CPE to transfer a multicast join message and generate an SD-WAN overlay multicast forwarding table in a process of transferring the multicast join message.

In this embodiment of this application, after parsing the first BGP update packet, the first CPE obtains the IP address of the first multicast source and the identifier of the first site. The first CPE records the identifier of the first site as the overlay multicast RPF next-hop site identifier corresponding to the IP address of the first multicast source. For example, the first CPE enables the IP address of the first multicast source to correspond to the identifier of the first site, and stores the IP address of the first multicast source and the identifier of the first site.

It can be learned from the foregoing descriptions that the RR advertises, to the first CPE by using the first BGP update packet, an overlay route from the first CPE to the first multicast source, where the overlay route is the identifier of the first site.

The overlay multicast RPF next-hop site identifier that is recorded by the first CPE and that corresponds to the IP address of the first multicast source is for guiding the first CPE to transfer the multicast join message to the first multicast source and generate the SD-WAN overlay multicast forwarding table in the process of transferring the multicast join message. This is described next.

In this embodiment of this application, the first CPE obtains a first multicast join message from a second CPE, where the first multicast join message carries first multicast join route information, the first multicast join route information includes the IP address of the first multicast source, a first multicast group IP address, an identifier of the second CPE, an identifier of a second site to which the first CPE belongs, and an identifier of a third site to which the second CPE belongs, and the second CPE is one of the plurality of CPEs. The first CPE generates a second multicast join message based on the first multicast join message and the multicast RPF next-hop site identifier corresponding to the IP address of the first multicast source, where the second multicast join message carries second multicast join route information, and the second multicast join route information includes the IP address of the first multicast source, the first multicast group IP address, an identifier of the first CPE, the identifier of the first site, and the identifier of the second site. The first CPE transfers the second multicast join message to a CPE in the first site through an SD-WAN link between the first CPE and the CPE in the first site based on the multicast RPF next-hop site identifier corresponding to the IP address of the first multicast source.

The first multicast join message further carries indication information of a target route type, and the indication information indicates the first CPE to parse the first multicast join route information based on the target route type, and indicates that the first multicast join message is for advertising the first multicast join route information.

Optionally, the first multicast join message and the second multicast join message are transferred based on a BGP NG-MVPN address family, and the BGP NG-MVPN address family corresponds to the target route type. It should be understood that the target route type is extended in the BGP NG-MVPN address family to transfer an overlay multicast join route.

Alternatively, the first multicast join message and the second multicast join message are transferred based on a BGP EVPN address family, and the BGP EVPN address family corresponds to the target route type. It should be understood that the target route type is extended in the BGP EVPN address family to transfer an overlay multicast join route.

A structure of the multicast join message in the embodiment in FIG. 7 is the same as that of the multicast join message in the embodiment in FIG. 5, and is excessively described herein.

It can be learned from the foregoing descriptions that the first CPE can further generate the SD-WAN overlay multicast forwarding table in the process of transferring the multicast join message. In this embodiment of this application, the first CPE generates a first forwarding entry in the SD-WAN overlay multicast forwarding table in a process of transferring the first multicast join message, where a multicast source IP address in the first forwarding entry is the IP address of the first multicast source, a multicast group IP address in the first forwarding entry is the first multicast group IP address, an egress site identifier in the first forwarding entry is the identifier of the third site, and an ingress site identifier in the first forwarding entry is the identifier of the first site. The first forwarding entry generated by the first CPE in the process of transferring the first multicast join message is an (S. G) forwarding entry.

It should be understood that the first CPE generates the first forwarding entry in the SD-WAN overlay multicast forwarding table at a site granularity, where the first forwarding entry includes the multicast source IP address, the multicast group IP address, the egress site identifier, and the ingress site identifier. The egress site identifier and the ingress site identifier may be considered as a next-hop site identifier and a previous-hop site identifier of a multicast service packet.

After generating the first forwarding entry in the SD-WAN overlay multicast forwarding table, the first CPE can forward a multicast service packet about the first multicast source and a first multicast group based on the first forwarding entry. For example, the first CPE receives a first multicast service packet sent by a third CPE in the first site, where the first multicast service packet includes a first SD-WAN ExtGRE header and a first IP header, the first SD-WAN ExtGRE header indicates a protocol type of the first IP header, and the first IP header carries the IP address of the first multicast source and the first multicast group IP address. The first CPE parses the first IP header based on the protocol type indicated by the first SD-WAN ExtGRE header, to obtain the IP address of the first multicast source and the first multicast group IP address. The first CPE queries the SD-WAN overlay multicast forwarding table for a forwarding entry in which a multicast source IP address is the IP address of the first multicast source, a multicast group IP address is the first multicast group IP address, and an ingress site identifier is the identifier of the first site, to obtain the first forwarding entry. The first CPE obtains the egress site identifier in the first forwarding entry, to obtain the identifier of the third site. The first CPE sends the first multicast service packet to a CPE in the third site through an SD-WAN link between the first CPE and the CPE in the third site based on the identifier of the third site.

An implementation process in which the first CPE sends the first multicast service packet to the CPE in the third site through the SD-WAN link between the first CPE and the CPE in the third site based on the identifier of the third site is as follows: The first CPE obtains local TNP information of an SD-WAN link between each of a part or all of CPEs in the third site and the first CPE based on the identifier of the third site. The first CPE sends the first multicast service packet through a port indicated by the local TNP information of the SD-WAN link between each of the part or all of the CPEs in the third site and the first CPE. It should be understood that reliability is higher if the first CPE sends the first multicast service packet to all of the CPEs in the third site. If the first CPE sends the first multicast service packet to the part of the CPEs in the third site according to a load balance policy, in a random sending manner, or in another manner, a resource waste can be reduced.

A structure of the multicast service packet in the embodiment in FIG. 7 is consistent with that of the multicast service packet in the embodiment in FIG. 5, and is not excessively described herein again.

The foregoing describes an implementation process of diffusing a multicast source route to a CPE via the RR. In this embodiment of this application, the RR can be further for diffusing a multicast rendezvous point route to the CPE. This is described next.

The first CPE receives a second BGP update packet sent by the RR, where the second BGP update packet carries an IP address of a multicast rendezvous point and an identifier of a fourth site. The first CPE records the identifier of the fourth site as an overlay multicast RPF next-hop site identifier corresponding to the IP address of the multicast rendezvous point. For example, the first CPE enables the IP address of the multicast rendezvous point to correspond to the identifier of the fourth site, and stores the IP address of the multicast rendezvous point and the identifier of the fourth site.

The second BGP update packet carries multicast rendezvous point routing information, and the multicast rendezvous point routing information includes a second route prefix and a second extended community attribute. The second route prefix is the IP address of the multicast rendezvous point, and the second extended community attribute is the identifier of the fourth site. Optionally, the second BGP update packet is transferred based on the BGP IPv4-MVPN instance address family.

The overlay multicast RPF next-hop site identifier that is recorded by the first CPE and that corresponds to the IP address of the multicast rendezvous point is for guiding the first CPE to transfer a multicast join message to the multicast rendezvous point and generate an SD-WAN overlay routing table in a process of transferring the multicast join message.

It should be understood that, when a multicast join message received by the first CPE is a (*. G) message, the first CPE transfers the multicast join message based on the overlay multicast RPF next-hop site identifier corresponding to the IP address of the multicast rendezvous point. When a multicast join message received by the first CPE is an (S. G) message, the first CPE transfers the multicast join message based on an overlay multicast RPF next-hop site identifier corresponding to a multicast source IP address.

In an example, the first CPE obtains a third multicast join message from a third CPE, where the third multicast join message carries third multicast join route information, the third multicast join route information includes a second multicast group IP address, an identifier of the third CPE, the identifier of the second site to which the first CPE belongs, and an identifier of a fifth site to which the third CPE belongs, and the third PCE is one of the plurality of CPEs. The first CPE generates a fourth multicast join message based on the third multicast join message and the overlay multicast RPF next-hop site identifier corresponding to the IP address of the multicast rendezvous point, where the fourth multicast join message carries fourth multicast join route information, and the fourth multicast join route information includes the second multicast group IP address, the identifier of the first CPE, the identifier of the fourth site, and the identifier of the second site. The first CPE transfers the fourth multicast join message to a CPE in the fourth site through an SD-WAN link between the first CPE and the CPE in the fourth site based on the multicast RPF next-hop site identifier corresponding to the IP address of the multicast rendezvous point.

In a process of transferring the third multicast join message, the first CPE generates a second forwarding entry in the SD-WAN overlay multicast forwarding table. A multicast group IP address in the second forwarding entry is the second multicast group IP address, an egress site identifier in the second forwarding entry is the identifier of the fifth site, and an ingress site identifier in the second forwarding entry is the identifier of the fourth site. The second forwarding entry generated by the first CPE in the process of transferring the third multicast join message is a (*. G) forwarding entry: After generating the second forwarding entry in the SD-WAN overlay multicast forwarding table, the first CPE can forward the multicast service packet about the second multicast group based on the second forwarding entry.

In the embodiment in FIG. 7, the overlay multicast RPF next-hop site identifier corresponding to the multicast source and/or the overlay multicast RPF next-hop site identifier corresponding to the multicast rendezvous point are diffused through reflection performed by the RR, so that a CPE can subsequently transfer a multicast join message to the multicast source or the multicast rendezvous point based on a specified overlay multicast RPF next-hop site identifier. Optionally, the overlay multicast RPF next-hop site identifier is configuration data delivered by a controller (AC) to the RR. That is, the overlay multicast RPF next-hop site identifier is specified on the RR through configuration of the AC. The configuration data is generated through orchestration of management personnel, or the configuration data is generated by the controller or another management device by performing path computation automatically based on an SD-WAN overlay network topology. The configuration data indicates an overlay unicast path from a branch site to the multicast source and/or an overlay unicast path from the branch site to the multicast rendezvous point.

In conclusion, in this embodiment of this application, the RR specifies an overlay multicast RPF route to the CPE to implement SD-WAN overlay multicast communication, and the CPE does not need to perform path computation autonomously, so that a computing power requirement of the CPE is reduced.

FIG. 8 is a flowchart of still another communication method according to an embodiment of this application. The method is applied to an SD-WAN overlay network, and the overlay network includes a plurality of CPEs and a route reflector RR. Refer to FIG. 8. The method includes the following steps.

Step 801: The RR receives a first BGP update packet sent by a first CPE in a first site. where the first BGP update packet carries an IP address of a first multicast source and an identifier of a second site.

In this embodiment of this application, a position of a multicast source, namely, an overlay unicast route of the multicast source, is diffused to the plurality of CPEs through reflection performed by the RR. The RR receives the first BGP update packet sent by the first CPE in the first site, where the first BGP update packet is for diffusing a position of the first multicast source. When the identifier of the second site carried in the first BGP update packet is different from an identifier of the first site, that is, when the first site and the second site are not a same site, it indicates that the position of the first multicast source has been reflected at least once. When the identifier of the second site carried in the first BGP update packet is an identifier of the first site, that is, when the first site and the second site are a same site, it indicates that the position of the first multicast source has not been reflected, and is to be reflected by using the RR for the first time.

The first BGP update packet carries first multicast source route information, the first multicast source route information includes a first route prefix and a first extended community attribute, the first route prefix is the IP address of the first multicast source, and the first extended community attribute is the identifier of the second site.

Optionally, in this embodiment of this application, the RR can diffuse the position of the multicast source and/or a position of the multicast rendezvous point based on a BGP ipv4-multicast vpn-instance address family peer relationship established between the RR and a CPE. For example, the RR receives the first BGP update packet based on a BGP ipv4-multicast vpn-instance address family (BGP IPv4-MVPN instance address family) peer relationship established between the RR and a CPE in the first site. That is, the first BGP update packet is transferred based on BGP ipv4-multicast vpn-instance address family. The BGP ipv4-multicast vpn-instance address family corresponds to the first extended community attribute. In other words, the extended community attribute is an extended community attribute defined in a BGP IPv4-MVPN instance address family protocol in the solution, and the extended community attribute is for specifying an overlay multicast RPF next-hop site identifier.

Step 802: The RR reflects a second BGP update packet to a CPE in a third site based on a configured overlay unicast path from a branch site to the first multicast source, where the second BGP update packet carries the IP address of the first multicast source and the identifier of the first site, the second BGP update packet indicates the CPE in the third site to record the identifier of the first site as an overlay multicast RPF next-hop site identifier corresponding to the IP address of the first multicast source, and the overlay multicast RPF next-hop site identifier is for guiding the CPE in the third site to transfer a multicast join message and generate an SD-WAN overlay multicast forwarding table in a process of transferring the multicast join message.

In this embodiment of this application, after receiving the first BGP update packet, the RR can determine an identifier of a next-hop site of the first BGP update packet based on configuration data, that is, determine an identifier of the third site. The configuration data indicates the overlay unicast path from the branch site to the first multicast source. The RR reflects the second BGP update packet to the CPE in the third site, where the second BGP update packet carries the IP address of the first multicast source and the identifier of the first site. Optionally, the configuration data is configuration data delivered by a controller to the RR. That is, the overlay multicast RPF next-hop site identifier is specified on the RR through configuration of the AC. The configuration data is generated through orchestration of management personnel, or the configuration data is generated by the controller by performing path computation automatically based on an SD-WAN overlay network topology.

When the first site and the second site are different sites, the RR generates the second BGP update packet based on the identifier of the first site and the first BGP update packet. For example, the RR modifies the identifier of the second site carried in the first BGP update packet to the identifier of the first site, to obtain the second BGP update packet. When the first site and the second site are the same site, the RR uses the first BGP update packet as the second BGP update packet. That is, the RR does not update a first position diffusion message. Alternatively, when the first site and the second site are the same site, the RR modifies a field in the first BGP update packet based on a requirement, to obtain the second BGP update packet. Both the second BGP update packet and the first BGP update packet carry the IP address of the first multicast source and the identifier of the first site. A field other than the IP address of the first multicast source and the identifier of the first site in the first BGP update packet may be modified based on a requirement.

When the first BGP update packet carries the first route prefix and the first extended community attribute, the second BGP update packet carries the first route prefix and a second extended community attribute, where the second extended community attribute is the site identifier of the first site. It should be understood that the RR may obtain the second extended community attribute by modifying the first extended community attribute.

In this embodiment of this application, that a CPE (for example, the CPE in the first site) that receives the first BGP update packet records the identifier of the second site carried in the first BGP update packet as an overlay multicast RPF next-hop site identifier corresponding to the IP address of the first multicast source indicates that a next-hop site that is of the CPE in the first site and via which data of the CPE in the first site reaches the first multicast source is the second site. That a CPE (namely, the CPE in the third site) that receives the second BGP update packet records the identifier of the first site carried in the second BGP update packet as the overlay multicast RPF next-hop site identifier corresponding to the IP address of the first multicast source indicates that a next-hop site that is of the CPE in the third site and via which data of the CPE in the third site reaches the first multicast source is the first site. For example, the CPE in the third site records a correspondence between the IP address of the first multicast source and the identifier of the first site, where the correspondence represents the overlay multicast RPF next-hop site identifier corresponding to the IP address of the first multicast source.

Diffusion of a position of a multicast source S in FIG. 3 is used as an example. CPEs in a site 50 are CPEs to which the multicast source S is connected. The CPE 100 in the site 50 sends the 1st BGP update packet to an RR 1, where the 1st BGP update packet carries an IP address of the multicast source S and the site 50. The 1st BGP update packet is reflected by the RR 1 and diffused to a CPE 1 and a CPE 2 in a site 1. The CPE 1 and the CPE 2 record the site 50) as an overlay multicast RPF next-hop site identifier corresponding to the IP address of the multicast source S. The CPE 1 and the CPE 2 send the 1st BGP update packet to an RR 2. The RR 2 modifies the site 50 in the 1$^{st}$ BGP update packet to the site 1, to obtain the 2nd BGP update packet, where the 2nd BGP update packet carries the IP address of the multicast source S and the site 1. The RR 2 reflects the 2nd BGP update packet to a CPE 3 and a CPE 4 in a site 2. The CPE 3 and the CPE 4 record the site 1 as an overlay multicast RPF next-hop site identifier corresponding to the IP address of the multicast source S, and send the 2nd BGP update packet to the RR 2. The RR 2 modifies the site 1 in the 2nd BGP update packet to the site 2, to obtain the 3rd BGP update packet, where the 3rd BGP update packet carries the IP address of the multicast source S and the site 2. The RR 2 reflects the 3rd BGP update packet to a CPE 5 and a CPE 6 in a site 3. The CPE 5 and the CPE 6 record the site 2 as an overlay multicast RPF next-hop site identifier corresponding to the IP address of the multicast source S. A diffusion process of the position of the multicast source S has ended so far.

In this embodiment of this application, the position of the multicast rendezvous point, namely, an overlay unicast route of the multicast rendezvous point, can also be diffused to each CPE through reflection performed by the RR. For example, the RR receives a third BGP update packet sent by the first CPE in the first site, where the third BGP update packet carries an IP address of the multicast rendezvous point (RP) and the identifier of the second site. When the first site and the second site are not the same site, it indicates that the position of the RP has been reflected at least once. When the first site and the second site are the same site, it indicates that the position of the RP has not been reflected, and is to be reflected by using the RR for the first time. The RR reflects a fourth BGP update packet to a CPE in a fourth site based on a configured overlay unicast path from the branch site to the multicast rendezvous point, where the fourth BGP update packet carries the IP address of the multicast rendezvous point and the identifier of the first site. The fourth BGP update packet indicates the CPE in the fourth site to record the identifier of the first site as an overlay multicast RPF next-hop site identifier corresponding to the IP address of the multicast rendezvous point.

The third BGP update packet carries first multicast rendezvous point routing information, the first multicast rendezvous point routing information includes a second route prefix and a third extended community attribute, the second route prefix is the IP address of the multicast rendezvous point, and the third extended community attribute is the identifier of the second site. The fourth BGP update packet carries second multicast rendezvous point routing information, the second multicast rendezvous point routing information includes the second route prefix and a fourth extended community attribute, the second route prefix is the IP address of the multicast rendezvous point, and the fourth extended community attribute is the identifier of the first site. Optionally, the third BGP update packet and the fourth BGP update packet are transferred based on the BGP IPv4-MVPN instance address family.

In this embodiment of this application, the position of the multicast source and/or the multicast rendezvous point are/is diffused through reflection performed by the RR, so that a CPE can subsequently reversely query for the position of the multicast source and/or the multicast rendezvous point based on a site identifier carried in a BGP update packet.

FIG. 2 is used as an example. An overlay multicast RPF next-hop site identifier that is recorded by the CPEs in the site 3 and that corresponds to an IP address of an RP is the site 2, and the overlay multicast RPF next-hop site identifier that is recorded by the CPEs in the site 3 and that corresponds to the IP address of the multicast source S is the site 2. An overlay multicast RPF next-hop site identifier that is recorded by the CPEs in the site 2 and that corresponds to the IP address of the RP is the site 1, and the overlay multicast RPF next-hop site identifier that is recorded by the CPEs in the site 2 and that corresponds to the IP address of the multicast source S is the site 1. Routes that are recorded by the CPEs in the site 1 and that are from the CPEs in the site 1 to the RP are local direct routes, and the overlay multicast RPF next-hop site identifier that is recorded by the CPEs in the site 1 and that corresponds to the IP address of the multicast source S is the site 50. An overlay multicast RPF next-hop site identifier that is recorded by the CPEs in the site 50 and that corresponds to the IP address of the RP is the site 1, and a route, recorded by the CPEs in the site 50, to the multicast source S is an egress interface of a local site.

In this embodiment of this application, the overlay multicast RPF next-hop site identifier that is recorded by the CPE in the third site and that corresponds to the IP address of the first multicast source is for guiding the CPE in the third site to transfer the multicast join message to the first multicast source and generate the SD-WAN overlay multicast forwarding table in the process of transferring the multicast join message. The overlay multicast RPF next-hop site identifier that is recorded by the CPE in the fourth site and that corresponds to the IP address of the multicast rendezvous point is for guiding the CPE in the fourth site to transfer a multicast join message to the multicast rendezvous point and generate an SD-WAN overlay multicast forwarding table in a process of transferring the multicast join message.

In other words, an overlay multicast RPF next-hop site identifier recorded by a CPE is used by the CPE to determine, in a process of sending a multicast join message, a next-hop site that the multicast join message passes through and generate an SD-WAN overlay multicast forwarding table at a site granularity in the process of sending the multicast join message. Simply speaking, a multicast-related route is specified to the CPE through reflection performed by the RR, so that the CPE subsequently propagates the overlay multicast join message and a multicast service packet based on a specified route.

In an example, a third CPE in the third site receives a first multicast join message from a fifth CPE in a fifth site, where the first multicast join message carries first multicast join route information, and the first multicast join route information includes the IP address of the first multicast source, a first multicast group IP address, an identifier of the fifth CPE, the identifier of the third site, and an identifier of the fifth site. The third CPE generates a second multicast join message based on the first multicast join message and an overlay multicast RPF next-hop site identifier (namely, the identifier of the first site) that is recorded by the third CPE and that corresponds to the IP address of the first multicast source. The second multicast join message carries the IP address of the first multicast source, the first multicast group IP address, the identifier of the first site, and the identifier of the third site. The third CPE transfers the second multicast join message to the CPE in the first site through an SD-WAN link between the third CPE and the CPE in the first site.

In a process of transferring the first multicast join message, the third CPE generates a first forwarding entry in the SD-WAN overlay multicast forwarding table. A multicast source IP address in the first forwarding entry is the IP address of the first multicast source, a multicast group IP address in the first forwarding entry is the first multicast group IP address, an egress site identifier in the first forwarding entry is the identifier of the fifth site, and an ingress site identifier in the first forwarding entry is the identifier of the first site. After generating the first forwarding entry in the SD-WAN overlay multicast forwarding table, the third CPE sends a multicast service packet about the first multicast source and a first multicast group based on the first forwarding entry. For a specific implementation, refer to related content in the embodiment in FIG. 7. Details are not described herein again.

Similarly, a fourth CPE in the fourth site receives a third multicast join message from a sixth CPE in a sixth site, where the third multicast join message carries third multicast join route information, and the third multicast join route information includes a second multicast group IP address, an identifier of the sixth CPE, an identifier of the fourth site, and an identifier of the sixth site. The fourth CPE generates a fourth multicast join message based on the third multicast join message and an overlay multicast RPF next-hop site identifier (namely, the identifier of the first site) that is recorded by the fourth CPE and that corresponds to the multicast rendezvous point, where the fourth multicast join message carries fourth multicast join route information, and the fourth multicast join route information includes the second multicast group IP address, an identifier of the fourth CPE, the identifier of the first site, and the identifier of the fourth site. The fourth CPE transfers the fourth multicast join message to the CPE in the first site through an SD-WAN link between the fourth CPE and the CPE in the first site.

In a process of transferring the third multicast join message, the fourth CPE generates a second forwarding entry in the SD-WAN overlay multicast forwarding table. A multicast group IP address in the second forwarding entry is the second multicast group IP address, an egress site identifier in the second forwarding entry is the identifier of the sixth site, and an ingress site identifier in the second forwarding entry is the identifier of the first site. After generating the second forwarding entry in the SD-WAN overlay multicast forwarding table, the fourth CPE sends a multicast service packet about a second multicast group based on the second forwarding entry. For a specific implementation, refer to related content in the embodiment in FIG. 7. Details are not described herein again.

A structure of the multicast join message in the embodiment in FIG. 8 is consistent with that of the multicast join message in the embodiment in FIG. 5, a structure of the SD-WAN overlay multicast forwarding table at the site granularity in the embodiment in FIG. 8 is consistent with that of the SD-WAN overlay multicast forwarding table at the site granularity in the embodiment in FIG. 5, and a structure of the multicast service packet in the embodiment in FIG. 8 is consistent with that of the multicast service packet in the embodiment in FIG. 5. Details are not described herein again.

In conclusion, in this embodiment of this application, the RR can specify the multicast-related route to the CPE by diffusing the position of the multicast source and/or the position of the multicast rendezvous point, and the CPE does not need to perform path computation, so that a computing power requirement of the CPE is reduced.

In the embodiments in FIG. 7 and FIG. 8, an RR can specify an overlay multicast RPF next-hop site to a CPE, so that the CPE can generate an SD-WAN overlay multicast forwarding table at a site granularity. In this way, a multicast service packet at the site granularity is propagated based on the multicast forwarding table, and reliability of a multicast service is ensured. In some other embodiments, an RR can specify an overlay multicast RPF next-hop CPE to a CPE, so that the CPE can generate an SD-WAN overlay multicast forwarding table at a CPE granularity. In this way, a multicast service packet at the CPE granularity is propagated based on the multicast forwarding table, and a resource waste is reduced. During specific implementation, a controller delivers configuration data to the RR, where the configuration data indicates an overlay unicast path from a CPE in a branch site to a multicast source and/or an overlay unicast path from the CPE in the branch site to a multicast rendezvous point, and the overlay unicast path is identified by TNP information of at least two CPEs. The configuration data is determined through orchestration of management personnel, or is obtained by the controller or another management device by performing path computation based on an SD-WAN overlay network topology. The RR modifies, hop by hop based on the overlay unicast path from the CPE in the branch site to the multicast source or the multicast rendezvous point, TNP information in a BGP update packet received by the RR, and reflects the BGP update packet to the CPE. The CPE that receives the BGP update packet records the TNP information carried in a multicast join message as TNP information of an overlay multicast RPF next-hop CPE corresponding to an IP address of the multicast source or the multicast rendezvous point. The TNP information that is of the overlay multicast RPF next-hop CPE and that is recorded by the CPE is used by the CPE to transfer the multicast join message and generate the SD-WAN overlay multicast forwarding table at the CPE granularity in a process of transferring the multicast join message. A route attribute carried in the multicast join message is the TNP information instead of a site identifier.

FIG. 9 is a flowchart of still another communication method according to an embodiment of this application. The method is applied to an SD-WAN overlay network, and the overlay network includes a plurality of CPEs. Refer to FIG. 9. The method includes the following steps.

Step 901: A first CPE obtains a first multicast join message from a second CPE, where the first multicast join message carries first multicast join route information, and the first multicast join route information includes a first multicast group IP address, an identifier of the second CPE, an identifier of a first site to which the first CPE belongs, and an identifier of a site to which the second CPE belongs.

The first CPE and the second CPE are CPEs in the plurality of CPEs in the SD-WAN overlay network. The second CPE is a CPE connected to a first multicast member, for example, a CPE in a branch site, or the second CPE is another CPE, for example, a CPE in an intermediate site. The first CPE is a CPE connected to the second CPE. An SD-WAN tunnel is established between the first CPE and the second CPE. The first CPE receives, through the SD-WAN tunnel, the first multicast join message sent by the second CPE. Alternatively, the first CPE receives, through reflection performed by an RR, the first multicast join message sent by the second CPE. The first multicast group IP address carried in the first multicast join message is an IP address of a first multicast group that the first multicast member requests to join.

In this embodiment of this application, the first multicast join route information carried in the first multicast join message includes a first route key and a first route attribute. The first route key includes the first multicast group IP address and the identifier of the second CPE. The first route attribute includes the identifier of the first site and an identifier of a second site. The first route attribute includes a VRI attribute and a TEA. The VRI attribute includes the identifier of the first site, and the TEA includes the identifier of the second site.

Optionally, the first multicast join message further carries indication information of a target route type, and the indication information indicates the first CPE to parse the first multicast join route information based on the target route type, and indicates that the first multicast join message is for advertising the first multicast join route information.

Optionally, the first multicast join message and a second multicast join message are transferred based on a BGP NG-MVPN address family, and the BGP NG-MVPN address family corresponds to the target route type. It should be understood that the target route type is extended in the BGP NG-MVPN address family to transfer an overlay multicast join route.

Alternatively, the first multicast join message and a second multicast join message are transferred based on a BGP-ethernet virtual private network EVPN address family, and the BGP EVPN address family corresponds to the target route type. It should be understood that the target route type is extended in the BGP EVPN address family to transfer an overlay multicast join route.

The VRI attribute and the TEA correspond to two target route types extended in the solution. For example, the two target route types are extended in the BGP NG-MVPN address family or the BGP EVPN address family to perform overlay multicast join, and the two target route types correspond to the VRI attribute and the TEA respectively.

Optionally, the first route key further carries an identifier of a routing domain (RD) to which the first CPE belongs and an identifier of a source autonomous system (Source AS) to which the first CPE belongs. When the first multicast member has learned of an IP address of a first multicast source, the first route key further carries the IP address of the first multicast source. In this case, the first multicast join message is an (S. G) message. When the first multicast member does not obtain an IP address of a first multicast source temporarily, and the first route key further carries an IP address of a multicast rendezvous point, the first multicast join message is a (*. G) message.

The (*. G) message is used as an example, and a route key (key) of the (*. G) message is (RD. Source AS. RP. G, and Originating IP). The (S. G) message is used as an example, and a route key of the (S. G) message is (RD. Source AS. S. G, and Originating IP). Originating IP indicates an IP address of a previous-hop CPE that the (*. G) message passes through. For example, an originating IP carried in the first multicast join message is the identifier of the second CPE. Optionally, originating IPs configured for CPEs that belong to a same site may be the same, or may be different. This is not limited in this embodiment of this application. An example in which the first multicast join message is (*. G) is used in the following descriptions.

When the second CPE is the CPE connected to the first multicast member, the second CPE receives a multicast join message sent by the first multicast member, where a multicast group IP address carried in the multicast join message is the IP address (namely, the first multicast group IP address) of the multicast group that the first multicast member requests to join. The multicast join message received by the second CPE carries the first multicast group IP address and the VRI attribute (the identifier of the first site), but carries no originating IP or TEA. In some other embodiments, to maintain consistency of multicast join message formats, the multicast join message received by the second CPE carries the first multicast group IP address, the originating IP, the VRI attribute, and the TEA. The originating IP carried in the multicast join message is an IP address of the second CPE, or is null. The TEA carried in the multicast join message is the identifier of the second site, or is null.

Step 902: The first CPE generates the second multicast join message based on the first multicast join message, where the second multicast join message carries second multicast join route information, and the second multicast join route information includes the first multicast group IP address, an identifier of the first CPE, an identifier of a third site, and the identifier of the first site.

In this embodiment of this application, there are a plurality of implementations in which the first CPE generates the second multicast join message. The following describes two of the implementations.

In a first implementation, the first CPE generates the second multicast join message based on an SD-WAN overlay routing table and the first multicast join message.

It can be learned from the foregoing embodiment that the SD-WAN overlay routing table is a routing table at a site granularity or a routing table at a CPE granularity. Based on this, the first CPE generates the second multicast join message based on the SD-WAN overlay routing table at the site granularity and the first multicast join message, or generates the second multicast join message based on the SD-WAN overlay routing table at the CPE granularity and the first multicast join message. This is described next.

In an implementation in which the SD-WAN overlay routing table is the routing table at the site granularity: the SD-WAN overlay routing table includes a routing entry corresponding to each of a plurality of destination sites, the routing entry corresponding to the destination site includes an identifier of the destination site and an identifier of a next-hop site that is of the first CPE and via which data of the first CPE reaches the destination site, and the plurality of destination sites include a site to which a CPE other than the first CPE in the plurality of CPEs belongs. An implementation process in which the first CPE generates the second multicast join message based on the SD-WAN overlay routing table at the site granularity and the first multicast join message includes: The first CPE queries the SD-WAN overlay routing table at the site granularity for a routing entry corresponding to a first destination site, to obtain a first routing entry, where the first destination site is a site to which the multicast rendezvous point belongs. The first CPE obtains an identifier of a next-hop site in the first routing entry, to obtain the identifier of the third site. The first CPE generates the second multicast join message based on the identifier of the third site and the first multicast join message.

In an implementation in which the SD-WAN overlay routing table is the routing table at the CPE granularity: the SD-WAN overlay routing table includes a routing entry corresponding to each of a plurality of destination CPEs, the routing entry corresponding to the destination CPE includes an identifier of the destination CPE, and local TNP information and peer TNP information of a target SD-WAN link, the target SD-WAN link is an SD-WAN link between the first CPE and a next-hop CPE that is of the first CPE and via which data of the first CPE reaches the destination CPE, the peer TNP information is TNP information of the next-hop CPE that is of the first CPE and via which the data of the first CPE reaches the destination CPE, and the plurality of destination CPEs include a CPE other than the first CPE in the plurality of CPEs. An implementation process in which the first CPE generates the second multicast join message based on the SD-WAN overlay routing table and the first multicast join message includes: The first CPE queries the SD-WAN overlay routing table at the CPE granularity for a routing entry corresponding to a first destination CPE, to obtain a second routing entry, where the first destination CPE is a CPE corresponding to the multicast rendezvous point. The first CPE obtains local TNP information and peer TNP information in a third routing entry. The first CPE queries, based on the obtained peer TNP information, for an identifier of a site to which a next-hop CPE that is of the first CPE and via which the data of the first CPE reaches the first destination CPE belongs, to obtain the identifier of the third site. The first CPE generates the second multicast join message based on the identifier of the third site and the first multicast join message.

The first CPE stores a correspondence between TNP information and a site identifier. For example, the first CPE stores TNP information of each CPE to which the first CPE is connected and a site identifier corresponding to the TNP information of each CPE. In addition, a process in which the first CPE generates the second multicast join message based on the identifier of the third site and the first multicast join message is as follows: The first CPE modifies the VRI attribute in the first multicast join message to the identifier of the third site, and modifies the TEA in the first multicast join message to the identifier of the first site, where a modified first multicast join message is the second multicast join message.

In this embodiment of this application, a process in which the first CPE generates the SD-WAN overlay routing table includes: The first CPE obtains node information of each of the plurality of CPEs, where the node information of the CPE includes an identifier of the CPE and information about an SD-WAN link on which the CPE is located. The first CPE generates an SD-WAN overlay network topology based on the node information of each of the plurality of CPEs. The first CPE determines, based on the SD-WAN overlay network topology, an overlay route from the first CPE to each of the plurality of destination CPEs, where the plurality of destination CPEs include the CPE other than the first CPE in the plurality of CPEs. The first CPE generates the SD-WAN overlay routing table based on the overlay route from the first CPE to each of the plurality of destination CPEs. For a specific implementation, refer to related content in the embodiment in FIG. 5. Details are not described herein again.

In a second implementation, the first CPE generates the second multicast join message based on the first multicast join message and an overlay multicast RPF next-hop site identifier that is recorded by the first CPE and that corresponds to the IP address of the multicast rendezvous point.

In a second implementation, the first CPE receives a first BGP update packet sent by an RR, where the first BGP update packet carries the IP address of the multicast rendezvous point and the identifier of the third site. The first CPE records the identifier of the third site as the overlay multicast RPF next-hop site identifier corresponding to the IP address of the multicast rendezvous point. Based on this, the first CPE generates the second multicast join message based on the first multicast join message and the overlay multicast RPF next-hop site identifier that is recorded by the first CPE and that corresponds to the IP address of the multicast rendezvous point. For example, the first CPE modifies the VRI attribute in the first multicast join message to the overlay multicast RPF next-hop site identifier that is recorded by the first CPE and that corresponds to the IP address of the multicast rendezvous point, that is, modifies the VRI attribute in the first multicast join message to the identifier of the third site, and modifies the TEA in the first multicast join message to the identifier of the first site, where a modified first multicast join message is the second multicast join message. For related descriptions of the overlay multicast RPF next-hop site identifier, refer to related content in the embodiments in FIG. 7 and FIG. 8. Details are not described herein again.

For example, the first multicast join message is the (*. G) message, and the first multicast join message carries the first route key, the VRI attribute, and the TEA. The first route key is a (RD 0. Source AS 0. RP. G, and CPE-IP 0)), where RD 0. Source AS 0, and CPE-IP 0 respectively indicate a routing domain to which the second CPE belongs, an autonomous system to which the second CPE belongs, and the IP address of the second CPE. A second route key carried in the second multicast join message (namely: the updated first multicast join message) is (RD 1. Source AS 1. RP. G, and CPE-IP 1), where RD 1. Source AS 1, and CPE-IP 1 respectively indicate the routing domain to which the first CPE belongs, the autonomous system to which the first CPE belongs, and an IP address of the first CPE. The VRI attribute and the TEA carried in the first multicast join message that has not been updated are a site 1 and a site 0) respectively, where the site 1 is the identifier of the first site, and the site 0) is the identifier of the second site. A VRI attribute and a TEA carried in the updated first multicast join message are a site 2 and the site 1 respectively, where the site 2 is the identifier of the third site.

In this embodiment of this application, a destination of information propagated by using the first multicast join message is the multicast rendezvous point. Because the first site to which the first CPE belongs is not a site in which the multicast rendezvous point is located, the first CPE generates the second multicast join message. In some other embodiments, if the first site is a site in which the multicast rendezvous point is located, and the first CPE is the multicast rendezvous point, transfer of the multicast join message is completed after the first CPE receives the first multicast join message. If the first site is a site in which the multicast rendezvous point is located, but the first CPE is not the multicast rendezvous point, the first CPE sends the first multicast join message to the multicast rendezvous point, so that transfer of the multicast join message is completed.

Step 903: The first CPE transfers the second multicast join message to a CPE in the third site through an SD-WAN link between the first CPE and the CPE in the third site.

In the implementation in which the SD-WAN overlay routing table generated by the first CPE is the routing table at the site granularity, an implementation process in which the first CPE transfers the second multicast join message to the CPE in the third site through the SD-WAN link between the first CPE and the CPE in the third site includes: The first CPE obtains local TNP information of an SD-WAN link between each of a part or all of CPEs in the third site and the first CPE. The first CPE sends the second multicast join message through a port indicated by the local TNP information of the SD-WAN link between each of the part or all of the CPEs in the third site and the first CPE.

The first CPE obtains the local TNP information of the SD-WAN link between each of the part or all of the CPEs in the third site and the first CPE based on the identifier of the third site. The first CPE sends the second multicast join message through the port indicated by the local TNP information of the SD-WAN link between each of the part or all of the CPEs in the third site and the first CPE. It should be understood that reliability is higher if the first CPE sends the second multicast join message to all of the CPEs in the third site. If the first CPE sends the second multicast join message to the part of the CPEs in the third site according to a load balance policy, in a random sending manner, or in another manner, a resource waste can be reduced.

In some other embodiments, the first CPE sends the second multicast join message to the corresponding RR, to diffuse the second multicast join message to the CPE in the third site via the RR. After the RR receives the second multicast join message sent by the first CPE, the RR parses the second multicast join message to obtain the identifier of the third site, and the RR sends the second multicast join message to the CPE in the third site based on the identifier of the third site.

In the implementation in which the SD-WAN overlay routing table generated by the first CPE is the routing table at the site granularity: an implementation process in which the first CPE transfers the second multicast join message to the CPE in the third site through the SD-WAN link between the first CPE and the CPE in the third site includes: The first CPE sends the second multicast join message through a port indicated by the obtained local TNP information. It should be understood that the port indicated by the local TNP information obtained by the first CPE is connected to a CPE in the third site. An SD-WAN link between the CPE and the first CPE is identified by the local TNP information and the peer TNP information that are obtained by the first CPE, and the first CPE sends the second multicast join message to the CPE in the third site.

After the multicast join message reaches the destination RP, the RP updates a multicast distribution tree based on the received multicast join message and a registration message of a multicast source. The multicast distribution tree can be used by the RP to manage the multicast source and a multicast member, to implement a multicast service. This is not excessively described in this embodiment of this application.

It can be learned from the foregoing descriptions that a CPE can generate an SD-WAN overlay multicast forwarding table in a process of transferring a multicast join message. The first CPE is still used as an example for description below:

The first CPE generates a first forwarding entry in the SD-WAN overlay multicast forwarding table, where a multicast group IP address in the first forwarding entry is the first multicast group IP address, an egress site identifier in the first forwarding entry is the identifier of the second site, and an ingress site identifier in the first forwarding entry is the identifier of the third site. The SD-WAN overlay multicast forwarding table is a multicast forwarding table at the site granularity: A format of the multicast forwarding table is consistent with that of the multicast forwarding table at the site granularity in the embodiment in FIG. 5. Details are not described herein again.

After generating the first forwarding entry in the SD-WAN overlay multicast forwarding table at the site granularity, the first CPE may send a multicast service packet about the first multicast group based on the first forwarding entry. For example, the first CPE receives a first multicast service packet sent by a third CPE in the third site, where the first multicast service packet includes a first SD-WAN ExtGRE header and a first IP header, the first SD-WAN ExtGRE header indicates a protocol type of the first IP header, and the first IP header carries the IP address of the first multicast source and the first multicast group IP address. The first CPE parses the first IP header based on the protocol type indicated by the first SD-WAN ExtGRE header, to obtain the IP address of the first multicast source and the first multicast group IP address. The first CPE queries the SD-WAN overlay multicast forwarding table for a forwarding entry in which a multicast group IP address is the first multicast group IP address and an ingress site identifier is the identifier of the third site, to obtain the first forwarding entry. The first CPE obtains the egress site identifier in the first forwarding entry, to obtain the identifier of the second site. The first CPE sends the first multicast service packet to a CPE in the second site based on the identifier of the second site.

The first CPE obtains local TNP information of an SD-WAN link between each of a part or all of CPEs in the second site and the first CPE based on the identifier of the second site. The first CPE sends the first multicast service packet through a port indicated by the local TNP information of the SD-WAN link between each of the part or all of the CPEs in the second site and the first CPE. It should be understood that reliability is higher if the first CPE sends the first multicast service packet to all of the CPEs in the second site. If the first CPE sends the first multicast service packet to the part of the CPEs in the second site according to the load balance policy, in the random sending manner, or in the another manner, the resource waste can be reduced.

A format of the multicast service packet in the embodiment in FIG. 9 is consistent with that of the multicast service packet in the embodiment in FIG. 5. For an implementation process in which the first CPE sends the multicast service packet, refer to related content in the embodiment in FIG. 5. Details are not excessively described herein.

In conclusion, in this embodiment of this application, the IP address of the previous-hop CPE, a site identifier of a current site, and a site identifier of a previous-hop site are carried in the multicast join message, to implement an SD-WAN overlay multicast function.

In the embodiment in FIG. 9, the first CPE is used as an example to describe a case in which when a multicast join message carries a site identifier, the first CPE can generate the SD-WAN overlay multicast forwarding table at the site granularity in a process of transferring the multicast join message. In some implementations described in the embodiment in FIG. 5, a multicast join message may also carry TNP information of a CPE. In this way, a CPE can generate the SD-WAN overlay multicast forwarding table at the CPE granularity in a process of transferring the multicast join message. The multicast join message carrying the TNP information is transferred based on the SD-WAN overlay routing table at the CPE granularity, or is transferred based on TNP information of an overlay multicast RPF next-hop CPE. The TNP information of the overlay multicast RPF next-hop CPE recorded by the CPE is from a BGP update packet reflected by the RR. For a specific implementation, refer to the foregoing related content.

FIG. 10 is a flowchart of still another communication method according to an embodiment of this application. The method is applied to an SD-WAN overlay network, and the overlay network includes a plurality of CPEs. Refer to FIG. 10. The method includes the following steps.

Step 1001: A first CPE receives a first multicast service packet sent by a second CPE in a first site, where the first multicast service packet carries a first SD-WAN ExtGRE header and a first IP header, the first SD-WAN ExtGRE header indicates a protocol type of the first IP header, and the first IP header carries an IP address of a first multicast source and a first multicast group IP address.

The first CPE and the second CPE are CPEs in the plurality of CPEs in an SD-WAN overlay network.

In this embodiment of this application, an SD-WAN-related protocol is extended to send a multicast service packet. For example, the first CPE propagates the multicast service packet. The multicast service packet received by the first CPE carries the first SD-WAN ExtGRE header and the first IP header. The first IP header is a standard IPv4 header. Certainly, in some other embodiments, the first IP header is a standard IPV6 header. In all of the following descriptions, an example in which the first IP header is the standard IPv4 header is used.

For example, an IP header is added to a packet structure of a unicast service packet in an SD-WAN scenario. The added IP header includes a source address field and a destination address field. The source address field is for carrying a multicast source IP address. The destination address field is for carrying a multicast group IP address. In addition, the first IP header further includes another field defined in a standard IPv4 protocol. Details are not described herein again.

A structure of the multicast service packet in the embodiment in FIG. 10 is consistent with that of the multicast service packet shown in FIG. 6. For understanding, refer to related descriptions in FIG. 6. Details are not described herein again.

Step 1002: The first CPE parses the first IP header based on the protocol type indicated by the first SD-WAN ExtGRE header, to obtain the IP address of the first multicast source and the first multicast group IP address.

The first SD-WAN ExtGRE header is located before the first IP header. The first CPE parses the first SD-WAN ExtGRE header to obtain the protocol type indicated by the first SD-WAN ExtGRE header. The first CPE parses the first IP header based on the protocol type indicated by the first SD-WAN ExtGRE header, to obtain the IP address of the first multicast source and the first multicast group IP address.

If the protocol type indicated by the first SD-WAN ExtGRE header is the IPV4 protocol, it indicates that an encapsulation format of the first IP header complies with the IPv4 protocol. In this case, the first CPE parses the first IP header according to the IPV4 protocol. If the protocol type indicated by the first SD-WAN ExtGRE header is an IPV6 protocol, it indicates that an encapsulation format of the first IP header complies with the IPV6 protocol. In this case, the first CPE parses the first IP header according to the IPV6 protocol.

Step 1003: The first CPE finds a first forwarding entry from an SD-WAN overlay multicast forwarding table based on the first multicast group IP address.

The SD-WAN overlay multicast forwarding table generated by the first CPE is a multicast forwarding table at a site granularity or a multicast forwarding table at a CPE granularity.

In an implementation in which the SD-WAN overlay multicast forwarding table is the multicast forwarding table at the site granularity, a forwarding entry in the SD-WAN overlay multicast forwarding table includes a multicast group IP address, an egress site identifier, and an ingress site identifier. It should be understood that, in the SD-WAN overlay multicast forwarding table, a part of forwarding entries may be (*. G) forwarding entries, and the other part of the forwarding entries may be (S. G) forwarding entries. The (*. G) forwarding entry includes a multicast group IP address, an egress site identifier, and an ingress site identifier, and includes no multicast source IP address. The (S. G) forwarding entry includes a multicast source IP address, a multicast group IP address, an egress site identifier, and an ingress site identifier.

For example, the first forwarding entry is an (*. G) forwarding entry. An implementation process in which the first CPE finds the first forwarding entry from the SD-WAN overlay multicast forwarding table based on the first multicast group IP address is as follows: The first CPE queries the SD-WAN overlay multicast forwarding table for a forwarding entry in which a multicast group IP address is the first multicast group IP address and an ingress site identifier is an identifier of a first site, to obtain the first forwarding entry.

For example, the first forwarding entry is an (S. G) forwarding entry. An implementation process in which the first CPE finds the first forwarding entry from the SD-WAN overlay multicast forwarding table based on the first multicast group IP address is as follows: The first CPE finds the first forwarding entry from the SD-WAN overlay multicast forwarding table based on the IP address of the first multicast source and the first multicast group IP address. Specifically, the first CPE queries the SD-WAN overlay multicast forwarding table for a forwarding entry in which a multicast source IP address is the IP address of the first multicast source, a multicast group IP address is the first multicast group IP address, and an ingress site identifier is an identifier of a first site, to obtain the first forwarding entry.

In an implementation in which the SD-WAN overlay multicast forwarding table is the multicast forwarding table at the CPE granularity, a forwarding entry in the SD-WAN overlay multicast forwarding table includes a multicast group IP address, egress port information, and ingress port information. It should be understood that, in the SD-WAN overlay multicast forwarding table, a part of forwarding entries may be (*. G) forwarding entries, and the other part of the forwarding entries may be (S. G) forwarding entries. The (*. G) forwarding entry includes a multicast group IP address, egress port information, and ingress port information, and includes no multicast source IP address. The (S. G) forwarding entry includes a multicast source IP address, a multicast group IP address, egress port information, and ingress port information.

For example, the first forwarding entry is an (S. G) forwarding entry. An implementation process in which the first CPE finds the first forwarding entry from the SD-WAN overlay multicast forwarding table based on the first multicast group IP address is as follows: The first CPE queries the SD-WAN overlay multicast forwarding table for a forwarding entry in which a multicast group IP address is the first multicast group IP address and ingress port information is TNP information of the second CPE, to obtain the first forwarding entry.

For example, the first forwarding entry is an (S. G) forwarding entry. An implementation process in which the first CPE finds the first forwarding entry from the SD-WAN overlay multicast forwarding table based on the first multicast group IP address is as follows: The first CPE finds the first forwarding entry from the SD-WAN overlay multicast forwarding table based on the IP address of the first multicast source and the first multicast group IP address. Specifically, the first CPE queries the SD-WAN overlay multicast forwarding table for a forwarding entry in which a multicast source IP address is the IP address of the first multicast source, a multicast group IP address is the first multicast group IP address, and ingress port information is TNP information of the second CPE, to obtain the first forwarding entry.

Step 1004: The first CPE sends the first multicast service packet based on the first forwarding entry.

In the implementation in which the SD-WAN overlay multicast forwarding table is the multicast forwarding table at the site granularity: an implementation process in which the first CPE sends the first multicast service packet based on the first forwarding entry is as follows: The first CPE obtains an egress site identifier in the first forwarding entry, to obtain an identifier of a second site. The first CPE sends the first multicast service packet to a CPE in the second site through an SD-WAN link between the first CPE and the CPE in the second site based on the identifier of the second site.

An implementation process in which the first CPE sends the first multicast service packet to the CPE in the second site through the SD-WAN link between the first CPE and the CPE in the second site based on the identifier of the second site is as follows: The first CPE obtains local TNP information of an SD-WAN link between each of a part or all of CPEs in the second site and the first CPE based on the identifier of the second site. The first CPE sends the first multicast service packet through a port indicated by the local TNP information of the SD-WAN link between each of the part or all of the CPEs in the second site and the first CPE. It should be understood that reliability is higher if the first CPE sends the first multicast service packet to all of the CPEs in the second site. If the first CPE sends the first multicast service packet to the part of the CPEs in the second site according to a load balance policy, in a random sending manner, or in another manner, a resource waste can be reduced.

In the implementation in which the SD-WAN overlay multicast forwarding table is the multicast forwarding table at the CPE granularity: an implementation process in which the first CPE sends the first multicast service packet based on the first forwarding entry is as follows: The first CPE obtains egress port information in the first forwarding entry, to obtain TNP information of a third CPE. The first CPE obtains, based on the TNP information of the third CPE, local TNP information of an SD-WAN link between the first CPE and the third CPE. The first CPE sends the first multicast service packet through a port indicated by the local TNP information of the SD-WAN link between the first CPE and the third CPE. The first CPE sends the multicast service packet at the CPE granularity: so that a resource waste to some extent can be reduced.

A structure of the SD-WAN overlay multicast forwarding table in the embodiment in FIG. 10 is consistent with that of the SD-WAN overlay multicast forwarding table described in the embodiment in FIG. 5. Refer to related descriptions in the embodiment in FIG. 5. Details are not described herein again.

In addition, a principle of an implementation process in which the first CPE generates the SD-WAN overlay multicast forwarding table in the embodiment in FIG. 10 is consistent with that of a process of generating the SD-WAN overlay multicast forwarding table described in the embodiment in FIG. 5. That is, the first CPE transfers a multicast join message based on an SD-WAN overlay routing table, and generates the SD-WAN overlay multicast forwarding table in a process of transferring the multicast join message. The first CPE obtains node information of each of the plurality of CPEs, generates an SD-WAN overlay network topology based on the node information of each of the plurality of CPEs, determines an overlay route from the first CPE to each of a plurality of destination CPEs based on the SD-WAN overlay network topology, and generates the SD-WAN overlay routing table based on the overlay route from the first CPE to each of the plurality of destination CPEs, where the plurality of destination CPEs are each CPE other than the first CPE in the plurality of CPEs. The SD-WAN overlay routing table is a routing table at the site granularity or a routing table at the CPE granularity. If the SD-WAN overlay routing table is the routing table at the site granularity, the first CPE can generate the SD-WAN overlay multicast forwarding table at the site granularity based on the SD-WAN overlay routing table. If the SD-WAN overlay routing table is the routing table at the CPE granularity, the first CPE can generate the SD-WAN overlay multicast forwarding table at the site granularity or the CPE granularity based on the SD-WAN overlay routing table. For a specific implementation, refer to detailed descriptions in the embodiment in FIG. 5. Details are not described herein again.

Alternatively, a principle of an implementation process in which the first CPE generates the SD-WAN overlay multicast forwarding table in the embodiment in FIG. 10 is consistent with that of a process of generating the SD-WAN overlay multicast forwarding table described in the embodiments in FIG. 7 and FIG. 8. That is, an RR reflects a BGP update packet to specify, to the first CPE, an overlay multicast RPF next-hop site identifier corresponding to an IP address of a multicast source and/or an IP address of a multicast rendezvous point. The first CPE transfers a multicast join message based on the overlay multicast RPF next-hop site identifier that is recorded by the first CPE and that corresponds to the IP address of the multicast source and/or the IP address of the multicast rendezvous point, and generates the SD-WAN overlay multicast forwarding table at the site granularity in a process of transferring the multicast join message. Alternatively, an RR reflects a BGP update packet to specify, to the first CPE. TNP information of an overlay multicast RPF next-hop CPE corresponding to an IP address of a multicast source and/or an IP address of a multicast rendezvous point. The first CPE transfers a multicast join message based on the overlay multicast RPF next-hop TNP information that is recorded by the first CPE and that corresponds to the IP address of the multicast source and/or the IP address of the multicast rendezvous point, and generates the SD-WAN overlay multicast forwarding table at the CPE granularity in a process of transferring the multicast join message. For a specific implementation, refer to detailed descriptions in the embodiments in FIG. 7 and FIG. 8. Details are not described herein again.

In conclusion, in this embodiment of this application, the SD-WAN-related protocol is extended, and specifically, a standard IP header is carried in a newly defined multicast service packet, to send the multicast service packet in the overlay network in the SD-WAN scenario. Because the added IP header is the standard IP header, the solution has quite strong generalization and applicability, and has good compatibility with an existing SD-WAN technology.

With reference to the foregoing embodiments in FIG. 1 to FIG. 10, the solution implements an overlay multicast service function in an SD-WAN flexible topology networking scenario. An SD-WAN flexible topology includes but is not limited to a single-layer flattened overlay topology (for example, a one-hop SD-WAN tunnel between a hub and a spoke) and a hierarchical multi-hop topology (for example, crossing a plurality of segments of SD-WAN tunnels between a branch site and a headquarters site). In addition, configuration and deployment of an SD-WAN overlay multicast solution provided in embodiments of this application are easy, coupling to an underlay network (for example, the internet or an MPLS private network) is quite weak, and impact on the underlay network is little. That is, no additional protocol extension or deployment is needed for a device in the underlay network, and the device in the underlay network does not need to sense an overlay multicast service either.

FIG. 11 is a schematic diagram of a structure of a communication apparatus 1100 according to an embodiment of this application. The communication apparatus 1100 may be implemented as a part or all of a communication device by using software, hardware, or a combination thereof. The communication device may be the CPE in the foregoing embodiment. In this embodiment of this application, the apparatus 1100 is applied to a first CPE in a plurality of CPEs included in an SD-WAN overlay network. Refer to FIG. 11. The apparatus 1100 includes a first obtaining module 1101, a first generation module 1102, a first determining module 1103, and a second generation module 1104.

The first obtaining module 1101 is configured to obtain node information of each of the plurality of CPEs, where the node information of the CPE includes an identifier of the CPE and information about an SD-WAN link on which the CPE is located.

The first generation module 1102 is configured to generate an SD-WAN overlay network topology based on the node information of each of the plurality of CPEs.

The first determining module 1103 is configured to determine, based on the SD-WAN overlay network topology, an overlay route from the first CPE to each of a plurality of destination CPEs, where the plurality of destination CPEs include a CPE other than the first CPE in the plurality of CPEs.

The second generation module 1104 is configured to generate an SD-WAN overlay routing table based on the overlay route from the first CPE to each of the plurality of destination CPEs.

Optionally, the node information of each CPE further includes an identifier of a site to which the CPE belongs, the SD-WAN overlay routing table includes a routing entry corresponding to each of a plurality of destination sites, the routing entry corresponding to the destination site includes an identifier of the destination site and an identifier of a next-hop site that is of the first CPE and via which data of the first CPE reaches the destination site, and the plurality of destination sites include sites to which the plurality of destination CPEs belong.

Optionally, the apparatus 1100 further includes:

a second obtaining module, configured to obtain a first multicast join message from a second CPE, where the first multicast join message carries first multicast join route information, the first multicast join route information includes a first multicast group IP address, an identifier of the second CPE, an identifier of a first site to which the first CPE belongs, and an identifier of a second site to which the second CPE belongs, and the second CPE is one of the plurality of CPEs;

a first query module, configured to query the SD-WAN overlay routing table for a routing entry corresponding to a first destination site, to obtain a first routing entry, where the first destination site is a site to which a multicast rendezvous point belongs;

a third obtaining module, configured to obtain an identifier of a next-hop site in the first routing entry, to obtain an identifier of a third site;

a third generation module, configured to generate a second multicast join message based on the identifier of the third site and the first multicast join message, where the second multicast join message carries second multicast join route information, and the second multicast join route information includes the first multicast group IP address, an identifier of the first CPE, the identifier of the third site, and the identifier of the first site; and a first transfer module, configured to transfer the second multicast join message to a CPE in the third site through an SD-WAN link between the first CPE and the CPE in the third site based on the identifier of the third site.

Optionally, the first multicast join message further carries indication information of a target route type, and the indication information indicates the first CPE to parse the first multicast join route information based on the target route type.

Optionally, the first multicast join message and the second multicast join message are transferred based on a BGP NG-MVPN address family, and the BGP NG-MVPN address family corresponds to the target route type; or the first multicast join message and the second multicast join message are transferred based on a BGP EVPN address family, and the BGP EVPN address family corresponds to the target route type.

Optionally, the apparatus 1100 further includes:

a fourth generation module, configured to generate a first forwarding entry in an SD-WAN overlay multicast forwarding table, where a multicast group IP address in the first forwarding entry is the first multicast group IP address, an egress site identifier in the first forwarding entry is the identifier of the second site, and an ingress site identifier in the first forwarding entry is the identifier of the third site.

Optionally, the second obtaining module is further configured to obtain a third multicast join message from a third CPE, where the third multicast join message carries third multicast join route information, the third multicast join route information includes an IP address of a first multicast source, the first multicast group IP address, an identifier of the third CPE, the identifier of the first site to which the first CPE belongs, and an identifier of a fourth site to which the third CPE belongs, and the third CPE is one of the plurality of CPEs.

The first query module is further configured to query the SD-WAN overlay routing table for a routing entry corresponding to a second destination site, to obtain a second routing entry, where the second destination site is a site accessed by the first multicast source.

The third obtaining module is further configured to obtain an identifier of a next-hop site in the second routing entry, to obtain an identifier of a fifth site.

The third generation module is further configured to generate a fourth multicast join message based on the identifier of the fifth site and the third multicast join message, where the fourth multicast join message carries fourth multicast join route information, and the fourth multicast join route information includes the IP address of the first multicast source, the first multicast group IP address, the identifier of the first CPE, the identifier of the fifth site, and the identifier of the first site.

The first transfer module is further configured to transfer the fourth multicast join message to a CPE in the fifth site through an SD-WAN link between the first CPE and the CPE in the fifth site based on the identifier of the fifth site.

Optionally, the fourth generation module is further configured to:

generate a first forwarding entry in an SD-WAN overlay multicast forwarding table, where a multicast source IP address in the first forwarding entry is the IP address of the first multicast source, a multicast group IP address in the first forwarding entry is the first multicast group IP address, an egress site identifier in the first forwarding entry is the identifier of the fourth site, and an ingress site identifier in the first forwarding entry is the identifier of the fifth site.

Optionally, the apparatus 1100 further includes:

a first receiving module, configured to receive a first multicast service packet sent by a fourth CPE in the fifth site, where the first multicast service packet includes a first SD-WAN ExtGRE header and a first IP header, the first SD-WAN ExtGRE header indicates a protocol type of the first IP header, and the first IP header carries the IP address of the first multicast source and the first multicast group IP address;

a first parsing module, configured to parse the first IP header based on the protocol type indicated by the first SD-WAN ExtGRE header, to obtain the IP address of the first multicast source and the first multicast group IP address;

a second query module, configured to query, for the first CPE, the SD-WAN overlay multicast forwarding table for a forwarding entry in which a multicast source IP address is the IP address of the first multicast source, a multicast group IP address is the first multicast group IP address, and an ingress site identifier is the identifier of the fifth site, to obtain the first forwarding entry;

a fourth obtaining module, configured to obtain the egress site identifier in the first forwarding entry, to obtain the identifier of the fourth site; and a first sending module, configured to send the first multicast service packet to a CPE in the fourth site through an SD-WAN link between the first CPE and the CPE in the fourth site based on the identifier of the fourth site.

Optionally, the first sending module includes:

an obtaining submodule, configured to obtain local TNP information of an SD-WAN link between each of a part or all of CPEs in the fourth site and the first CPE based on the identifier of the fourth site; and a sending submodule, configured to send the first multicast service packet through a port indicated by the local TNP information of the SD-WAN link between each of the part or all of the CPEs in the fourth site and the first CPE.

Optionally, the SD-WAN overlay routing table includes a routing entry corresponding to each of the plurality of destination CPEs, the routing entry corresponding to the destination CPE includes an identifier of the destination CPE, and local transport network port TNP information and peer TNP information of a target SD-WAN link, the target SD-WAN link is an SD-WAN link between the first CPE and a next-hop CPE that is of the first CPE and via which data of the first CPE reaches the destination CPE, and the peer TNP information is TNP information of the next-hop CPE that is of the first CPE and via which the data of the first CPE reaches the destination CPE.

Optionally, the apparatus 1100 further includes:

a fifth obtaining module, configured to obtain a fifth multicast join message from a fifth CPE, where the fifth multicast join message carries fifth multicast join route information, the fifth multicast join route information includes a second multicast group IP address, an identifier of the fifth CPE, an identifier of a first site to which the first CPE belongs, and an identifier of a sixth site to which the fifth CPE belongs, where the fifth CPE is one of the plurality of CPEs;

a third query module, configured to query the SD-WAN overlay routing table for a routing entry corresponding to a first destination CPE, to obtain a third routing entry, where the first destination CPE is a CPE corresponding to a multicast rendezvous point;

a sixth obtaining module, configured to obtain local TNP information and peer TNP information in the third routing entry;

a fourth query module, configured to query, based on the obtained peer TNP information, for an identifier of a site to which a next-hop CPE that is of the first CPE and via which the data of the first CPE reaches the first destination CPE belongs, to obtain an identifier of a seventh site;

a fifth generation module, configured to generate a sixth multicast join message based on the identifier of the seventh site and the fifth multicast join message, where the sixth multicast join message carries sixth multicast join route information, and the sixth multicast join route information includes the second multicast group IP address, an identifier of the first CPE, the identifier of the seventh site, and the identifier of the first site; and a second sending module, configured to send the sixth multicast join message through a port indicated by the obtained local TNP information.

Optionally, the apparatus 1100 further includes:

a sixth generation module, configured to generate a second forwarding entry in an SD-WAN overlay multicast forwarding table, where a multicast group IP address in the second forwarding entry is the second multicast group IP address, an egress site identifier in the second forwarding entry is the identifier of the sixth site, and an ingress site identifier in the second forwarding entry is the identifier of the seventh site.

Optionally, the apparatus 1100 further includes:

a seventh obtaining module, configured to obtain a seventh multicast join message from a fifth CPE, where the seventh multicast join message carries seventh multicast join route information, the seventh multicast join route information includes a second multicast group IP address, an identifier of the fifth CPE, first TNP information of the first CPE, and second TNP information of the fifth CPE, and the fifth CPE is one of the plurality of CPEs;

a fifth query module, configured to query the SD-WAN overlay routing table for a routing entry corresponding to a first destination CPE, to obtain a third routing entry, where the first destination CPE is a CPE corresponding to a multicast rendezvous point;

an eighth obtaining module, configured to obtain local TNP information and peer TNP information in the third routing entry;

a seventh generation module, configured to generate an eighth multicast join message based on the obtained peer TNP information and the seventh multicast join message, where the eighth multicast join message carries eighth multicast join route information, and the eighth multicast join route information includes the second multicast group IP address, an identifier of the first CPE, the obtained peer TNP information, and the first TNP information; and a third sending module, configured to send the eighth multicast join message through a port indicated by the obtained local TNP information.

Optionally, the apparatus 1100 further includes:

an eighth generation module, configured to generate a third forwarding entry in an SD-WAN overlay multicast forwarding table, where a multicast IP address in the third forwarding entry is the second multicast group IP address, egress port information in the third forwarding entry is the second TNP information, and ingress port information in the third forwarding entry is the obtained peer TNP information.

Optionally, the apparatus 1100 further includes:

a second receiving module, configured to receive a second multicast service packet sent by a sixth CPE, where the second multicast service packet includes a second SD-WAN ExtGRE header and a second IP header, the second SD-WAN ExtGRE header indicates a protocol type of the second IP header, and the second IP header carries an IP address of a second multicast source and the second multicast group IP address;

a second parsing module, configured to parse the second IP header based on the protocol type indicated by the second SD-WAN ExtGRE header, to obtain the IP address of the second multicast source and the second multicast group IP address;

a sixth query module, configured to query the SD-WAN overlay multicast forwarding table for a forwarding entry in which a multicast group IP address is the second multicast group IP address and ingress port information is TNP information of the sixth CPE, to obtain the third forwarding entry;

a ninth obtaining module, configured to obtain the egress port information in the third forwarding entry: to obtain the second TNP information;

a tenth obtaining module, configured to obtain based on the second TNP information, local TNP information of an SD-WAN link between the first CPE and the fifth CPE; and a fourth sending module, configured to send the second multicast service packet through a port indicated by the local TNP information of the SD-WAN link between the first CPE and the fifth CPE.

In this embodiment of this application, a CPE can autonomously generate an SD-WAN overlay network topology, calculate an overlay route to another CPE based on the network topology, and further generate an SD-WAN overlay routing table. Subsequently, the CPE can implement, based on the SD-WAN overlay routing table, a communication service including a multicast service and/or a unicast service.

It should be noted that, when the communication apparatus provided in the foregoing embodiment implements communication, division into the foregoing functional modules is merely used as an example for illustration. In actual application, the foregoing functions can be allocated to different functional modules and implemented based on a requirement. That is, an inner structure of the apparatus is divided into different functional modules to implement all or a part of the foregoing functions. In addition, the communication apparatus provided in the foregoing embodiment and the communication method embodiment belong to a same concept. For a specific implementation process thereof, refer to the method embodiment. Details are not described herein again.

FIG. 12 is a schematic diagram of a structure of a communication apparatus 1200 according to an embodiment of this application. The communication apparatus 1200 may be implemented as a part or all of a communication device by using software, hardware, or a combination thereof. The communication device may be the CPE in the foregoing embodiment. In this embodiment of this application, the apparatus 1200 is applied to a first CPE in a plurality of CPEs included in an SD-WAN overlay network. Refer to FIG. 12. The apparatus 1200 includes a first receiving module 1201 and a recording module 1202.

The first receiving module 1201 is configured to receive a first BGP update packet sent by an RR, where the first BGP update packet carries an IP address of a first multicast source and an identifier of a first site.

The recording module 1202 is configured to record the identifier of the first site as an overlay multicast RPF next-hop site identifier corresponding to the IP address of the first multicast source, where the overlay multicast RPF next-hop site identifier is for guiding the first CPE to transfer a multicast join message and generate an SD-WAN overlay multicast forwarding table in a process of transferring the multicast join message.

Optionally, the first BGP update packet carries first multicast source route information, the first multicast source route information includes a first route prefix and a first extended community attribute, the first route prefix is the IP address of the first multicast source, and the first extended community attribute is the identifier of the first site.

Optionally, the first BGP update packet is transferred based on a BGP-internet protocol version 4-multicast virtual private network IPv4-MVPN instance address family, and the BGP IPv4-MVPN instance address family corresponds to the first extended community attribute.

Optionally, the apparatus 1200 further includes:

a first obtaining module, configured to obtain a first multicast join message from a second CPE, where the first multicast join message carries first multicast join route information, the first multicast join route information includes the IP address of the first multicast source, a first multicast group internet protocol IP address, an identifier of the second CPE, an identifier of a second site to which the first CPE belongs, and an identifier of a third site to which the second CPE belongs, and the second CPE is one of the plurality of CPEs;

a first generation module, configured to generate a second multicast join message based on the first multicast join message and the multicast RPF next-hop site identifier corresponding to the IP address of the first multicast source, where the second multicast join message carries second multicast join route information, and the second multicast join route information includes the IP address of the first multicast source, the first multicast group IP address, an identifier of the first CPE, the identifier of the first site, and the identifier of the second site; and a transfer module, configured to transfer the second multicast join message to a CPE in the first site through an SD-WAN link between the first CPE and the CPE in the first site based on the multicast RPF next-hop site identifier corresponding to the IP address of the first multicast source.

Optionally, the first multicast join message further carries indication information of a target route type, and the indication information indicates the first CPE to parse the first multicast join route information based on the target route type.

Optionally, the apparatus 1200 further includes:

a second generation module, configured to generate a first forwarding entry in the SD-WAN overlay multicast forwarding table, where a multicast source IP address in the first forwarding entry is the IP address of the first multicast source, a multicast group IP address in the first forwarding entry is the first multicast group IP address, an egress site identifier in the first forwarding entry is the identifier of the third site, and an ingress site identifier in the first forwarding entry is the identifier of the first site.

Optionally, the apparatus 1200 further includes:

a second receiving module, configured to receive a first multicast service packet sent by a third CPE in the first site, where the first multicast service packet includes a first SD-WAN ExtGRE header and a first IP header, the first SD-WAN ExtGRE header indicates a protocol type of the first IP header, and the first IP header carries the IP address of the first multicast source and the first multicast group IP address;

a parsing module, configured to parse the first IP header based on the protocol type indicated by the first SD-WAN ExtGRE header, to obtain the IP address of the first multicast source and the first multicast group IP address;

a query module, configured to query the SD-WAN overlay multicast forwarding table for a forwarding entry in which a multicast source IP address is the IP address of the first multicast source, a multicast group IP address is the first multicast group IP address, and an ingress site identifier is the identifier of the first site, to obtain the first forwarding entry;

a second obtaining module, configured to obtain the egress site identifier in the first forwarding entry, to obtain the identifier of the third site; and a sending module, configured to send the first multicast service packet to a CPE in the third site through an SD-WAN link between the first CPE and the CPE in the third site based on the identifier of the third site.

In this embodiment of this application, an overlay multicast RPF route corresponding to an IP of a multicast source is specified to a CPE by using a BGP update packet reflected by the RR, to implement an overlay multicast service in an SD-WAN scenario. In the solution, the CPE does not need to perform path computation, so that a computing power requirement of the CPE is reduced.

It should be noted that, when the communication apparatus provided in the foregoing embodiment implements communication, division into the foregoing functional modules is merely used as an example for illustration. In actual application, the foregoing functions can be allocated to different functional modules and implemented based on a requirement. That is, an inner structure of the apparatus is divided into different functional modules to implement all or a part of the foregoing functions. In addition, the communication apparatus provided in the foregoing embodiment and the communication method embodiment belong to a same concept. For a specific implementation process thereof, refer to the method embodiment. Details are not described herein again.

Figure 13:
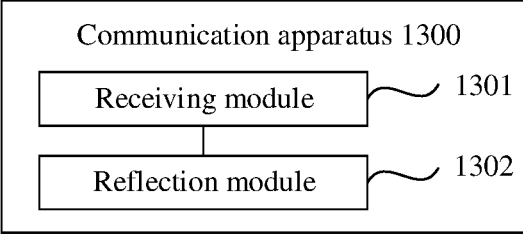
FIG. 13 is a schematic diagram of a structure of still another communication apparatus according to an embodiment of this application.

FIG. 13 is a schematic diagram of a structure of a communication apparatus 1300 according to an embodiment of this application. The communication apparatus 1300 may be implemented as a part or all of a communication device by using software, hardware, or a combination thereof. The communication device may be the RR in the foregoing embodiment. In this embodiment of this application, the apparatus 1300 is applied to an RR included in an SD-WAN overlay network. Refer to FIG. 13. The apparatus 1300 includes a receiving module 1301 and a reflection module 1302.

The receiving module 1301 is configured to receive a first BGP update packet sent by a first CPE in a first site, where the first BGP update packet carries an IP address of a first multicast source and an identifier of a second site.

The reflection module 1302 is configured to reflect a second BGP update packet to a CPE in a third site based on a configured overlay unicast path from a branch site to the first multicast source, where the second BGP update packet carries the IP address of the first multicast source and an identifier of the first site.

The second BGP update packet indicates the CPE in the third site to record the identifier of the first site as an overlay multicast RPF next-hop site identifier corresponding to the IP address of the first multicast source, and the overlay multicast RPF next-hop site identifier is for guiding the CPE in the third site to transfer a multicast join message and generate an SD-WAN overlay multicast forwarding table in a process of transferring the multicast join message.

Optionally: the first site and the second site are different sites, and the apparatus 1300 further includes:

a generation module, configured to generate the second BGP update packet based on the identifier of the first site and the first BGP update packet.

Optionally the first BGP update packet carries first multicast source route information, the first multicast source route information includes a first route prefix and a first extended community attribute, the first route prefix is the IP address of the first multicast source, and the first extended community attribute is the identifier of the second site.

In this embodiment of this application, the route reflector RR can reflect a BGP update packet to specify, to a CPE, an overlay multicast RPF next hop corresponding to an IP of a multicast source, to implement an overlay multicast service in an SD-WAN scenario. In the solution, the CPE does not need to perform path computation, so that a computing power requirement of the CPE is reduced.

It should be noted that, when the communication apparatus provided in the foregoing embodiment implements communication, division into the foregoing functional modules is merely used as an example for illustration. In actual application, the foregoing functions can be allocated to different functional modules and implemented based on a requirement. That is, an inner structure of the apparatus is divided into different functional modules to implement all or a part of the foregoing functions. In addition, the communication apparatus provided in the foregoing embodiment and the communication method embodiment belong to a same concept. For a specific implementation process thereof, refer to the method embodiment. Details are not described herein again.

Figure 14:
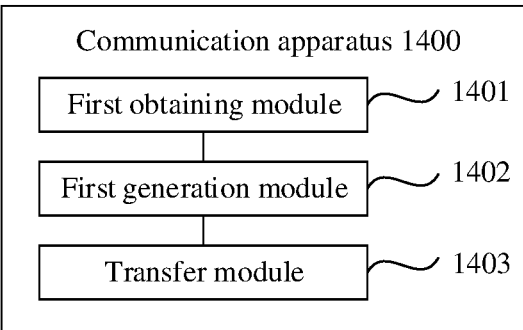
FIG. 14 is a schematic diagram of a structure of still another communication apparatus according to an embodiment of this application.

FIG. 14 is a schematic diagram of a structure of a communication apparatus 1400 according to an embodiment of this application. The communication apparatus 1400 may be implemented as a part or all of a communication device by using software, hardware, or a combination thereof. The communication device may be the CPE in the foregoing embodiment. In this embodiment of this application, the apparatus 1400 is used in a first CPE in a plurality of CPEs included in an SD-WAN overlay network, and the first CPE is one of the plurality of CPEs that is located in a first site. Refer to FIG. 14. The apparatus 1400 includes a first obtaining module 1401, a first generation module 1402, and a transfer module 1403.

The first obtaining module 1401 is configured to obtain a first multicast join message from a second CPE, where the first multicast join message carries first multicast join route information, the first multicast join route information includes a first multicast group IP address, an identifier of the second CPE, an identifier of the first site to which the first CPE belongs, and an identifier of a second site to which the second CPE belongs, and the second CPE is one of the plurality of CPEs.

The first generation module 1402 is configured to generate a second multicast join message based on the first multicast join message, where the second multicast join message carries second multicast join route information, and the second multicast join route information includes the first multicast group IP address, an identifier of the first CPE, an identifier of a third site, and the identifier of the first site.

The transfer module 1403 is configured to transfer the second multicast join message to a CPE in the third site through an SD-WAN link between the first CPE and the CPE in the third site.

Optionally, the first generation module 1402 includes:
a first generation submodule, configured to generate the second multicast join message based on an SD-WAN overlay routing table and the first multicast join message.

Optionally, the SD-WAN overlay routing table includes a routing entry corresponding to each of a plurality of destination sites, the routing entry corresponding to the destination site includes an identifier of the destination site and an identifier of a next-hop site that is of the first CPE and via which data of the first CPE reaches the destination site, and the plurality of destination sites include a site to which a CPE other than the first CPE in the plurality of CPEs belongs.

The first generation submodule is configured to:
query the SD-WAN overlay routing table for a routing entry corresponding to a first destination site, to obtain a first routing entry, where the first destination site is a site to which a multicast rendezvous point belongs;
obtain an identifier of a next-hop site in the first routing entry, to obtain the identifier of the third site; and
generate the second multicast join message based on the identifier of the third site and the first multicast join message.

The transfer module 1403 includes:
an obtaining submodule, configured to obtain local TNP information of an SD-WAN link between each of a part or all of CPEs in the third site and the first CPE; and a first sending submodule, configured to send the second multicast join message through a port indicated by the local TNP information of the SD-WAN link between each of the part or all of the CPEs in the third site and the first CPE.

Optionally, the SD-WAN overlay routing table includes a routing entry corresponding to each of a plurality of destination CPEs, the routing entry corresponding to the destination CPE includes an identifier of the destination CPE, and local transport network port TNP information and peer TNP information of a target SD-WAN link, the target SD-WAN link is an SD-WAN link between the first CPE and a next-hop CPE that is of the first CPE and via which data of the first CPE reaches the destination CPE, the peer TNP information is TNP information of the next-hop CPE that is of the first CPE and via which the data of the first CPE reaches the destination CPE, and the plurality of destination CPEs include a CPE other than the first CPE in the plurality of CPEs.

The first generation submodule is configured to:
query the SD-WAN overlay routing table for a routing entry corresponding to a first destination CPE, to obtain a second routing entry, where the first destination CPE is a CPE corresponding to a multicast rendezvous point;
obtain local TNP information and peer TNP information in a third routing entry;
query, based on the obtained peer TNP information, for an identifier of a site to which a next-hop CPE that is of the first CPE and via which the data of the first CPE reaches the first destination CPE belongs, to obtain the identifier of the third site; and
generate the second multicast join message based on the identifier of the third site and the first multicast join message.

The transfer module 1403 includes:
a second sending submodule, configured to send the second multicast join message through a port indicated by the obtained local TNP information.

Optionally, the apparatus 1400 further includes:
a second obtaining module, configured to obtain node information of each of the plurality of CPEs, where the node information of the CPE includes an identifier of the CPE and information about an SD-WAN link on which the CPE is located;
a second generation module, configured to generate an SD-WAN overlay network topology based on the node information of each of the plurality of CPEs;
a determining module, configured to determine, based on the SD-WAN overlay network topology, an overlay route from the first CPE to each of a plurality of destination CPEs, where the plurality of destination CPEs include a CPE other than the first CPE in the plurality of CPEs; and
a third generation module, configured to generate the SD-WAN overlay routing table based on the overlay route from the first CPE to each of the plurality of destination CPEs. Optionally, the apparatus 1400 further includes:
a first receiving module, configured to receive a first BGP update packet sent by an RR, where the first BGP update packet carries an IP address of a multicast rendezvous point and the identifier of the third site; and
a recording module, configured to record the identifier of the third site as an overlay multicast RPF next-hop site identifier corresponding to the IP address of the multicast rendezvous point.

The first generation module 1402 includes:

a second generation submodule, configured to generate the second multicast join message based on the first multicast join message and the overlay multicast RPF next-hop site identifier corresponding to the IP address of the multicast rendezvous point.

Optionally, the apparatus 1400 further includes:

a fourth generation module, configured to generate a first forwarding entry in an SD-WAN overlay multicast forwarding table, where a multicast group IP address in the first forwarding entry is the first multicast group IP address, an egress site identifier in the first forwarding entry is the identifier of the second site, and an ingress site identifier in the first forwarding entry is the identifier of the third site.

Optionally, the apparatus 1400 further includes:

a second receiving module, configured to receive a first multicast service packet sent by a third CPE in the third site, where the first multicast service packet includes a first SD-WAN ExtGRE header and a first IP header, the first SD-WAN ExtGRE header indicates a protocol type of the first IP header, and the first IP header carries an IP address of a first multicast source and the first multicast group IP address;

a parsing module, configured to parse the first IP header based on the protocol type indicated by the first SD-WAN ExtGRE header, to obtain the IP address of the first multicast source and the first multicast group IP address;

a query module, configured to query the SD-WAN overlay multicast forwarding table for a forwarding entry in which a multicast group IP address is the first multicast group IP address and an ingress site identifier is the identifier of the third site, to obtain the first forwarding entry;

a third obtaining module, configured to obtain the egress site identifier in the first forwarding entry, to obtain the identifier of the second site; and a sending module, configured to send the first multicast service packet to a CPE in the second site based on the identifier of the second site.

In this embodiment of this application, an identifier of a CPE and identifiers of sites are carried in a multicast join message to implement SD-WAN overlay multicast communication.

It should be noted that, when the communication apparatus provided in the foregoing embodiment implements communication, division into the foregoing functional modules is merely used as an example for illustration. In actual application, the foregoing functions can be allocated to different functional modules and implemented based on a requirement. That is, an inner structure of the apparatus is divided into different functional modules to implement all or a part of the foregoing functions. In addition, the communication apparatus provided in the foregoing embodiment and the communication method embodiment belong to a same concept. For a specific implementation process thereof, refer to the method embodiment. Details are not described herein again.

Figure 15:
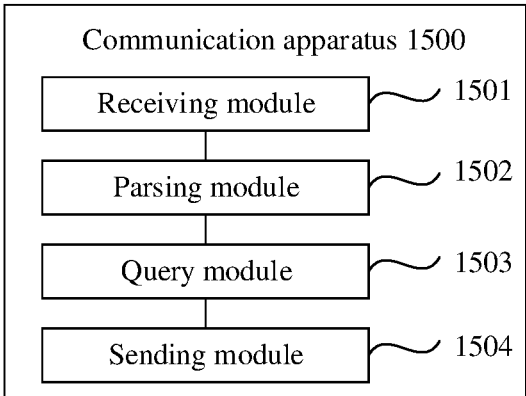
FIG. 15 is a schematic diagram of a structure of still another communication apparatus according to an embodiment of this application.

FIG. 15 is a schematic diagram of a structure of a communication apparatus 1500 according to an embodiment of this application. The communication apparatus 1500 may be implemented as a part or all of a communication device by using software, hardware, or a combination thereof. The communication device may be the CPE in the foregoing embodiment. In this embodiment of this application, the apparatus 1500 is applied to a first CPE in a plurality of CPEs included in an SD-WAN overlay network. Refer to FIG. 15. The apparatus 1500 includes a receiving module 1501, a parsing module 1502, a query module 1503, and a sending module 1504.

The receiving module 1501 is configured to receive a first multicast service packet sent by a second CPE in a first site, where the first multicast service packet includes a first SD-WAN ExtGRE header and a first internet protocol IP header, the first SD-WAN ExtGRE header indicates a protocol type of the first IP header, the first IP header carries an IP address of a first multicast source and a first multicast group IP address, and the second CPE is one of the plurality of CPEs.

The parsing module 1502 is configured to parse the first IP header based on the protocol type indicated by the first SD-WAN ExtGRE header, to obtain the IP address of the first multicast source and the first multicast group IP address.

The query module 1503 is configured to find a first forwarding entry from an SD-WAN overlay multicast forwarding table based on the first multicast group IP address.

The sending module 1504 is configured to send the first multicast service packet based on the first forwarding entry.

Optionally, a forwarding entry in the SD-WAN overlay multicast forwarding table includes a multicast group IP address, an egress site identifier, and an ingress site identifier. The query module 1503 includes:

a first query submodule, configured to query the SD-WAN overlay multicast forwarding table for a forwarding entry in which a multicast group IP address is the first multicast group IP address and an ingress site identifier is an identifier of the first site, to obtain the first forwarding entry.

The sending module 1504 includes:

a first obtaining submodule, configured to obtain an egress site identifier in the first forwarding entry, to obtain an identifier of a second site; and a first sending submodule, configured to send the first multicast service packet to a CPE in the second site through an SD-WAN link between the first CPE and the CPE in the second site based on the identifier of the second site.

Optionally, the sending submodule is configured to:

obtain local TNP information of an SD-WAN link between each of a part or all of CPEs in the second site and the first CPE based on the identifier of the second site; and send the first multicast service packet through a port indicated by the local TNP information of the SD-WAN link between each of the part or all of the CPEs in the second site and the first CPE.

Optionally, a forwarding entry in the SD-WAN overlay multicast forwarding table includes a multicast group IP address, egress port information, and ingress port information.

The query module 1503 includes:

a second query submodule, configured to query the SD-WAN overlay multicast forwarding table for a forwarding entry in which a multicast group IP address is the first multicast group IP address and ingress port information is TNP information of the second CPE, to obtain the first forwarding entry.

The sending module 1504 includes:

a second obtaining module, configured to obtain egress port information in the first forwarding entry, to obtain TNP information of a third CPE;

a third obtaining module, configured to obtain, based on the TNP information of the third CPE, local TNP information of an SD-WAN link between the first CPE and the third CPE; and a second sending submodule, configured to send the first multicast service packet through a port indicated by the local TNP information of the SD-WAN link between the first CPE and the third CPE.

In this embodiment of this application, an SD-WAN-related protocol is extended, and specifically, a standard IP header is carried in a newly defined multicast service packet, to send a multicast service packet in an overlay network in an SD-WAN scenario. Because an added IP header is the standard IP header, the solution has quite strong generalization and applicability, and has good compatibility with an existing SD-WAN technology.

It should be noted that, when the communication apparatus provided in the foregoing embodiment implements a communication service, division into the foregoing functional modules is merely used as an example for illustration. In actual application, the foregoing functions can be allocated to different functional modules and implemented based on a requirement. That is, an inner structure of the apparatus is divided into different functional modules to implement all or a part of the foregoing functions. In addition, the communication apparatus provided in the foregoing embodiment and the communication method embodiment belong to a same concept. For a specific implementation process thereof, refer to the method embodiment. Details are not described herein again.

All or some of the foregoing embodiments may be implemented by using software, hardware, firmware, or any combination thereof. When the software is used to implement embodiments, all or some of embodiments may be implemented in a form of a computer program product. The computer program product includes one or more computer instructions. When the computer instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer or a data storage device, for example, a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like. It should be noted that the computer-readable storage medium mentioned in embodiments of this application may be a non-volatile storage medium, or in other words, may be a non-transitory storage medium.

It should be understood that "at least one" mentioned in this specification means one or more, and "a plurality of" means two or more. In descriptions of embodiments of this application, "/" means "or" unless otherwise specified. For example. A/B may represent A or B. In this specification.

"and/or" describes only an association relationship between associated objects, and represents that three relationships may exist. For example. A and/or B may represent the following three cases: Only A exists, both A and B exist, and only B exists. In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

It should be noted that, information (including but not limited to user equipment information, user personal information, and the like), data (including but not limited to data for analysis, stored data, displayed data, and the like), and a signal in embodiments of this application are all authorized by a user or fully authorized by all parties, and collection, use, and processing of related data need to comply with related laws, regulations, and standards of related countries and regions. For example, the node information, the multicast service packet, and the like in embodiments of this application are all obtained with full authorization.

The foregoing descriptions are embodiments provided in this application, but are not intended to limit this application. Any modification, equivalent replacement, improvement, or the like made without departing from the principle of this application shall fall within the protection scope of this application.

What is claimed is:

1. A communication method, wherein the method comprises:

obtaining, by a first customer-premises equipment (CPE), node information of each of a plurality of CPEs in a software-defined wide area network (SD-WAN) overlay network, wherein the node information of each CPE comprises an identifier of the each CPE and information about an SD-WAN link on which the each CPE is located, and the first CPE is one of the plurality of CPEs;

generating, by the first CPE, an SD-WAN overlay network topology based on the node information of each of the plurality of CPEs;

determining, by the first CPE based on the SD-WAN overlay network topology, an overlay route from the first CPE to each of a plurality of destination CPEs, wherein each of the plurality of destination CPEs is a CPE in the plurality of CPEs; and generating, by the first CPE, an SD-WAN overlay routing table based on the overlay route from the first CPE to each of the plurality of destination CPEs, wherein:

the SD-WAN overlay routing table is a routing table at a site granularity, the node information of each CPE further comprises an identifier of a site to which the each CPE belongs, the SD-WAN overlay routing table comprises a routing entry corresponding to each of a plurality of destination sites, the routing entry corresponding to a destination site comprises an identifier of the destination site and an identifier of a next-hop site that is of the first CPE and via which data of the first CPE reaches the destination site, and the plurality of destination sites comprise sites to which the plurality of destination CPEs belong; or the SD-WAN overlay routing table is a routing table at a CPE granularity, the SD-WAN overlay routing table comprises a routing entry corresponding to each of the plurality of destination CPEs, the routing entry corresponding to a destination CPE of the plurality of destination CPEs comprises an identifier of the destination CPE, and local transport network port (TNP) information and peer TNP information of a target SD-WAN link, the target SD-WAN link is an SD-WAN link between the first CPE and a next-hop CPE that is of the first CPE and via which data of the first CPE reaches the destination CPE, and the peer TNP information is TNP information of the next-hop CPE that is of the first CPE and via which the data of the first CPE reaches the destination CPE.

2. The method according to claim 1, wherein the SD-WAN overlay routing table is a routing table at a site granularity, the node information of each CPE further comprises an identifier of a site to which the each CPE belongs, the SD-WAN overlay routing table comprises a routing entry corresponding to each of a plurality of destination sites, the routing entry corresponding to a destination site comprises an identifier of the destination site and an identifier of a next-hop site that is of the first CPE and via which data of the first CPE reaches the destination site, and the plurality of destination sites comprise sites to which the plurality of destination CPEs belong, and wherein the method further comprises:

obtaining, by the first CPE, a first multicast join message from a second CPE, wherein the first multicast join message carries first multicast join route information, the first multicast join route information comprises a first multicast group internet protocol (IP) address, an identifier of the second CPE, an identifier of a first site to which the first CPE belongs, and an identifier of a second site to which the second CPE belongs, and the second CPE is one of the plurality of CPEs;

querying, by the first CPE, the SD-WAN overlay routing table for a routing entry corresponding to a first destination site, to obtain a first routing entry, wherein the first destination site is a site to which a multicast rendezvous point belongs;

obtaining, by the first CPE, an identifier of a next-hop site in the first routing entry, to obtain an identifier of a third site;

generating, by the first CPE, a second multicast join message based on the identifier of the third site and the first multicast join message, wherein the second multicast join message carries second multicast join route information, and the second multicast join route information comprises the first multicast group IP address, an identifier of the first CPE, the identifier of the third site, and the identifier of the first site; and transferring, by the first CPE, the second multicast join message to a CPE in the third site through an SD-WAN link between the first CPE and the CPE in the third site based on the identifier of the third site.

3. The method according to claim 2, wherein the method further comprises:

generating, by the first CPE, a first forwarding entry in an SD-WAN overlay multicast forwarding table, wherein a multicast group IP address in the first forwarding entry is the first multicast group IP address, an egress site identifier in the first forwarding entry is the identifier of the second site, and an ingress site identifier in the first forwarding entry is the identifier of the third site.

4. The method according to claim 1, wherein the SD-WAN overlay routing table is a routing table at a site granularity, the node information of each CPE further comprises an identifier of a site to which the each CPE belongs, the SD-WAN overlay routing table comprises a routing entry corresponding to each of a plurality of destination sites, the routing entry corresponding to a destination site comprises an identifier of the destination site and an identifier of a next-hop site that is of the first CPE and via which data of the first CPE reaches the destination site, and the plurality of destination sites comprise sites to which the plurality of destination CPEs belong, and wherein the method further comprises:

obtaining, by the first CPE, a third multicast join message from a third CPE, wherein the third multicast join message carries third multicast join route information, the third multicast join route information comprises an internet protocol (IP) address of a first multicast source, the first multicast group IP address, an identifier of the third CPE, the identifier of the first site to which the first CPE belongs, and an identifier of a fourth site to which the third CPE belongs, and the third CPE is one of the plurality of CPEs;

querying, by the first CPE, the SD-WAN overlay routing table for a routing entry corresponding to a second destination site, to obtain a second routing entry, wherein the second destination site is a site accessed by the first multicast source;

obtaining, by the first CPE, an identifier of a next-hop site in the second routing entry, to obtain an identifier of a fifth site;

generating, by the first CPE, a fourth multicast join message based on the identifier of the fifth site and the third multicast join message, wherein the fourth multicast join message carries fourth multicast join route information, and the fourth multicast join route information comprises the IP address of the first multicast source, the first multicast group IP address, the identifier of the first CPE, the identifier of the fifth site, and the identifier of the first site; and transferring, by the first CPE, the fourth multicast join message to a CPE in the fifth site through an SD-WAN link between the first CPE and the CPE in the fifth site based on the identifier of the fifth site.

5. The method according to claim 4, wherein the method further comprises:

generating, by the first CPE, a first forwarding entry in an SD-WAN overlay multicast forwarding table, wherein a multicast source IP address in the first forwarding entry is the IP address of the first multicast source, a multicast group IP address in the first forwarding entry is the first multicast group IP address, an egress site identifier in the first forwarding entry is the identifier of the fourth site, and an ingress site identifier in the first forwarding entry is the identifier of the fifth site.

6. The method according to claim 5, wherein the method further comprises:

receiving, by the first CPE, a first multicast service packet sent by a fourth CPE in the fifth site, wherein the first multicast service packet comprises a first SD-WAN extended generic routing encapsulation (ExtGRE) header and a first IP header, the first SD-WAN ExtGRE header indicates a protocol type of the first IP header, and the first IP header carries the IP address of the first multicast source and the first multicast group IP address;

parsing, by the first CPE, the first IP header based on the protocol type indicated by the first SD-WAN ExtGRE header, to obtain the IP address of the first multicast source and the first multicast group IP address;

querying, by the first CPE, the SD-WAN overlay multicast forwarding table for a forwarding entry in which a multicast source IP address is the IP address of the first multicast source, a multicast group IP address is the first multicast group IP address, and an ingress site identifier is the identifier of the fifth site, to obtain the first forwarding entry;

obtaining, by the first CPE, the egress site identifier in the first forwarding entry, to obtain the identifier of the fourth site; and sending, by the first CPE, the first multicast service packet to a CPE in the fourth site through an SD-WAN link between the first CPE and the CPE in the fourth site based on the identifier of the fourth site.

7. The method according to claim 1, wherein the SD-WAN overlay routing table is a routing table at a CPE granularity, the SD-WAN overlay routing table comprises a routing entry corresponding to each of the plurality of destination CPEs, the routing entry corresponding to a destination CPE of the plurality of destination CPEs comprises an identifier of the destination CPE, and local transport network port (TNP) information and peer TNP information of a target SD-WAN link, the target SD-WAN link is an SD-WAN link between the first CPE and a next-hop CPE that is of the first CPE and via which data of the first CPE reaches the destination CPE, and the peer TNP information is TNP information of the next-hop CPE that is of the first CPE and via which the data of the first CPE reaches the destination CPE, and wherein the method further comprises:

obtaining, by the first CPE, a fifth multicast join message from a fifth CPE, wherein the fifth multicast join message carries fifth multicast join route information, the fifth multicast join route information comprises a second multicast group IP address, an identifier of the fifth CPE, an identifier of a first site to which the first CPE belongs, and an identifier of a sixth site to which the fifth CPE belongs, wherein the fifth CPE is one of the plurality of CPEs;

querying, by the first CPE, the SD-WAN overlay routing table for a routing entry corresponding to a first destination CPE, to obtain a third routing entry, wherein the first destination CPE is a CPE corresponding to a multicast rendezvous point;

obtaining, by the first CPE, local TNP information and peer TNP information in the third routing entry;

querying, by the first CPE based on the obtained peer TNP information, for an identifier of a site to which a next-hop CPE that is of the first CPE and via which the data of the first CPE reaches the first destination CPE belongs, to obtain an identifier of a seventh site;

generating, by the first CPE, a sixth multicast join message based on the identifier of the seventh site and the fifth multicast join message, wherein the sixth multicast join message carries sixth multicast join route information, and the sixth multicast join route information comprises the second multicast group IP address, an identifier of the first CPE, the identifier of the seventh site, and the identifier of the first site; and sending, by the first CPE, the sixth multicast join message through a port indicated by the obtained local TNP information.

8. The method according to claim 7, wherein the method further comprises:

generating, by the first CPE, a second forwarding entry in an SD-WAN overlay multicast forwarding table, wherein a multicast group internet protocol (IP) address in the second forwarding entry is the second multicast group IP address, an egress site identifier in the second forwarding entry is the identifier of the sixth site, and an ingress site identifier in the second forwarding entry is the identifier of the seventh site.

9. The method according to claim 1, wherein the SD-WAN overlay routing table is a routing table at a CPE granularity, the SD-WAN overlay routing table comprises a routine entry corresponding to each of the plurality of destination CPEs, the routing entry corresponding to a destination CPE of the plurality of destination CPEs comprises an identifier of the destination CPE, and local transport network port (TNP) information and peer TNP information of a target SD-WAN link, the target SD-WAN link is an SD-WAN link between the first CPE and a next-hop CPE that is of the first CPE and via which data of the first CPE reaches the destination CPE, and the peer TNP information is TNP information of the next-hop CPE that is of the first CPE and via which the data of the first CPE reaches the destination CPE, and wherein the method further comprises:

obtaining, by the first CPE, a seventh multicast join message from a fifth CPE, wherein the seventh multicast join message carries seventh multicast join route information, the seventh multicast join route information comprises a second multicast group internet protocol (IP) address, an identifier of the fifth CPE, first TNP information of the first CPE, and second TNP information of the fifth CPE, and the fifth CPE is one of the plurality of CPEs;

querying, by the first CPE, the SD-WAN overlay routing table for a routing entry corresponding to a first destination CPE, to obtain a third routing entry, wherein the first destination CPE is a CPE corresponding to a multicast rendezvous point;

obtaining, by the first CPE, local TNP information and peer TNP information in the third routing entry;

generating, by the first CPE, an eighth multicast join message based on the obtained peer TNP information and the seventh multicast join message, wherein the eighth multicast join message carries eighth multicast join route information, and the eighth multicast join route information comprises the second multicast group IP address, an identifier of the first CPE, the obtained peer TNP information, and the first TNP information; and sending, by the first CPE, the eighth multicast join message through a port indicated by the obtained local TNP information.

10. The method according to claim 9, wherein the method further comprises:

generating, by the first CPE, a third forwarding entry in an SD-WAN overlay multicast forwarding table, wherein a multicast IP address in the third forwarding entry is the second multicast group IP address, egress port information in the third forwarding entry is the second TNP information, and ingress port information in the third forwarding entry is the obtained peer TNP information.

11. The method according to claim 10, wherein the method further comprises:

receiving, by the first CPE, a second multicast service packet sent by a sixth CPE, wherein the second multicast service packet comprises a second SD-WAN extended generic routing encapsulation (ExtGRE)

header and a second IP header, the second SD-WAN ExtGRE header indicates a protocol type of the second IP header, and the second IP header carries an IP address of a second multicast source and the second multicast group IP address;

parsing, by the first CPE, the second IP header based on the protocol type indicated by the second SD-WAN ExtGRE header, to obtain the IP address of the second multicast source and the second multicast group IP address;

querying, by the first CPE, the SD-WAN overlay multicast forwarding table for a forwarding entry in which a multicast group IP address is the second multicast group IP address and ingress port information is TNP information of the sixth CPE, to obtain the third forwarding entry;

obtaining, by the first CPE, the egress port information in the third forwarding entry, to obtain the second TNP information;

obtaining, by the first CPE based on the second TNP information, local TNP information of an SD-WAN link between the first CPE and the fifth CPE; and sending, by the first CPE, the second multicast service packet through a port indicated by the local TNP information of the SD-WAN link between the first CPE and the fifth CPE.

12. A first customer-premises equipment (CPE), comprising a processor and a memory, wherein the memory is configured to store a computer program; and the processor is configured to execute the computer program, to configure the first CPE to:

obtain node information of each of a plurality of CPEs in a software-defined wide area network (SD-WAN) overlay network, wherein the node information of each CPE comprises an identifier of the each CPE and information about an SD-WAN link on which the each CPE is located, and the first CPE is one of the plurality of CPEs;

generate an SD-WAN overlay network topology based on the node information of each of the plurality of CPEs;

determine, based on the SD-WAN overlay network topology, an overlay route from the first CPE to each of a plurality of destination CPEs, wherein each of the plurality of destination CPEs is a CPE in the plurality of CPEs other than the first CPE; and generate an SD-WAN overlay routing table based on the overlay route from the first CPE to each of the plurality of destination CPEs, wherein:

the SD-WAN overlay routing table is a routing table at a site granularity, the node information of each CPE further comprises an identifier of a site to which the each CPE belongs, the SD-WAN overlay routing table comprises a routing entry corresponding to each of a plurality of destination sites, the routing entry corresponding to a destination site comprises an identifier of the destination site and an identifier of a next-hop site that is of the first CPE and via which data of the first CPE reaches the destination site, and the plurality of destination sites comprise sites to which the plurality of destination CPEs beloma; or the SD-WAN overlay routing table is a routing table at a CPE granularity, the SD-WAN overlay routing table comprises a routing entry corresponding to each of the plurality of destination CPEs, the routine entry corresponding to a destination CPE of the plurality of destination CPEs comprises an identifier of the destination CPE, and local transport network port (TNP) information and peer TNP information of a target SD-WAN link, the target SD-WAN link is an SD-WAN link between the first CPE and a next-hop CPE that is of the first CPE and via which data of the first CPE reaches the destination CPE, and the peer TNP information is TNP information of the next-hop CPE that is of the first CPE and via which the data of the first CPE reaches the destination CPE.

13. The first CPE according to claim 12, wherein the SD-WAN overlay routing table is a routing table at a site granularity the node information of each CPE further comprises an identifier of a site to which the each CPE belongs, the SD-WAN overlay rooting table comprises a routing entry corresponding to each of a plurality of destination sites, the routing entry corresponding to a destination site comprises an identifier of the destination site and an identifier of a next-hop site that is of the first CPE and via which data of the first CPE reaches the destination site, and the plurality of destination sites comprise sites to which the plurality of destination CPEs belong, and wherein the processor is further configured to execute the computer program, to enable the first CPE to:

obtain a first multicast join message from a second CPE, wherein the first multicast join message carries first multicast join route information, the first multicast join route information comprises a first multicast group internet protocol IP address, an identifier of the second CPE, an identifier of a first site to which the first CPE belongs, and an identifier of a second site to which the second CPE belongs, and the second CPE is one of the plurality of CPEs;

query the SD-WAN overlay routing table for a routing entry corresponding to a first destination site, to obtain a first routing entry, wherein the first destination site is a site to which a multicast rendezvous point belongs;

obtain an identifier of a next-hop site in the first routing entry, to obtain an identifier of a third site;

generate a second multicast join message based on the identifier of the third site and the first multicast join message, wherein the second multicast join message carries second multicast join route information, and the second multicast join route information comprises the first multicast group IP address, an identifier of the first CPE, the identifier of the third site, and the identifier of the first site; and transfer the second multicast join message to a CPE in the third site through an SD-WAN link between the first CPE and the CPE in the third site based on the identifier of the third site.

14. The first CPE according to claim 13, wherein the processor is further configured to execute the computer program, to enable the first CPE to:

generate a first forwarding entry in an SD-WAN overlay multicast forwarding table, wherein a multicast group internet protocol (IP) address in the first forwarding entry is the first multicast group IP address, an egress site identifier in the first forwarding entry is the identifier of the second site, and an ingress site identifier in the first forwarding entry is the identifier of the third site.

15. The first CPE according to claim 14, wherein the processor is further configured to execute the computer program, to enable the first CPE to:

receive a first multicast service packet sent by a third CPE in the third site, wherein the first multicast service packet comprises a first SD-WAN extended generic routing encapsulation (ExtGRE) header and a first IP header, the first SD-WAN ExtGRE header indicates a protocol type of the first IP header, and the first IP header carries the IP address of the first multicast source and the first multicast group IP address;

parse the first IP header based on the protocol type indicated by the first SD-WAN ExtGRE header, to obtain the IP address of the first multicast source and the first multicast group IP address;

query the SD-WAN overlay multicast forwarding table for a forwarding entry in which a multicast source IP address is the IP address of the first multicast source, a multicast group IP address is the first multicast group IP address, and an ingress site identifier is the identifier of the third site, to obtain the first forwarding entry;

obtain the egress site identifier in the first forwarding entry, to obtain the identifier of the second site; and send the first multicast service packet to a CPE in the second site through an SD-WAN link between the first CPE and the CPE in the second site based on the identifier of the second site.

16. A non-transitory computer-readable storage medium, wherein the storage medium stores a computer program that, when executed by a processor of a first customer-premises equipment (CPE), causes the first CPE to:

obtain node information of each of a plurality of CPEs in a software-defined wide area network (SD-WAN) overlay network, wherein the node information of each CPE comprises an identifier of the each CPE and information about an SD-WAN link on which the each CPE is located, and the first CPE is one of the plurality of CPEs;

generate an SD-WAN overlay network topology based on the node information of each of the plurality of CPEs;

determine, based on the SD-WAN overlay network topology, an overlay route from the first CPE to each of a plurality of destination CPEs, wherein each of the plurality of destination CPEs is a CPE in the plurality of CPEs other than the first CPE; and generate an SD-WAN overlay routing table based on the overlay route from the first CPE to each of the plurality of destination CPEs wherein:

the SD-WAN overlay routing table is a routing table at a site granularity, the node information of each CPE further comprises an identifier of a site to which the each CPE belongs, the SD-WAN overlay routing table comprises a routing entry corresponding to each of a plurality of destination sites, the routing entry corresponding to a destination site comprises an identifier of the destination site and an identifier of a next-hop site that is of the first CPE and via which data of the first CPE reaches the destination site, and the plurality of destination sites comprise sites to which the plurality of destination CPEs belong, or the SD-WAN overlay routing table is a routing table at a CPE granularity, the SD-WAN overlay routing table comprises a routing entry corresponding to each of the plurality of destination CPEs, the routing entry corresponding to a destination CPE of the plurality of destination CPEs comprises an identifier of the destination CPE, and local transport network port (TNP) information and peer TNP information of a target SD-WAN link, the target SD-WAN link is an SD-WAN link between the first CPE and a next-bop CPE that is of the first CPE and via which data of the first CPE reaches the destination CPE, and the peer TNP information is TNP information of the next-hop CPE that is of the first CPE and via which the data of the first CPE reaches the destination CPE.

* * * * *